US012587724B2

(12) United States Patent
Morrison et al.

(10) Patent No.: US 12,587,724 B2
(45) Date of Patent: Mar. 24, 2026

(54) DIGITALLY ENHANCED MICROSCOPY FOR MULTIPLEXED HISTOLOGY

(71) Applicant: Ventana Medical Systems, Inc., Tucson, AZ (US)

(72) Inventors: Larry Morrison, Oro Valley, AZ (US); Lou Dietz, Mountain View, CA (US)

(73) Assignee: Ventana Medical Systems, Inc., Tucson, AZ (US)

( * ) Notice: Subject to any disclaimer, the term of this patent is extended or adjusted under 35 U.S.C. 154(b) by 0 days.

(21) Appl. No.: 18/886,939

(22) Filed: Sep. 16, 2024

(65) Prior Publication Data

US 2025/0106488 A1 Mar. 27, 2025

Related U.S. Application Data

(63) Continuation of application No. 17/346,184, filed on Jun. 11, 2021, now Pat. No. 12,126,880, which is a continuation of application No. 16/941,351, filed on Jul. 28, 2020, now Pat. No. 11,070,750, which is a (Continued)

(51) Int. Cl.
*H04N 23/11* (2023.01)
*G01N 21/64* (2006.01)

(52) U.S. Cl.
CPC ......... *H04N 23/11* (2023.01); *G01N 21/6458* (2013.01)

(58) Field of Classification Search
CPC ......... G01N 21/6458; G01N 2021/646; G01N 21/6456; H04N 23/11; H04N 23/10; H04N 23/13; H04N 23/12
See application file for complete search history.

(56) References Cited

U.S. PATENT DOCUMENTS

| | | | |
|---|---|---|---|
| 4,925,789 | A | 5/1990 | Edberg |
| 5,086,476 | A | 2/1992 | Bacus |
| 5,583,001 | A | 12/1996 | Bobrow et al. |

(Continued)

FOREIGN PATENT DOCUMENTS

| | | |
|---|---|---|
| AU | 2013240090 | 8/2014 |
| AU | 2013381730 | 8/2015 |

(Continued)

OTHER PUBLICATIONS

International Search Authority: European Patent Office, International Search Report and Written Opinion for PCT Application No. PCT/US2013/059829 (related to present application), Applicant: Ventana Medical Systems, Inc., Date of Mailing: Jan. 30, 2014, 13 pages.

(Continued)

*Primary Examiner* — Boubacar Abdou Tchoussou
(74) *Attorney, Agent, or Firm* — Perkins Coie LLP

(57) ABSTRACT

Disclosed herein are embodiments of imaging biological specimens. An imaging system can include a microscope for directly viewing the biological specimen and a multi-spectral imaging apparatus for outputting digitally enhanced images, near-video rate imaging, and/or videos of the specimen. An imaging system can include a digital scanner that digitally processes images to produce a composite image with enhanced color contrast of features of interest.

34 Claims, 21 Drawing Sheets
(14 of 21 Drawing Sheet(s) Filed in Color)

Related U.S. Application Data continuation of application No. 14/027,093, filed on Sep. 13, 2013, now Pat. No. 10,778,913.

(60) Provisional application No. 61/778,093, filed on Mar. 12, 2013.

(56) References Cited

U.S. PATENT DOCUMENTS

| | | | | |
|---|---|---|---|---|
| 5,759,808 | A | 6/1998 | Casterman et al. | |
| 5,800,988 | A | 9/1998 | Casterman et al. | |
| 5,840,526 | A | 11/1998 | Casterman et al. | |
| 5,874,541 | A | 2/1999 | Casterman et al. | |
| 6,005,079 | A | 12/1999 | Casterman et al. | |
| 6,015,695 | A | 1/2000 | Casterman et al. | |
| 6,139,800 | A | 10/2000 | Chandler | |
| 6,453,060 | B1 | 9/2002 | Riley et al. | |
| 6,750,964 | B2 | 6/2004 | Levenson et al. | |
| 7,555,155 | B2 * | 6/2009 | Levenson | G06V 10/7715 600/407 |
| 7,615,371 | B2 | 11/2009 | Kram | |
| 7,695,929 | B2 | 4/2010 | Kosmeder et al. | |
| 8,077,310 | B2 | 12/2011 | Olson et al. | |
| 8,164,623 | B2 | 4/2012 | Aizaki et al. | |
| 8,285,024 | B2 | 10/2012 | Lett et al. | |
| 8,290,236 | B2 | 10/2012 | Lett et al. | |
| 8,957,958 | B2 * | 2/2015 | Kuppig | G02B 27/58 382/128 |
| 10,778,913 | B2 | 9/2020 | Morrison et al. | |
| 11,070,750 | B2 | 7/2021 | Morrison et al. | |
| 12,126,880 | B2 | 10/2024 | Morrison et al. | |
| 2001/0002315 | A1 | 5/2001 | Schultz et al. | |
| 2003/0058440 | A1 | 3/2003 | Scott et al. | |
| 2003/0231791 | A1 | 12/2003 | Torre-Bueno et al. | |
| 2004/0018492 | A1 | 1/2004 | Miller et al. | |
| 2006/0033920 | A1 | 2/2006 | Luther et al. | |
| 2006/0245631 | A1 * | 11/2006 | Levenson | G06V 10/7715 382/133 |
| 2008/0013816 | A1 | 1/2008 | Rimm et al. | |
| 2008/0055595 | A1 | 3/2008 | Olson et al. | |
| 2008/0151367 | A1 | 6/2008 | Aizaki et al. | |
| 2008/0212866 | A1 | 9/2008 | Lett et al. | |
| 2008/0299555 | A1 | 12/2008 | Nitta et al. | |
| 2009/0087074 | A1 | 4/2009 | Wong | |
| 2009/0116008 | A1 | 5/2009 | Fukuda et al. | |
| 2010/0255487 | A1 * | 10/2010 | Beechem | C12N 9/1241 435/6.12 |
| 2010/0290692 | A1 | 11/2010 | Macaulay et al. | |
| 2011/0003707 | A1 | 1/2011 | Goix et al. | |
| 2011/0096157 | A1 | 4/2011 | Fine et al. | |
| 2011/0136130 | A1 | 6/2011 | Gniewek et al. | |
| 2011/0149097 | A1 | 6/2011 | Danuser et al. | |
| 2011/0212486 | A1 | 9/2011 | Yamada et al. | |
| 2011/0216953 | A1 | 9/2011 | Callahan et al. | |
| 2012/0070862 | A1 | 3/2012 | Alexander et al. | |
| 2012/0075695 | A1 | 3/2012 | DeBlasis et al. | |
| 2012/0171668 | A1 | 7/2012 | May et al. | |
| 2012/0218400 | A1 | 8/2012 | Tsutomu | |
| 2013/0260379 | A1 | 10/2013 | Alexander et al. | |
| 2014/0267672 | A1 | 9/2014 | Morrison et al. | |
| 2022/0001080 | A1 | 1/2022 | Athanasiou et al. | |

FOREIGN PATENT DOCUMENTS

| | | |
|---|---|---|
| CA | 2867144 | 10/2013 |
| CA | 2900842 | 9/2014 |
| CN | 102577405 | 7/2012 |
| CN | 105247348 | 1/2016 |
| EP | 2037255 | 3/2009 |
| EP | 2831587 | 2/2015 |
| EP | 2972227 | 1/2016 |
| JP | 2005524051 | 8/2005 |
| JP | 2007322389 | 12/2007 |
| JP | 2011179924 | 9/2011 |
| JP | 2012177805 | 9/2012 |
| JP | 2015514214 | 5/2015 |
| JP | 2016512345 | 4/2016 |
| WO | 1996005693 | 2/1996 |
| WO | 03021212 | 3/2003 |
| WO | 2008063378 | 5/2008 |
| WO | 2008128352 | 10/2008 |
| WO | 2008133729 | 11/2008 |
| WO | 2009012140 | 1/2009 |
| WO | 2009046544 | 4/2009 |
| WO | 2010094283 | 8/2010 |
| WO | 2012003476 | 1/2012 |
| WO | 2012003479 | 1/2012 |
| WO | 2012092322 | 7/2012 |
| WO | 2012152693 | 11/2012 |
| WO | 2013079606 | 6/2013 |
| WO | 2013148498 | 10/2013 |
| WO | 2014143155 | 9/2014 |

OTHER PUBLICATIONS

International Search Authority: European Patent Office, International Search Report and Written Opinion for PCT Application No. PCT/US2013/033462 (related to present application), Applicant: Ventana Medical Systems, Inc., Date of Mailing: Jun. 27, 2013, 13 pages.

Kim, H. et al., "Detection of ALK Gene Rearrangement in Non-small Cell Lung Cancer," Journal of Thoracic Oncology, vol. 6, No. 8, Aug. 2011, pp. 1359-1366.

Lebanony, D. et al., "Diagnostic Assay Based on has-miR-205 Expression Distinguishes Squamous from Nonsquamous Non-Small-Cell Lung Carcinoma," Journal of Clinical Oncology, vol. 27, No. 12, Apr. 20, 2009, pp. 2030-2037.

Morrison, L. E., "Detection of Genomic Abnormalities by Florescence In Situ Hybridization," Reviews in Fluorescence, New York, Kluwer Academic/Plenum Publishers, 2004, pp. 221-244.

Morrison, L.E et al., "Multicolor Fluorescence In Situ Hybridization Techniques," Introduction to Fluorescence In Situ Hybridization: Principles and Clinical Applications, Wiley-Liss, Inc., 1999, pp. 77-118.

Tanner, M. et al., "Chromogenic in Situ Hybridization: A Practiccal Alternative for Fluorescence in Situ Hybridization to Detect HER-2/neu Oncogene Amplification in Archival Breast Cancer Samples," American Journal of Pathology, vol. 157, No. 5, Nov. 2000, pp. 1467-1472.

Yoo, S. B. et al., "Reliability of chromogenic in situ hybridization for epidermal growth factor receptor gene copy number detection in non-small-cell lung carcinomas: A comparison with fluorescence in situ hybridization study," Lung Cancer, Elsevier Ireland Ltd., vol. 67, 2010, pp. 301-305.

TSA Signal Amplifications (TSA) Systems, PerkinElmer, Inc., 2007, 16 pages.

"Full Width at Half Maximum" from Wikipedia, the free encyclopedia, printed on Feb. 11, 2015, 2 pages.

Liu et al., A quantitative evaluation of peroxidase inhibitors for tyramide signal amplification mediated cytochemistry and histochemistry, Histochem Cell Biology, Mar. 2006, vol. 126, pp. 283-291.

Tyramide Signal Amplification Kits, Molecular Probes Inc., 2001, 2 pages.

Questions and Answers About Tyramide Signal Amplification (TSA) from PerkinElmer, Inc. Printed on Aug. 15, 2015.

* cited by examiner

DIGITALLY ENHANCED MICROSCOPY FOR MULTIPLEXED HISTOLOGY

CROSS-REFERENCE TO RELATED APPLICATIONS

This application is a continuation is U.S. application Ser. No. 17/346,184, filed Jun. 11, 2021 (U.S. Pat. No. 12,126,880), which is a continuation of Ser. No. 16/941,351, filed Jul. 28, 2020 (U.S. Pat. No. 11,070,750), which is a continuation of U.S. application Ser. No. 14/027,093, filed Sep. 13, 2013 (U.S. Pat. No. 10,778,913), which claims the benefit of U.S. Provisional Patent Application No. 61/778,093, filed Mar. 12, 2013, which are incorporated herein by reference in their entireties.

FIELD OF TECHNOLOGY

The present disclosure concerns contrast enhanced microscopy for histology. In particular, the present technology is related to microscopy and digital enhancement, color reclassification, and/or digital processing of images/video of specimens.

BACKGROUND

Immunohistochemistry (IHC) generally refers to the process of detecting, localizing, and quantifying antigens, such as a protein, in a biological sample and using specific binding moieties, such as antibodies specific to the particular antigens. In situ hybridization (ISH) generally refers to the process of detecting, localizing, and quantifying nucleic acids. Both IHC and ISH can be performed on various biological samples, such as tissue (e.g., fresh frozen, formalin fixed paraffin embedded) and cytological samples. Upon recognition of targets, whether the targets be nucleic acids or antigens, the recognition event can be detected through the use of various labels (e.g., chromogenic, fluorescent, luminescent, radiometric, etc.). For example, ISH on tissue can include detecting a nucleic acid by applying a complementary strand of nucleic acid to which a reporter molecule is coupled. Visualization of the reporter molecule allows an observer to localize specific DNA or RNA sequences in a heterogeneous cell population, such as a histological, cytological, or environmental sample. ISH techniques can include, for example, silver in situ hybridization (SISH), chromogenic in situ hybridization (CISH) and fluorescence in situ hybridization (FISH). It may be difficult to identify very small stained samples. In some clinical readings, labels may be near the optical resolution limit of the microscope, thereby limiting the user's ability to resolve slight differences in color and/or overlap of multiple hybridization signals. In a clinical reading using a microscope, pathologists often report a score for the biological sample by visually inspecting cells or cell components (e.g., proteins, lipids, etc.) that are stained different colors. Unfortunately, it may be difficult to perceive some stains and/or to differentiate between stained features. Additionally, color perception can vary between pathologists. A pathologist with less acute vision may have difficulty in differentiating between colors, which may result in inconsistent scoring between pathologists.

Multiplexing histological techniques can be used to evaluate a number of biomarkers in IHC and ISH. However, an observer's color perception often limits the number of chromogens or fluorophores that can be used simultaneously, thereby limiting assay multiplexing. In chromogenic multiplexing using bright field microscopes, it may be difficult to visually detect different color chromogens because the chromogens may have relatively broad spectra. Even with narrower band absorbers, spectra overlap between different chromogens can result in dark spots that provide limited perception of color. Variations in staining between specimens can further increase difficulty in accurately differentiating between different color chromogens. Additionally, some colors are harder to distinguish than others. Yellows and cyans generally provide less contrast because they absorb light at the blue or red edge of the visual spectrum such that the percentage of total detectable light absorbed is relatively small relative to, for example, a green light absorber, resulting in yellow and cyan chromogens exhibiting lower visual contrast relative to magenta chromogens. Chromogenic absorbers outside of the visual spectrum can be used to increase multiplexing but cannot be viewed using a traditional bright field microscope. In fluorescence detection, fluorescent labels may not be equally detected by different observers due to the fluorescent label emissions being on the fringes or outside of the visual spectrum. Thus, the level of assay multiplexing is often limited, and assay multiplexing has significant drawbacks.

SUMMARY

At least some embodiments are imaging systems for directly viewing stained biological specimens and outputting digitally enhanced images and/or video of the specimens. The imaging systems can include microscopes for directly viewing the specimen and multi-spectral imaging apparatuses. A user can view through ocular(s) of the microscope to rapidly locate region(s) for inspection and/or to locate specific features of interest, such as chromogen-stained features, fluorophore-stained features, or other features for IHC, ISH, or other inspection techniques. Image(s) and/or video of the specimen can be outputted in real-time on a display of the imaging apparatus located next to the microscope. The image(s) and/or video can be digitally enhanced to facilitate identification of stained features. By alternating between bright field viewing (e.g., viewing via the microscope) and viewing digitally enhanced image(s)/video, a user can rapidly and accurately score the specimen. The imaging systems can provide digital enhancement, color reclassification, spectral deconvolved image(s)/video, and/or digital processing of image/video.

In some embodiments, a stage of the microscope can be moved in the X, Y, and Z (focus) directions and the imaging apparatus can output video (or images at a near-video rate) to minimize, limit, or substantially eliminate delays associated with displaying the images and/or video. In one embodiment, an image capture device of the imaging system can be coupled to a compound microscope. In other embodiments, the imaging apparatus can be incorporated into or be part of a digital microscope. The digital microscope may or may not have oculars for direct viewing of the biological specimen and a display for outputting digitally enhanced image(s)/video.

The imaging system can include one or more image capture devices and energy emitters, such as light sources, infrared sources, ultraviolet sources, or the like. Light sources can be light-emitting diodes (LEDs) that are pulsed on and off to correspond with imaging frames such that successive frames are recorded with a different LED illumination. The LEDs can produce light that corresponds to the absorbance of each chromogen used to stain the specimen and, in some embodiments, may limit the contribution from spectrally neighboring chromogens. Digital processing can be used to re-define the spectral characteristics of captured images such that features of interest are optimally perceived by the observer. For example, color re-definition and/or contrast enhancement of each LED's illumination can be performed to better visually distinguish each chromogen and to adapt to the acuity of the observer. In some embodiments, digital processing darkens areas corresponding to features of interest and can lighten other areas. Additionally, colors can be redefined to further enhance visual and/or automated identification of features of interest. In some embodiments, the imaging apparatus is a filterless imaging apparatus with an image capture device that outputs images based on specific wavelength(s) and/or waveband(s) from an illuminator.

In some embodiments, the image capture device provides multispectral images. Spectral unmixing can be performed on the images. The colors of the unmixed images can be re-defined to provide optimal color separation. In one embodiment, the redefined images can be combined to produce color composite images (e.g., false color composite images). To increase multiplexing capability, the image capture device can provide sensitivity outside the visual spectrum range to image chromogens and/or fluorescence signals outside the visual spectrum. The image capture device can be configured to provide re-focusing capability due to, for example, chromatic aberrations associated with UV and near IR energy sources. In one embodiment, an automated focus device or an automated focus stage can be used to adjust focus in synchrony with the illuminator. For example, the automated focus device can be incorporated into the image capture device. Alternatively or additionally, an automated focus stage can adjust focus for visible light emitters, UV energy emitters, and IR energy emitters. Fluorescent stains that are bright enough for video or near video rate imaging can be excited selectively and sequentially with different pulsed LEDs synchronized with image recording. Amplification methods, such as tyramide deposition of fluorophores, can be used to render specimen fluorescence sufficiently intense for video rate or near video rate imaging.

In some embodiments, an imaging system can include an image capture device coupled to or near the eyepiece of a compound microscope. In other embodiments, the microscope can be a digital microscope with an integrated image capture device. In yet other embodiments, the imaging system can be used with a stereo microscope or other type of microscope used for viewing very small objects at, for example, several hundred times magnification. The position of an illuminator and the image capture device of the imaging system can be selected based on the configuration of the microscope. The imaging systems can further include a processing device in the form of a desktop computer, a laptop computer, a tablet, or the like and can include digital electronic circuitry, firmware, hardware, memory, a computer storage medium, a computer program, a processor (including a programmed processor), or the like.

In some further embodiments, an imaging system is configured to image a specimen located on a microscope slide and comprises an imaging apparatus, one or more lenses, and a display in communication with the imaging apparatus. The imaging apparatus includes an energy emitter in the form of an illuminator having a plurality of different color light sources that sequentially produce light for sequentially illuminating at least a portion of the specimen. The imaging apparatus also includes an image capture device positioned to capture a plurality of specimen images each corresponding to the specimen being exposed to light from a respective one of the light sources. A processing device is configured to produce contrast enhanced color image data based on the specimen images. The display can be configured to display the specimen based on the contrast enhanced color image data. The display can display false color images or false color video of the specimen. Other types of output (e.g., patient information, stain information, reports, etc.) can also be displayed. In some embodiments, the display displays contrast enhanced color output (e.g., false color composite image/video) and/or spectral unmixed output that provides greater color contrast between targeted cell structures than the naturally-occurring color contrast provided by bright field viewing. The processing device can output the contrast enhanced color data such that the contrast enhanced color output is video of the specimen displayed at a frame rate equal to or greater than a desired frame rate (e.g., 2 frames/second).

The energy emitter, in some embodiments, is configured to produce energy emissions with mean wavelengths that are different from one another. In one embodiment, the total number of different energy emissions (i.e., energy emissions with different mean wavelengths) is in a range of about 4 to 8, for example. The energy emitter can include, without limitation, four light sources of different mean wavelengths, five light sources of different mean wavelengths, or ten or more light sources of different mean wavelengths. The number of energy emissions, characteristics of the emissions (e.g., mean wavelengths), and/or number of light sources can be selected based on the number of features of interest, types of labels, etc.

The imaging system, in some embodiments, further includes a microscope comprising a holder device carrying the microscope slide and one or more oculars through which a user is capable of viewing the specimen while the display displays the contrast enhanced color output of the specimen. The illuminator can illuminate the portion of the specimen within the microscope field. When using ocular(s), the illuminator can generate white light for normal appearance of the specimen. While the illuminator outputs white light, the contrast-enhanced color output may not be updated in real-time.

In some further embodiments, a system comprises an imaging apparatus, one or more lenses, and display means in communication with the imaging apparatus. The imaging apparatus includes means for sequentially emitting energy and means for capturing an image/video. In some embodiments, the means for capturing is positioned to capture specimen images, each corresponding to the specimen being exposed to energy. In some embodiments, the means for capturing can include one or more cameras positioned on a front side and/or a backside of the microscope slide carrying the biological specimen. The display means, in some embodiments, includes a monitor or a screen. In some embodiments, the means for sequentially emitting energy includes multiple energy emitters. Each energy emitter can include one or more IR energy emitters, UV energy emitters, LED light emitters, combinations thereof, or other types of energy emitting devices. The imaging system can further include means for producing contrast enhanced color image data based on the specimen images captured by the means for capturing. The displaying means displays the specimen based on the contrast enhanced color image data.

In yet other embodiments, a computer-based imaging system for imaging a specimen located on a microscope slide comprises memory and a programmable processor. The memory can store a sequence of program instructions. In some embodiments, the processor has circuitry configured to execute the instructions to cause the programmable processor to receive a first image of the specimen exposed to light at a first wavelength/waveband for interacting with at least one first feature of interest and to receive a second image of the specimen exposed to light at a second wavelength/waveband for interacting with at least one second feature of interest. The second wavelength/waveband can be different from the first wavelength/waveband, respectively. The instructions can also cause the processor to generate a color image of the specimen based on the first and second images.

The memory, in some embodiments, stores converting instructions executable by the circuitry. For example, converting instructions can be executed to convert the first image to a first false color image and to convert the second image to a second false color image. The first and second false color images can be combined to produce a color composite image. Linear mixing methods, non-linear mixing methods, and/or other mixing techniques can be used to combine imaging. Features of interest in the composite image can be targets (e.g., nucleic acids, antigens, etc.), labels (e.g., chromogenic labels, fluorescent labels, luminescent labels, radiometric labels, etc.), or various cell components or structures. Additional false color images can be generated. In some protocols, a total of 4-8 false color images can be generated to produce each color composite image.

In some embodiments, a method for imaging a specimen carried by a microscope slide includes capturing a first image of the specimen while the specimen is exposed to light at a first peak wavelength or a first waveband. The first peak wavelength or first waveband corresponds to a first absorption wavelength or a first absorption waveband of first features of interest of the specimen. A second image can be captured while the specimen is exposed to light at a second peak wavelength or a second waveband. The second peak wavelength or second waveband can correspond to a second absorption wavelength or a second absorption waveband of second features of interest of the specimen. An image can be generated based on the first and second images. In some embodiments, the generated image is a false color image (e.g., a composite image) or other types of enhanced image. The method, in some embodiments, includes converting the first image into a first false color image, converting the second image into a second false color image, and combining the first and second false color images. The first and second images can be spectrally discrete images, such as monochrome images.

In yet another embodiment, a method for contrast enhanced imaging comprises sequentially exposing at least a portion of a specimen (e.g., a portion of the specimen within a microscope's field of view, the entire specimen, etc.) to light from light sources. Each light source can output a mean wavelength capable of being absorbed by respective features of interest of the specimen. Images of the specimen can be captured at each illumination step. False color image data can be generated based on the captured images such that the false color data represents a false color image with enhanced color contrast between different features of interest of the specimen.

In some embodiments, an imaging system can capture images of a specimen carried by a microscope slide. During the image capturing process, the specimen can be exposed to energy such that characteristics of the specimen's features of interest vary between the images. The images can be digitally processed and combined to produce an image for viewing. In one embodiment, the captured images can be converted into false color images and combined to provide a composite false color image. In one embodiment, a classifier can be used to determine the number and types of stains applied to the specimen. The images can be processed based on information from the classifier.

The foregoing and other objects, features, and advantages of embodiments of the invention will become more apparent from the following detailed description, which proceeds with reference to the accompanying figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 5(A-D) are black-and-white photomicrographs of the human tissue illuminated by color LEDs.

FIGS. 10(A-B) are schematic diagrams of two signaling conjugates.

FIGS. 11(A-F) are schematic diagrams illustrating a manner in which a target on a sample is detected.

FIGS. 13(A-B) are schematics showing the differences between signals obtained with chromogens and signals obtained with fluorophores.

FIGS. 14(A-B) are images illustrating the color characteristics discussed herein.

FIG. 17(A) illustrates the traces obtained from tissue samples, whereas FIG. 17(B) illustrates traces obtained from ethyl acetate solutions of Fast Red and Fast Blue.

FIGS. 18(A-B) are images and a schematic illustrating the difference between a dual ISH chromogenic detection, where

FIGS. 20(A-C) are photomicrographs showing the use of LED illumination to separate the signal from a chromogenic dual stain.

DETAILED DESCRIPTION

I. Definitions and Abbreviations

Figure 1:
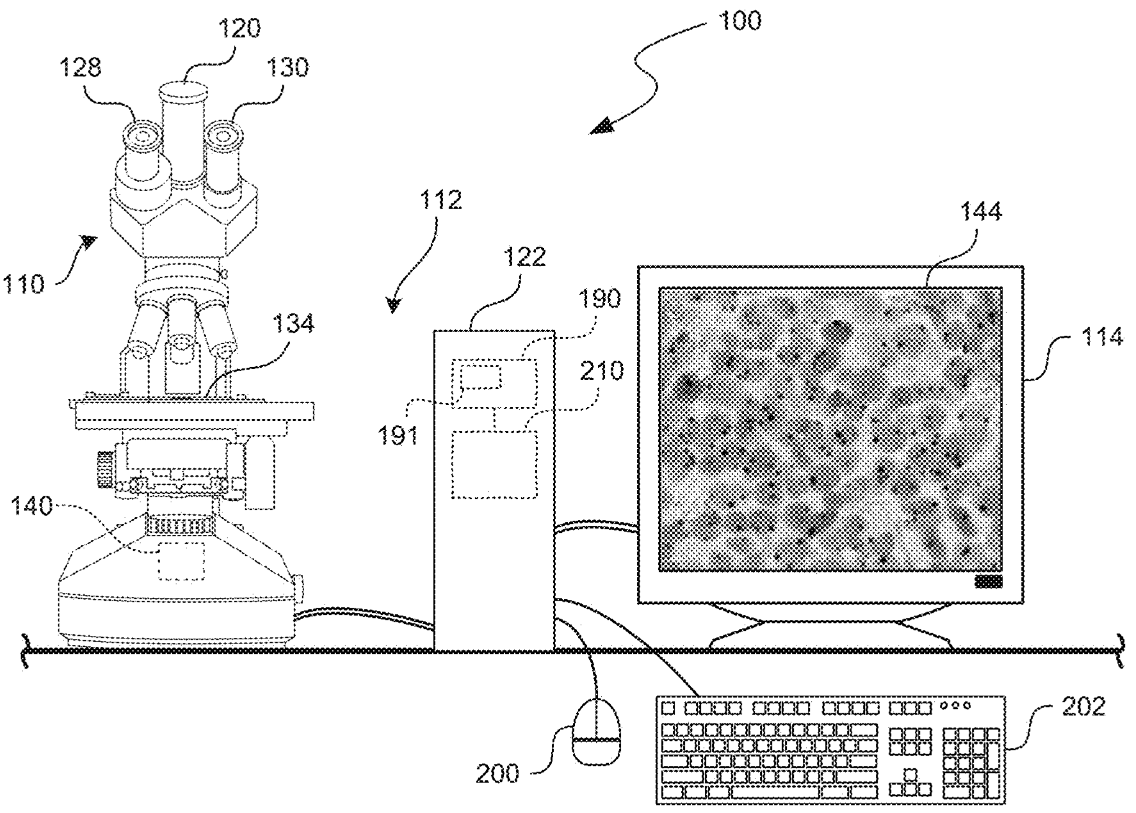
FIG. 1 is a front view of an imaging system for imaging a specimen located on a microscope slide in accordance with an embodiment of the disclosed technology.

Unless otherwise noted, technical terms are used according to conventional usage. Definitions of common terms in molecular biology may be found in Benjamin Lewin, Genes VII, published by Oxford University Press, 2000 (ISBN 019879276X); Kendrew et al. (eds.), *The Encyclopedia of Molecular Biology*, published by Blackwell Publishers, 1994 (ISBN 0632021829); and Robert A. Meyers (ed.), *Molecular Biology and Biotechnology: a Comprehensive Desk Reference*, published by Wiley, John & Sons, Inc., 1995 (ISBN 0471186341); and other similar references.

As used herein, the singular terms "a," "an," and "the" include plural referents unless context clearly indicates otherwise. Similarly, the word "or" is intended to include "and" unless the context clearly indicates otherwise. The term "includes" is defined inclusively, such that "includes A or B" means including A, B, or A and B. It is further to be understood that all nucleotide sizes or amino acid sizes, and all molecular weight or molecular mass values, given for nucleic acids or polypeptides or other compounds are approximate, and are provided for description. Although methods and materials similar or equivalent to those described herein can be used in the practice or testing of the present disclosure, suitable methods and materials are described below.

In case of conflict with the disclosure of publications, patent applications, patents, and other references mentioned herein, the present specification, including explanations of terms, will control. In addition, the materials, methods, and examples are illustrative only and not intended to be limiting.

Disclosed herein are one or more generic chemical formulas. For the general formulas provided herein, if no substituent is indicated, a person of ordinary skill in the art will appreciate that the substituent is hydrogen. A bond that is not connected to an atom, but is shown, for example, extending to the interior of a ring system, indicates that the position of such substituent is variable. A curved line drawn through a bond indicates that some additional structure is bonded to that position, typically a linker or the functional group or moiety used to couple two moieties together (e.g., a chromophore and a tyramide or tyramide derivative). Moreover, if no stereochemistry is indicated for compounds having one or more chiral centers, all enantiomers and diasteromers are included. Similarly, for a recitation of aliphatic or alkyl groups, all structural isomers thereof also are included. Unless otherwise stated, R groups (e.g., R1-R24) in the general formulas provided below independently are selected from: hydrogen; acyl; aldehyde; alkoxy; aliphatic, particularly lower aliphatic (e.g., C1-10alkyl, C1-10alkylene, C1-10alkyne); substituted aliphatic; heteroaliphatic (e.g., organic chains having heteroatoms, such as oxygen, nitrogen, sulfur, alkyl, particularly alkyl having 20 or fewer carbon atoms, and even more typically lower alkyl having 10 or fewer atoms, such as methyl, ethyl, propyl, isopropyl, and butyl); substituted alkyl, such as alkyl halide (e.g. —CX3 where X is a halide, and combinations thereof, either in the chain or bonded thereto,); oxime; oxime ether (e.g., methoxyimine, CH3-O—N═); alcohols (i.e. aliphatic or alkyl hydroxyl, particularly lower alkyl hydroxyl); amido; amino; amino acid; aryl; alkyl aryl, such as benzyl; carbohydrates; monosaccharides, such as glucose and fructose; disaccharides, such as sucrose and lactose; oligosaccharides; polysaccharides; carbonyl; carboxyl; carboxylate (including salts thereof, such as Group I metal or ammonium ion carboxylates); cyclic; cyano (—CN); ester, such as alkyl ester; ether; exomethylene; halogen; heteroaryl; heterocyclic; hydroxyl; hydroxylamine; keto, such as aliphatic ketones; nitro; sulfhydryl; sulfonyl; sulfoxide; exomethylene; and combinations thereof.

"Absorbance" or "Absorption" refers to the logarithmic ratio of the radiation incident upon a material (P0), to the radiation transmitted through a material (P). The absorbance A of a material varies with the light path length through it (z) according to Equation 1.

$$A = \log\frac{P_0}{P} = -(\log T) = \epsilon lc$$

$P_0$ and Pare the incident and transmitted light intensities, T is the optical transmission, and $\epsilon$ is the molar extinction coefficient ($M^{-1}$ $cm^{-1}$), l is the length or depth of illuminated area (cm), and c is the concentration of the absorbing molecule.

"Amplification" refers to the act or result of making a signal stronger.

"Amplifying conjugate" refers to a molecule comprising a latent reactive species coupled to a hapten, such as, for example, a hapten-tyramide conjugate. The amplifying conjugate may serve as a member of a specific binding pair, such as, for example, an anti-hapten antibody specifically binding to the hapten. The amplification aspect relates to the latent reactive species being enzymatically converted to a reactive species so that a single enzyme can generate a multiplicity of reactive species. Reference is made to U.S. Pat. No. 7,695,929.

"Antibody" occasionally abbreviated "Ab", refers to immunoglobulins or immunoglobulin-like molecules (including by way of example and without limitation, IgA, IgD, IgE, IgG and IgM, combinations thereof, and similar molecules produced during an immune response in any vertebrate, (e.g. in mammals such as humans, goats, rabbits and mice) and antibody fragments that specifically bind to a molecule of interest (or a group of highly similar molecules of interest) to the substantial exclusion of binding to other molecules (for example, antibodies and antibody fragments that have a binding constant for the molecule of interest that is at least 103 M-1 greater, at least 104 M-1 greater or at least 105 M-1 greater than a binding constant for other molecules in a biological sample. Antibody further refers to a polypeptide ligand comprising at least a light chain or heavy chain immunoglobulin variable region which specifically recognizes and binds an epitope of an antigen. Antibodies may be composed of a heavy and a light chain, each of which has a variable region, termed the variable heavy (VH) region and the variable light (VL) region. Together, the VH region and the VL region are responsible for binding the antigen recognized by the antibody. The term antibody also includes intact immunoglobulins and the variants and portions of them well known in the art. Antibody fragments include proteolytic antibody fragments [such as F(ab')2 fragments, Fab' fragments, Fab'-SH fragments and Fab fragments as are known in the art], recombinant antibody fragments (such as sFv fragments, dsFv fragments, bispecific sFv fragments, bispecific dsFv fragments, F(ab)'2 fragments, single chain Fv proteins ("scFv"), disulfide stabilized Fv proteins ("dsFv"), diabodies, and triabodies (as are known in the art), and camelid antibodies (see, for example, U.S. Pat. Nos. 6,015,695; 6,005,079, 5,874,541; 5,840,526; 5,800,988; and 5,759,808). Antibody can include monoclonal antibody which are characterized by being produced by a single clone of B lymphocytes or by a cell into which the light and heavy chain genes of a single antibody have been transfected. Monoclonal antibodies are produced by methods known to those of skill in the art. Monoclonal antibodies include humanized monoclonal antibodies.

"Antigen" refers to a compound, composition, or substance that may be specifically bound by the products of specific humoral or cellular immunity, such as an antibody molecule or T-cell receptor. Antigens can be any type of molecule including, for example, haptens, simple intermediary metabolites, sugars (e.g., oligosaccharides), lipids, and hormones as well as macromolecules such as complex carbohydrates (e.g., polysaccharides), phospholipids, nucleic acids and proteins.

"Chromophore" refers to a molecule or a part of a molecule responsible for its color. Color arises when a molecule absorbs certain wavelengths of visible light and transmits or reflects others. A molecule having an energy difference between two different molecular orbitals falling within the range of the visible spectrum may absorb visible light and thus be aptly characterized as a chromophore. Visible light incident on a chromophore may be absorbed thus exciting an electron from a ground state molecular orbital into an excited state molecular orbital.

"Conjugating," "joining," "bonding," "coupling" or "linking" are used synonymously to mean joining a first atom or molecule to another atom or molecule to make a larger molecule either directly or indirectly.

"Conjugate" refers to two or more molecules that are covalently linked into a larger construct. In some embodiments, a conjugate includes one or more biomolecules (such as peptides, nucleic acids, proteins, enzymes, sugars, polysaccharides, lipids, glycoproteins, and lipoproteins) covalently linked to one or more other molecules, such as one or more other biomolecules. In other embodiments, a conjugate includes one or more specific-binding molecules (such as antibodies and nucleic acid sequences) covalently linked to one or more detectable labels (haptens, enzymes and combinations thereof). In other embodiments, a conjugate includes one or more latent reactive moieties covalently linked to detectable labels (haptens, chromophore moieties, fluorescent moieties).

"DABSYL" refers to 4-(dimethylamino) azobenzene-4'-sulfonamide, a yellow-orange chromophore.

"Derivative" refers to a compound that is derived from a similar compound by replacing one atom or group of atoms with another atom or group of atoms.

"Epitope" refers to an antigenic determinant. These are particular chemical groups or contiguous or non-contiguous peptide sequences on a molecule that are antigenic, that is, that elicit a specific immune response. An antibody binds a particular antigenic epitope.

"Enhanc(e/er/ement/ing)" An enhancer or enhancing reagent is any compound or any combination of compounds sufficient to increase the catalytic activity of an enzyme, as compared to the enzyme activity without such compound(s). Enhancer(s) or enhancing reagent(s) can also be defined as a compound or combination of compounds that increase or accelerate the rate of binding an activated conjugate to a receptor site. Enhanc(e/ement/ing) is a process by which the catalytic activity of an enzyme is increased by an enhancer, as compared to a process that does not include such an enhancer. Enhanc(e/ement/ing) can also be defined as increasing or accelerating the rate of binding of an activated conjugate to a receptor site. Enhanc(e/ement/ing) can be measured visually, such as by scoring by a pathologist. In particular embodiments, scores range from greater than 0 to greater than 4, with the higher number indicating better visual detection. More typically, scores range from greater than 0 to about 4++, such as 1, 1.5, 2, 2.5, 3, 3.5, 3.75, 4, 4+, and 4++. In addition, enhanc(e/ement/ing) can be measured by determining the apparent $V_{max}$ of an enzyme. In particular embodiments, the term encompasses apparent $V_{max}$ values (measured as optical density/minute) ranging from greater than 0 mOD/min to about 400 mOD/min, such as about 15 mOD/min, 18 mOD/min, about 20 mOD/min, about 40 mOD/min, about 60 mOD/min, about 80 mOD/min, about 100 mOD/min, about 120 mOD/min, about 140 mOD/min, about 160 mOD/min, about 200 mOD/min, about 250 mOD/min, about 300 mOD/min, about 350 mOD/min, and about 400 mOD/min. More typically, the Vmax ranges from greater than 0 mOD/min to about 160 mOD/min, such as about 20 mOD/min, about 40 mOD/min, about 60 mOD/min, about 80 mOD/min, about 100 mOD/min, about 120 mOD/min, about 140 mOD/min, and about 160 mOD/min. In addition, enhancement can occur using any concentration of an enhancer greater than 0 mM. Reference is made to US Pat. Publ. No. 2012/0171668, which discloses enhancers useful within the present disclosure.

"Functional group" refers to a specific group of atoms within a molecule that is responsible for the characteristic chemical reactions of the molecule. Exemplary functional groups include, without limitation, alkane, alkene, alkyne, arene, halo (fluoro, chloro, bromo, iodo), epoxide, hydroxyl, carbonyl (ketone), aldehyde, carbonate ester, carboxylate, ether, ester, peroxy, hydroperoxy, carboxamide, amine (primary, secondary, tertiary), ammonium, imide, azide, cyanate, isocyanate, thiocyanate, nitrate, nitrite, nitrile, nitroalkane, nitroso, pyridyl, phosphate, sulfonyl, sulfide, thiol (sulfhydryl), and disulfide.

"FWHM" refers to the full width of an absorbance peak at the half maximum absorbance.

"Hapten" refers to a molecule, typically a small molecule, which can combine specifically with an antibody, but typically is substantially incapable of being immunogenic on its own.

"Linker" refers to a molecule or group of atoms positioned between two moieties. For example, a signaling conjugate may include a chemical linker between the chromophore moiety and a latent reactive moiety. Typically, linkers are bifunctional, i.e., the linker includes a functional group at each end, wherein the functional groups are used to couple the linker to the two moieties. The two functional groups may be the same, i.e., a homobifunctional linker, or different, i.e., a heterobifunctional linker.

"MG" refers to Malachite green.

"Moiety" refers to a fragment of a molecule, or a portion of a conjugate.

"Molecule of interest" or "Target" each refers to a molecule for which the presence, location and/or concentration is to be determined. Examples of molecules of interest include proteins and nucleic acid sequences.

"Multiplex, -ed, -ing" refers to detecting multiple targets in a sample concurrently, substantially simultaneously, or sequentially. Multiplexing can include identifying and/or quantifying multiple distinct nucleic acids (e.g. DNA, RNA, mRNA, miRNA) and polypeptides (e.g. proteins) both individually and in any and all combinations.

"Proximal" refers to being situated at or near the reference point. As used herein, proximal means within about 5000 nm, within about 2500 nm, within about 1000 nm, within about 500 nm, within about 250 nm, within about 100 nm, within about 50 nm, within about 10 nm, or within about 5 nm of the reference point.

"Reactive groups" refers to a variety of groups suitable for coupling a first unit to a second unit as described herein. For example, the reactive group might be an amine-reactive group, such as an isothiocyanate, an isocyanate, an acyl azide, an NHS ester, an acid chloride, such as sulfonyl chloride, aldehydes and glyoxals, epoxides and oxiranes, carbonates, arylating agents, imidoesters, carbodiimides, anhydrides, and combinations thereof. Suitable thiol-reactive functional groups include haloacetyl and alkyl halides, maleimides, aziridines, acryloyl derivatives, arylating agents, thiol-disulfide exchange reagents, such as pyridyl disulfides, TNB-thiol, and disulfide reductants, and combinations thereof. Suitable carboxylate-reactive functional groups include diazoalkanes, diazoacetyl compounds, carbonyldiimidazole compounds, and carbodiimides. Suitable hydroxyl-reactive functional groups include epoxides and oxiranes, carbonyldiimidazole, N,N'-disuccinimidyl carbonates or N-hydroxysuccinimidyl chloroformates, periodate oxidizing compounds, enzymatic oxidation, alkyl halogens, and isocyanates. Aldehyde and ketone-reactive functional groups include hydrazines, Schiff bases, reductive amination products, Mannich condensation products, and combinations thereof. Active hydrogen-reactive compounds include diazonium derivatives, Mannich condensation products, iodination reaction products, and combinations thereof. Photoreactive chemical functional groups include aryl azides, halogenated aryl azides, benzophonones, diazo compounds, diazirine derivatives, and combinations thereof.

"Rhod" refers to Rhodamine, a structural class of chromophores that differ by their various substituents. In addition, the compound tetramethylrhodamine is often referred to as "rhodamine."

"Sample" refers to a biological specimen containing genomic DNA, RNA (including mRNA), protein, or combinations thereof, obtained from a subject. Examples include, but are not limited to, peripheral blood, urine, saliva, tissue biopsy, surgical specimen, amniocentesis samples and autopsy material.

"Specific binding moiety" refers to a member of a specific-binding pair. Specific binding pairs are pairs of molecules that are characterized in that they bind each other to the substantial exclusion of binding to other molecules (for example, specific binding pairs can have a binding constant that is at least 103 $M^{-1}$ greater, 104 $M^{-1}$ greater or 105 $M^{-1}$ greater than a binding constant for either of the two members of the binding pair with other molecules in a biological sample). Particular examples of specific binding moieties include specific binding proteins (for example, antibodies, lectins, avidins such as streptavidins, and protein A), nucleic acid sequences, and protein-nucleic acids. Specific binding moieties can also include the molecules (or portions thereof) that are specifically bound by such specific binding proteins. Exemplary specific binding moieties include, but are not limited to, antibodies, nucleotides, oligonucleotides, proteins, peptides, or amino acids.

"TAMRA" refers to Carboxytetramethylrhodamine, a reddish (i.e., variations on red to magenta) rhodamine chromophore.

"TMR" refers to Tetramethylrhodamine, a reddish rhodamine chromophore. "TSA" refers to tyramide signal amplification.

"TYR" refers to tyramine, tyramide, tyramine and/or tyramide derivatives.

II. Imaging Systems and Imaging Techniques

FIG. 1 is a front view of an imaging system 100 for imaging a specimen located on a specimen-bearing microscope slide 134 in accordance with one embodiment. The imaging system 100 can include a microscope 110, a multispectral imaging apparatus 112 ("imaging apparatus 112"), and a display 114. The imaging apparatus 112 can include an image capture device 120 and a processing device 122. The image capture device 120 is mounted on the microscope 110 and is in communication with the processing device 122. Oculars 128, 130 can be used to directly view a biological specimen while the display 114 displays an output 144 that provides increased contrast between features of interest for IHC, ISH or the like. The features of interest can be targets (e.g., nucleic acids, antigens, etc.), labels (e.g., chromogenic labels, fluorescent labels, luminescent labels, radiometric labels, etc.), or cell components or structures.

The microscope 110 can be used to conveniently locate a region of interest of the specimen. After locating the region of interest, the specimen can be analyzed using the output 144, which can include image(s) and/or video, as well tissue preparation information, stain information, patient information, reports, or the like. Video (or images displayed at a near-video rate) can minimize, limit, or substantially eliminate delays between direct viewing using the microscope 110 and non-direct viewing using the display 114.

The imaging apparatus 112 can include an illuminator 140 (shown in phantom) that sequentially illuminates the specimen to separate signals from stains. For example, the specimen can be illuminated with different wavelengths, peak emissions, and/or wavebands of electromagnetic energy to separate signals from a dual stain. The image capture device 120 can capture a set of images of the specimen. The set of images is sent to the processing device 122 to produce the output 144.

Figure 2B:
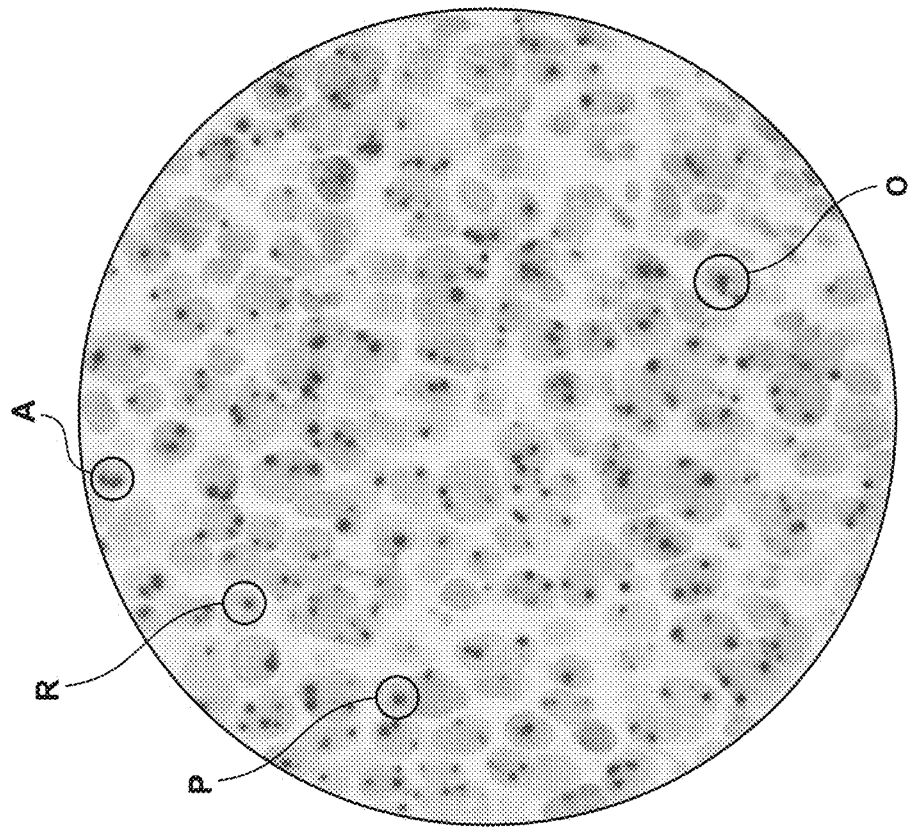
FIG. 2(B) shows a bright field photomicrograph of the biological specimen of FIG. 2(A).
Figure 2A:
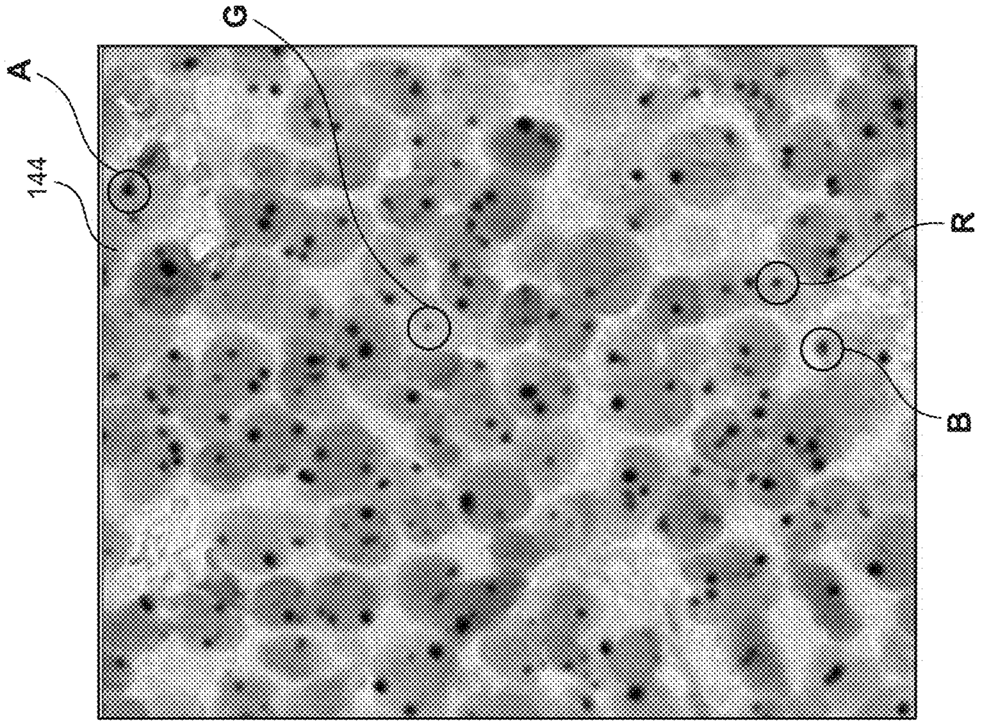
FIG. 2(A) shows a digitally enhanced image of a biological specimen in accordance with an embodiment of the disclosed technology.

FIG. 2(A) shows a digitally enhanced image in the form of a false-color composite image 144 of a human specimen. FIG. 2(B) shows a bright field image viewable through a microscope (e.g., microscope 110 of FIG. 1) of the same tissue. Color contrast between different color spots in the image 144 of FIG. 2(A) is greater than the naturally-occurring color contrast of the same spots in FIG. 2(B). As such, a pathologist can quickly and accurately identify spots in FIG. 2(A) and may have difficulty differentiating the spots in FIG. 2(B).

Referring to FIG. 2(A), a red spot is highlighted by a circle (R), and a green spot is highlighted by a circle (G). Adjacent spots within circle (A) can be clearly distinguished from each other as separate red and green spots. Overlapping red and green spots can appear blue as highlighted by a circle (B). A user can select the false colors of the composite image based on, for example, preferences, desired signal separation, or the like. For example, the green spots can be redefined to be blue and the red spots can be redefined to be yellow.

The red dots in FIG. 2(A) correspond to purple spots in FIG. 2(B), and the green dots in FIG. 2(A) correspond to red spots in FIG. 2(B). Referring now to FIG. 2(B), a dual stain has been applied to the tissue and can include first chromogenic moieties and second chromogenic moieties. A red spot corresponding to the first chromogenic moiety is highlighted by a circle (R) and a purple feature is highlighted by a circle (P). It is difficult to distinguish between adjacent features within a circle (A), and it is difficult to identify and characterize overlapping red and purple features as highlighted by a circle (O). Accordingly, it may difficult to rapidly and accurately detect, identify, characterize, count, or perform other tasks to score the tissue, whereas the adjacent spots within circle (A) of FIG. 2(A) can be clearly distinguished from each other, and red and green spots within circles (R) and (G) of FIG. 2(A) can be accurately identified.

Figure 3:
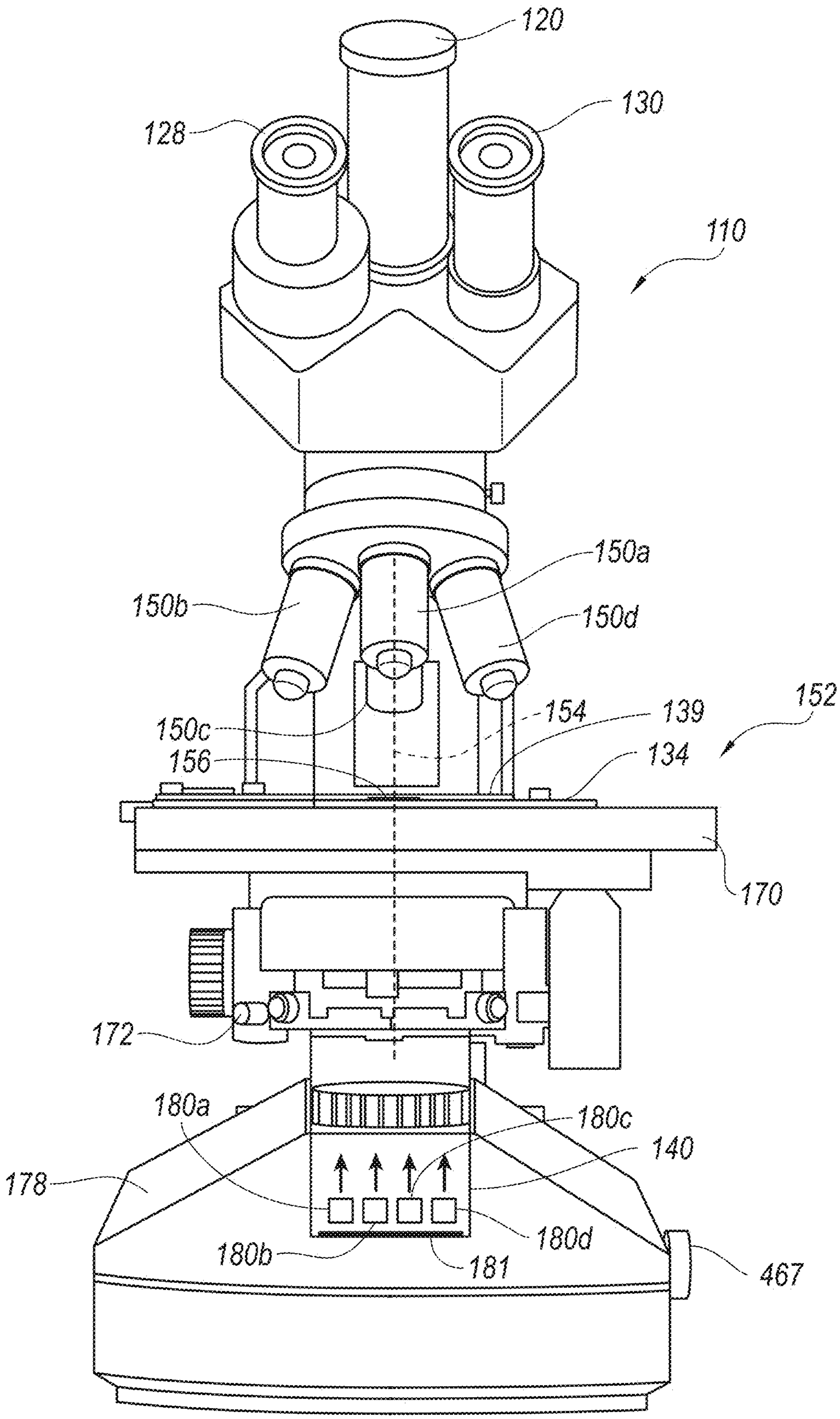
FIG. 3 is a front view of a microscope and components of a multi-spectral imaging apparatus coupled to the microscope in accordance with an embodiment of the disclosed technology.

FIG. 3 is a front view of components of the imaging apparatus and the microscope 110. The microscope 110 can include objective lenses 150*a-d* and a holder device 152. The objective lenses 150*a-d* are positionable along an optical path or axis 154 extending from the illuminator 140 (shown in a cutaway view) to the image capture device 120. The holder device 152 can include, without limitation, a stage 170, holder elements (e.g., clips) for holding a microscope slide 134 positioned upon the stage 170, and a positioning mechanism 172 for moving the stage 170. The stage 170 can have an aperture (not shown) positioned generally along the optical path 154. The positioning mechanism 172 can include, without limitation, one or more knobs (e.g., fine adjustment knobs, coarse adjustment knobs, X-direction knobs, Y-direction knobs, etc.), drive mechanisms, or the like. The configuration, components, and operation of the microscope 110 can be selected based on the tissue analysis to be performed.

The illuminator 140 can be housed in a base 178 and is positioned on the backside of the specimen-bearing microscope slide 134 to produce light that is transmitted through a specimen 156. The illustrated specimen 156 is between a coverslip 139 and the slide 134. In some embodiments, the illuminator 140 can include energy emitters in the form of color light sources 180*a*, 180*b*, 180*c*, 180*d* (collectively "light sources 180") and a reflector 181. Each light source 180 can produce light (represented by arrows) for illuminating a portion of the specimen 156 positioned within the microscope field of view. Different color light can be sequentially captured by the image capture device 120 without the use of filters. In some embodiments, the illuminator 140 can be built into the microscope 110. In other embodiments, the illuminator 140 can be external to the microscope 110 with light coupled into the microscope 110 via an fiber optic or other type of light guide. For example, the illuminator 140 can be an external panel of LEDs connected to the microscope 110 via a plurality of optic fibers. The illuminators can also include drivers, switches, potentiometers, power sources, and other electrical devices.

For chromogenic microscopy, emitted radiation wavelength(s) or waveband(s) from each of the light sources 180 can correspond with, or at least overlap with, absorption wavelength(s) or waveband(s) associated with chromogens. The light sources 180 can have mean or peak wavelengths in different regions of the spectrum (including infrared, visible, ultraviolet, etc.) for increased multiplexing capability. The mean wavelength, peak wavelength, emission spectrum, light intensity, color coordinate, and/or wavelength(s)/waveband(s) of the sources can be selected based on, for example, the characteristics of the stains. In some embodiments, each source 180 can be a spectrally-discrete light source with a mean or peak wavelength within an absorbance waveband of one of the chromogens.

Each source 180 can include, without limitation, one or more LEDs (e.g., edge emitting LEDs, surface emitting LEDs, super luminescent LEDs, or the like), laser diodes, electroluminescent light sources, incandescent light sources, cold cathode fluorescent light sources, organic polymer light sources, lamps, inorganic light sources, or other suitable light-emitting sources. The sources 180 can be external or internal to the microscope 110. The light sources 180 can be spectrally narrow light sources having a spectral emission with a second full-width half-max (FWHM) of between about 30 nm and about 250 nm, between about 30 nm and about 150 nm, between about 30 nm and about 100 nm, or between about 20 nm and about 60 nm. Other spectral emissions can be generated.

In LED embodiments, the light source 180*a* can be a blue light LED having a maximum intensity at a wavelength in the blue region of the spectrum. For example, the blue light LED 180*a* can have a peak wavelength and/or mean wavelength in a range of about 430 nanometers to about 490 nanometers (nm). The light source 180*b* can be a green light LED having a maximum intensity at a wavelength in the green region of the spectrum. For example, the green light LED 180*b* can have a peak wavelength and/or mean wavelength in a range of about 490-560 nm. The light source 180*c* can be an amber light LED having a maximum intensity at a wavelength in the amber region of the spectrum. For example, the amber light LED 180*c* can have a peak wavelength and/or mean wavelength in a range of about 570-610 nm. The light source 180*d* can be a red light LED having a maximum intensity at a wavelength in the red region of the spectrum. For example, the red light LED 180*d* can have a peak wavelength and/or mean wavelength in a range of about 620-800 nm. The number, color, and location of the LED light sources can be selected based on the biomarkers of the specimen.

It is often time consuming and difficult to use multiple single-label filters and lamps to detect all the labels in the multiplexing assay. Additionally, filters, such as long-pass filter, may cause bleedthrough and produce relatively bright image backgrounds. Multiband filters can be used for multiplexing but often require expensive color cameras, expensive color wheels, and/or complicated software. Filters also may lead to undesirable signal-to-noise ratios. Moreover, it may be difficult to selected appropriate dyes, illumination sources, and filters, especially in fluorescence microscopy in which stray light has to be minimized while maximizing transmission of the excitation emission. Advantageous, LED light sources 180 can be inexpensive and can eliminate one or more of the drawbacks associated with filters by pulsing the LEDs 180 to reliably produce a set of high quality specimen images as discussed in connection with FIGS. 5A-D.

For mixed light, emissions from two or more of the LED light sources 180 can be combined, thereby producing processing flexibility. For example, blue, green, and red LEDs 180*a-c* can produce mixed light that can appear white to produce a bright field image. Different arrangements of light sources 180 can be selected to achieve the desired illumination field. LED light sources 180 can be part of or form a light emitting panel. The number, colors, and positions of the LEDs can be selected to achieve desired illumination.

In non-LED embodiments, the illuminator 140 can include, without limitation, one or more lasers, halogen light sources, incandescent sources, or other devices capable of emitting light. In some embodiments, each source 180 can include a light emitter (e.g., a halogen lamp incandescent light source, etc.) that outputs white light and a filter that transmits certain wavelength(s) or waveband(s) of the white light. The source's excitation wavelength(s), peak emission, or waveband(s) can be matched to characteristics of the stain. The light intensity, pulse sequence (if any), and shape of illumination field from the light source may be determined, either empirically or modeled mathematically, to yield the desired illumination.

The image capture device 120 is positioned along the optical path 154 and can capture images (e.g., low resolution digital images, high resolution digital images, multispectral images, spectrally discrete images, etc.) of the specimen 156. The image capture device 120 can include, without limitation, one or more cameras (e.g., analog cameras, digital cameras, etc.), optics (e.g., one or more lenses, focus lens groups, etc.), imaging sensors (e.g., charge-coupled devices (CCDs), complimentary metal-oxide semiconductor (CMOS) image sensors, or the like), or the like. A plurality of lenses that cooperate to provide on-the-fly focusing and a CCD sensor can capture multispectral digital images, monochrome digital images, or other types of digital images. To provide monochrome digital images, the image capture device 120 can include, without limitation, one or more monochrome cameras (e.g., a black-and-white camera, a black-and-white video camera, etc.). To provide color images, the image capture device 120 can be a multispectral camera. The acquired channels can be unmixed using spectral deconvolution algorithms. Other types of image capture devices can be used.

Referring again to FIG. 1, the processing device 122 can command the illuminator 140 and image capture device 120 such that the image capture device 120 is synchronized with pulsing of the light sources 180 (FIG. 3). The processing device 122 can generally include, without limitation, a programmed processor 190 ("processor 190") and a storage device 210. (Internal components are shown in phantom line.) The processing device 122 can include, in addition to hardware, code that creates an execution environment for the computer program in question, e.g., code that constitutes a program, processor firmware, a protocol stack, a database management system, an operating system, a cross-platform runtime environment, a virtual machine, or a combination of one or more of them.

The processor 190 can be all kinds of apparatus, device, and machine for processing data, including by way of example a programmable microprocessor, system on a chip, circuitry, or combinations of the foregoing. For example, the processor 190 can include special purpose logic circuitry 191, e.g., an FPGA (field programmable gate array) or an ASIC (application-specific integrated circuit) for processing data (e.g., images, video, etc.) and can output data, such as contrast enhanced color data for generating a video of the specimen displayed at a frame rate equal to or greater than about 2 frames/second, 5frames/second, 10 frames/second, 30 frames/second, or other desired frame rates. The processor 190 can be selected to achieve a desired frame rate to produce a smooth video when the microscope is moved to locate a new region of the specimen for inspection.

The storage device 210 can include executable instructions that can be executed by the processor 190 to, for example, convert monochrome video/images to false color video/images, redefine colors of video/images (e.g., monochrome video/images, multicolor video/images, etc.), and/or other executable instructions for altering images, classifying features (e.g., classifying spots or other features), or the like. For example, memory of the storage device 210 can store converting instructions executable by the circuitry of the processor 190 to convert specimen images into false color specimen images and to detect features and use a characteristic and/or morphology metric to determine whether detected features corresponds to genes, proteins, chromosomes, or other anatomical structure of interest. Image characteristic metrics can include, for example, color, color balance, intensity, or the like. The processor 190 can execute instructions from the storage device 210 to redefine colors, adjust color balance, and/or adjust intensity to facilitate analysis based on characteristic metrics. Morphology metrics can include, for example, feature size, feature color, feature orientation, feature shape, relation or distance between features (e.g., adjacent features), relation or distance of a feature relative to another anatomical structure, or the like.

The storage device 210 can include a non-transitory, tangible computer readable storage medium, such as computer-readable media that may be encoded with computer-executable instructions (e.g., a computer-readable medium that contains the instructions). Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. A non-transitory storage medium may include a device that is tangible, meaning that the device has a concrete physical form, although the device may change its physical state. Thus, non-transitory refers to a device remaining tangible despite a change in state. In some embodiments, the storage device 210 can be machine-accessible storage medium that includes, for example, recordable/non-recordable media (e.g., ROM; RAM; magnetic disk storage media; optical storage media; flash memory devices; etc.), etc., or any combination thereof capable of storing data, digital images, computer program(s), or the like.

Stored digital images can be contrast enhanced color image data in binary form. The images can also be divided into a matrix of pixels. The pixels can include of a digital value of one or more bits, defined by the bit depth. The digital value may represent, for example, energy, brightness, color, intensity, sound, elevation, or a classified value derived through image processing. Non-limiting exemplary digital image formats include, but are not limited to, bit-mapped, joint pictures expert group (JPEG), tagged image file format (TIFF), and graphics interchange format (GIF), as well as other digital data formats. Video can also be stored by the storage device 210. Stored computer programs may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. In some laboratory setting, the storage device 210 can store a computer program used by multiple computers.

Referring now to FIG. 1, a user can provide input via a selection tool 200, keyboard 202, or other input device coupled to the processing device 122. The selection tool 200 can be used to select a portion of the specimen for enlarging and/or automated analysis. The user can also select individual regions/cellular structures/features of interest using the selection tool 200.

The display 114 is communicatively coupled to the processing device 122 and can be, for example, a LCD (liquid crystal display), LED (light-emitting diode) display, OLED (organic light-emitting diode) display, or other type of display for displaying information to the user. The display 114 can be positioned next to the microscope 110 for convenient viewing. If the microscope 110 is a digital microscope, the digital display 114 can be part of the microscope. In other embodiments, the display 114 can be located at a remote location (e.g., another laboratory). A laboratory technician can operate the microscope 110 while a pathologist at the remote location studies the image 144. Multiple displays can be used to simultaneously display different images, including non-enhanced and enhanced images. The types of displays, locations of displays, and/or number of displays can be selected based on the detection to be performed.

Figure 4:
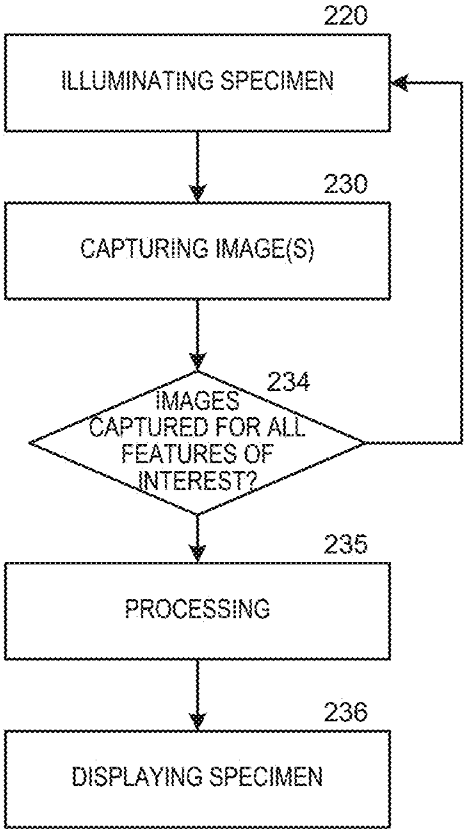
FIG. 4 is a flowchart of a method for producing a digital image of a specimen in accordance with an embodiment of the disclosed technology.

FIG. 4 is a flowchart of one method for producing digitally enhanced images, video, or other output. Generally, light sources output light capable of being absorbed by, or causing emissions from, features of interest. A set of images are captured. Each image can correspond to the specimen being exposed to light from a respective one of the light sources. The set of images can be used to produce a digitally enhanced image/video of the specimen. The method of FIG. 4 is discussed in connection with FIGS. 5(A-E), but it can be used to produce other types of enhanced images.

In block 220, a specimen carried on a microscope slide is exposed to a light source having excitation wavelength(s)/waveband(s) matched to absorption wavelength(s)/waveband(s) of a chromogen. Incident light from the light source can be absorbed by the chromogen. In some embodiments, at least about 20%, 50%, 60%, 70%, 80%, or 90% of the incident light is absorbed by the chromogen. Other percentages of light can also be absorb depending on the stain and characteristics of the light source. For fluorescently stained specimens, the light can cause an excitation emission from the stained features of interest. Chromogenic detection and fluorescence detection are discussed in connection with FIGS. 13(A-B).

At block 230, an image capture device (e.g., image capture device 120 of FIGS. 1 and 3) can capture image(s)/video of the illuminated specimen. For example, a single image of the illuminated specimen can be obtained. In other embodiments, a set of images at various Z-slices or focal planes can be captured and may have varying degrees of sharpness throughout the entire image and/or in specific regions.

Figure 5A:
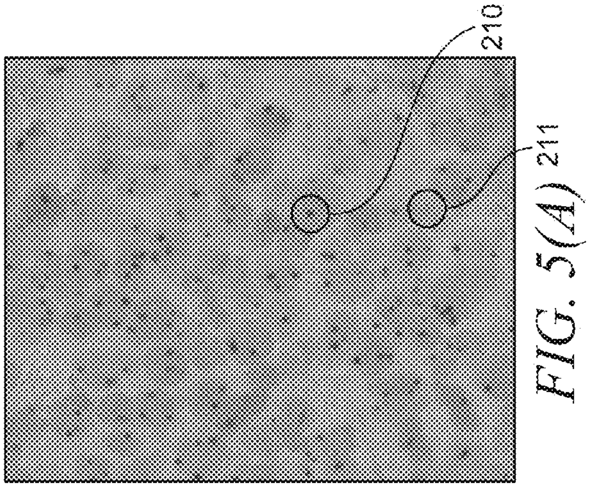
FIGS. 5(A-E) show human tissue stained for identifying non-Hodgkin's Ki-positive large cell lymphoma.
FIG. 5(E) is a false color composite image of the tissue.

When illumination light is absorbed by a chromogen, the light intensity is reduced at that location. FIG. 5(A) shows one captured monochrome image of a specimen illuminated by a blue LED. A target feature in the form of a chromogen 210 can absorb blue light, thus causing the chromogen 210 to appear as a relatively dark spot. Another target feature in the form of a chromogen 211 can be relatively light compared to chromogen 210. This is because the chromogen 211 absorbs less blue light than the chromogen 210.

In decision block 234, if images have not been captured to obtain different intensities for all of the features of interest, then another light source can be used to illuminate an additional feature of interest at block 220 for capturing additional image(s) at block 230. Blocks 220 and 230 can be repeated to produce a set of specimen images. The number of images in a set can be equal or greater to the number of different biomarkers applied to a tissue sample. If a tissue sample has been treated with six stains, a complete set of specimen images can include at least six images. This provides flexibility for performing a wide range of different types of detection techniques. The number of images in a set can be increased or decreased based on the number of biomarkers in the multiplexing assay. In fluorescence analysis, a complete set of monochrome photomicrographs can show variances in fluorescence signals. For example, each monochrome image can have spots corresponding to fluorescence signals of a respective fluorophore.

FIGS. 5(A-D) show one complete set of monochrome photomicrographs in which intensities of the chromogens vary between images. In some embodiments, the set of images can include a monochrome image of the specimen being exposed to light from a blue LED (FIG. 5(A)), a monochrome image of the specimen being exposed to light from a green LED (FIG. 5(B)), a monochrome image of the specimen being exposed to light from an amber LED (FIG. 5(C)), and a monochrome image of the specimen being exposed to light from a red LED (FIG. 5(D)).

Below is a illumination sequence for the light sources 180 of FIG. 3 that can be used to produce the images of FIGS. 5(A-E) in about 0.1 second.

Figure 5B:
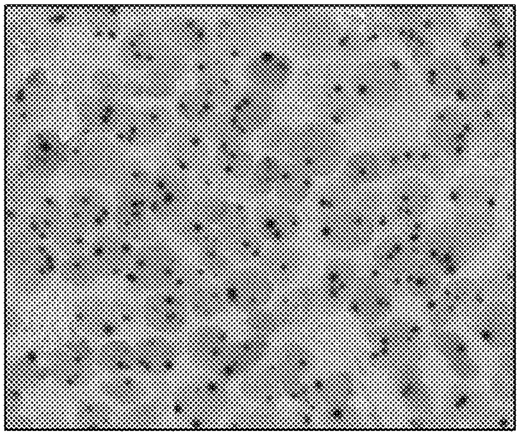
Figure 5C:
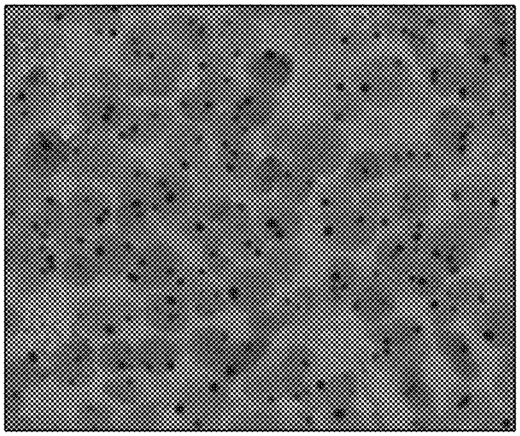
Figure 5D:
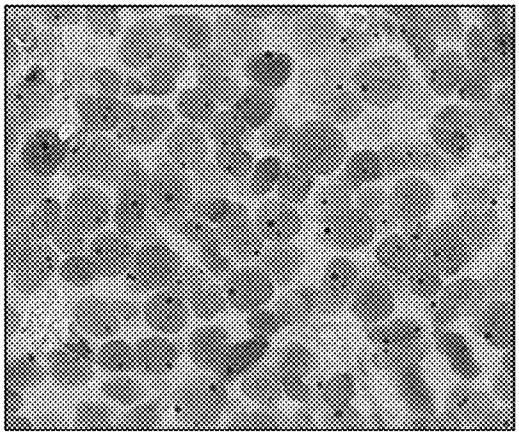
Figure 5E:
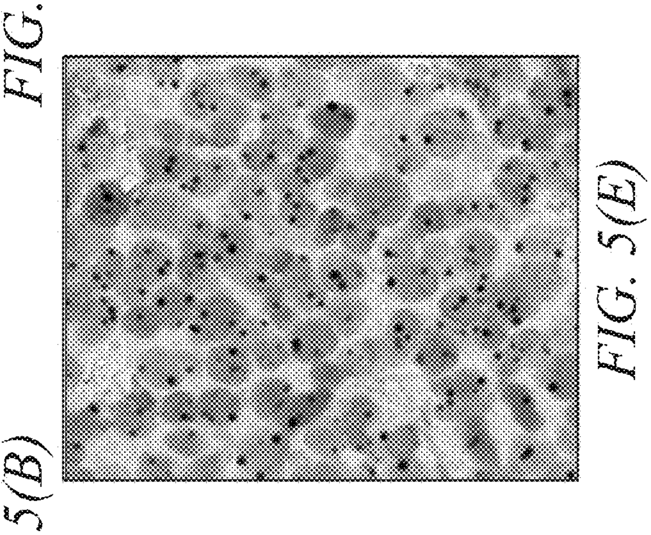

| TIME (Second) | Blue LED | Green LED | Amber LED | Red LED | Image |
|---|---|---|---|---|---|
| 0-0.02 | ON | OFF | OFF | OFF | FIG. 5A |
| 0.02-0.04 | OFF | ON | OFF | OFF | FIG. 5B |
| 0.04-0.06 | OFF | OFF | ON | OFF | FIG. 5C |
| 0.06-0.8 | OFF | OFF | OFF | ON | FIG. 5D |
| 0.08-0.1 | OFF | OFF | OFF | OFF | FIG. 5E |

At 0-0.02 second, the blue LED 180*a* (FIG. 3) illuminates the specimen to produce the specimen image of FIG. 5(A). At 0.02-0.04 second, the green LED 180*b* (FIG. 3) illuminates the specimen to produce the specimen image of FIG. 5(B). At 0.04-0.06 second, the amber LED 180*c* (FIG. 3) illuminates the specimen to produce the specimen image of FIG. 5(C). At 0.06-0.08 second, the red LED 180*d* (FIG. 3) illuminates the specimen to produce the specimen image of FIG. 5(D). At 0.08-0.1 second, the processing device 122 can digitally process the set of images to produce the image of FIG. 5E. Other time periods and sequence patterns can also be used.

In decision block 234, if a complete set of images has been generated, then the set of images is used to produce an enhanced image/video. In block 236, the set of images is processed to, for example, enhance contrast, unmix spectral images, classify features, combinations thereof, or the like. To enhance color contrast, images can be reclassified. To unmix spectral image, a classifier can identify features of interest and reclassify the image to produce a set of processed images. The set of processed images can be combined to produce one or more contrast enhanced color images, spectrally deconvolved images, or the like. Linear mixing methods, non-linear mixing methods, or other mixing techniques known in the art, as well as digital processing, can be used to produce a desired output image(s)/video.

The image/video can be displayed at block 236. In false color modes, each black-and-white monochrome image of FIGS. 5(A-D) can be converted into a color monochrome image (i.e., false color monochrome images). The set of color monochrome images can be combined to produce the composite image of FIG. 5(D). Linear mixing methods, non-linear mixing methods, or other mixing techniques known in the art can be used to produce a multispectral image. In some embodiments, the black-and-white image of FIG. 5(A) is converted into a red monochrome image, the black-and-white monochrome image of FIG. 5(C) is converted into a green monochrome image, and the black-and-white monochrome image of FIG. 5(D) is converted into a blue monochrome image. The color conversion can be selected based on the number of targeted features to be detected.

Figure 6:
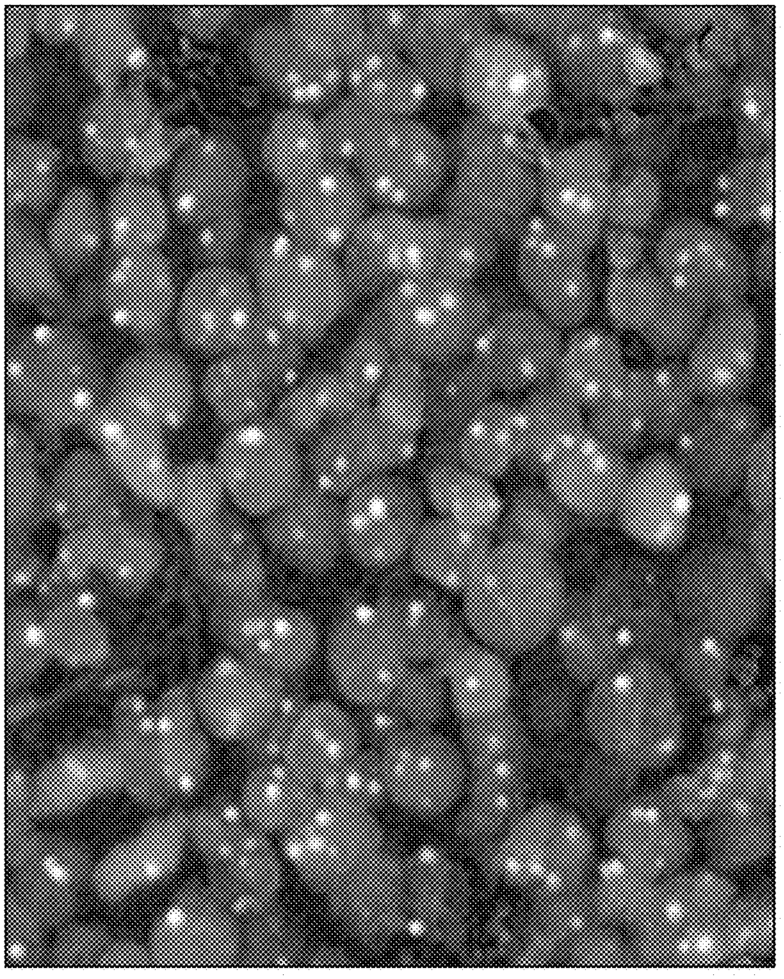
FIG. 6 shows an enhanced pseudoflourence image of human tissue stained for identifying non-Hodgkin's Ki-positive large cell lymphoma in accordance with an embodiment of the disclosed technology.

To produce pseudofluorescence images, the captured monochrome images can be converted into dark-field images. The dark-field images can be recombined to produce a pseudofluorescence image. By way of example, the images of FIGS. 5(A-C) can be converted into a red monochrome image, a green monochrome image, and a blue monochrome image, respectively. The false color images (i.e., the red, green, and blue monochrome images) can be inverted to produce dark-field images, which are combined to produce the image of FIG. 6. The pseudofluorescence image can be rapidly generated and used as frames of a video.

In spectral deconvolve imaging, a classifier can be used to process the images of FIGS. 5(A-D). Features of interest can be identified in the set of images. The classifier can detect the abundance features of interest and then reclassify and/or adjust the images. In some embodiments, the classifier can be trained using training slides. Each training slide can carry a stained specimen. A set of images for an illumination sequence can be generated for each slide, and the illumination sequence can include sequentially illuminating the specimen with different color light. Each set of images can be analyzed to determine information about the stain, such as pectral information that can be used to detect stained features. In some embodiments, an detection algorithm, detection protocol, or other detection means can generated for each stain. Additional training slides can be used to produce additional detection algorithms, detection protocols, or other detection means for detecting features stained with other stains. One or more additional classifier can be generated based on the detection algorithms, detection protocols, or other detection means produced using the training sides. Alternatively, one or more classifiers can be generated by computer modeling or other suitable technique.

Referring again to FIG. 1, the imaging system 100 can perform the method of FIG. 4. In some embodiments, the processor device 122 can automatically detect spots/dots/features of interest. For example, dot detection can be performed by running the enhanced image of FIGS. 2A and 5E though a number of filters. In one embodiment, the filters are Difference of Gaussian ("DOG") filters where each filter size is selected based on the expected size of the dots/clumps of dots to be detected. Other filters can also be used. The enhanced images can be analyzed using analysis software. For example, color can be measured as red, blue, and green values; hue, saturation, and intensity values can be determined. The specimens also can be evaluated qualitatively, semi-quantitatively, and/or quantitatively. Qualitative assessment can include assessing the staining intensity, identifying the positively-stained cells and the intracellular compartments involved in staining, and evaluating the overall sample or slide quality. Separate evaluations can be performed on the test samples and this analysis can include a comparison to known average values to determine if the samples represent an abnormal state. Analysis computer program can be used to identify features and quantitatively determine a score for the slide and/or regions of interest. The computer program can be written in any form of programming language, including compiled or interpreted languages, declarative or procedural languages, and it can be deployed in any form, including as a standalone program or as a module, component, subroutine, object, or other unit suitable for use in a computing environment.

Figure 7:
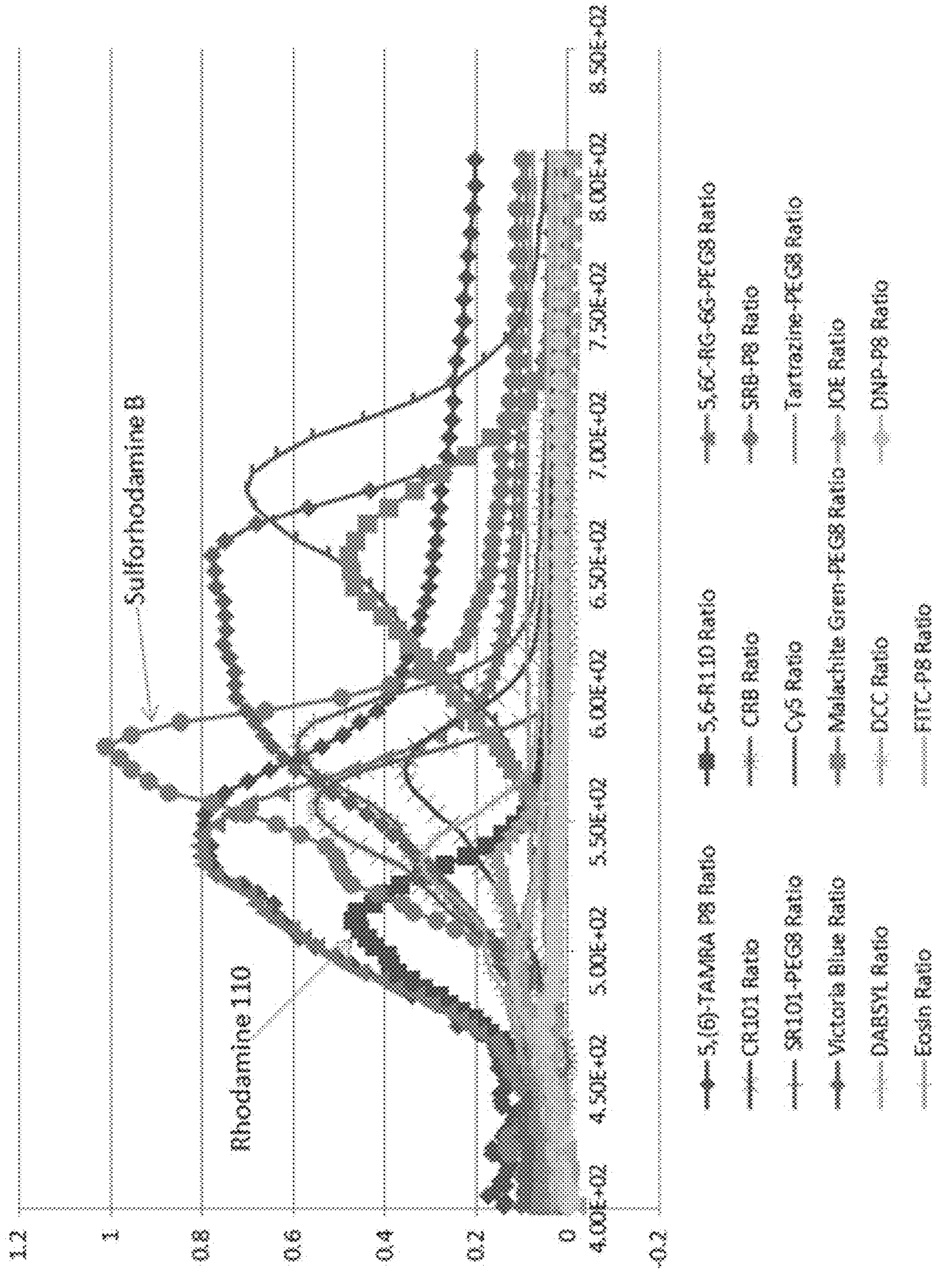
FIG. 7 is a plot of wavelength versus absorption for various stains.

FIG. 7 is a plot of wavelength versus absorption for deposited dyes. Each of dyes has a maximal absorbance. Sulforhodamine B that has a maximal absorbance between about 560 nm and 570 nm. A specimen stained with Sulforhodamine B can be exposed to light having a wavelength between about 560 nm and 570 nm or a waveband of about 560 nm and 570 nm. The characteristics of the light sources can be selected based on the characteristics of the dyes. For example, an illuminator can have seventeen LEDs, each selected to match absorbance of one of the dyes. Storage devices disclosed herein can include one or more maps or lookup tables for dye characteristics. A reader (e.g., a bar code reader) can obtain information from the slide to determine appropriate wavelength(s) and/or waveband(s) for illuminating the tissue specimen. Alternatively, a user can input information about the specimen and/or dyes using, for example, a keyboard or other input device.

III. Imaging Systems with a Scanner

Figure 8:
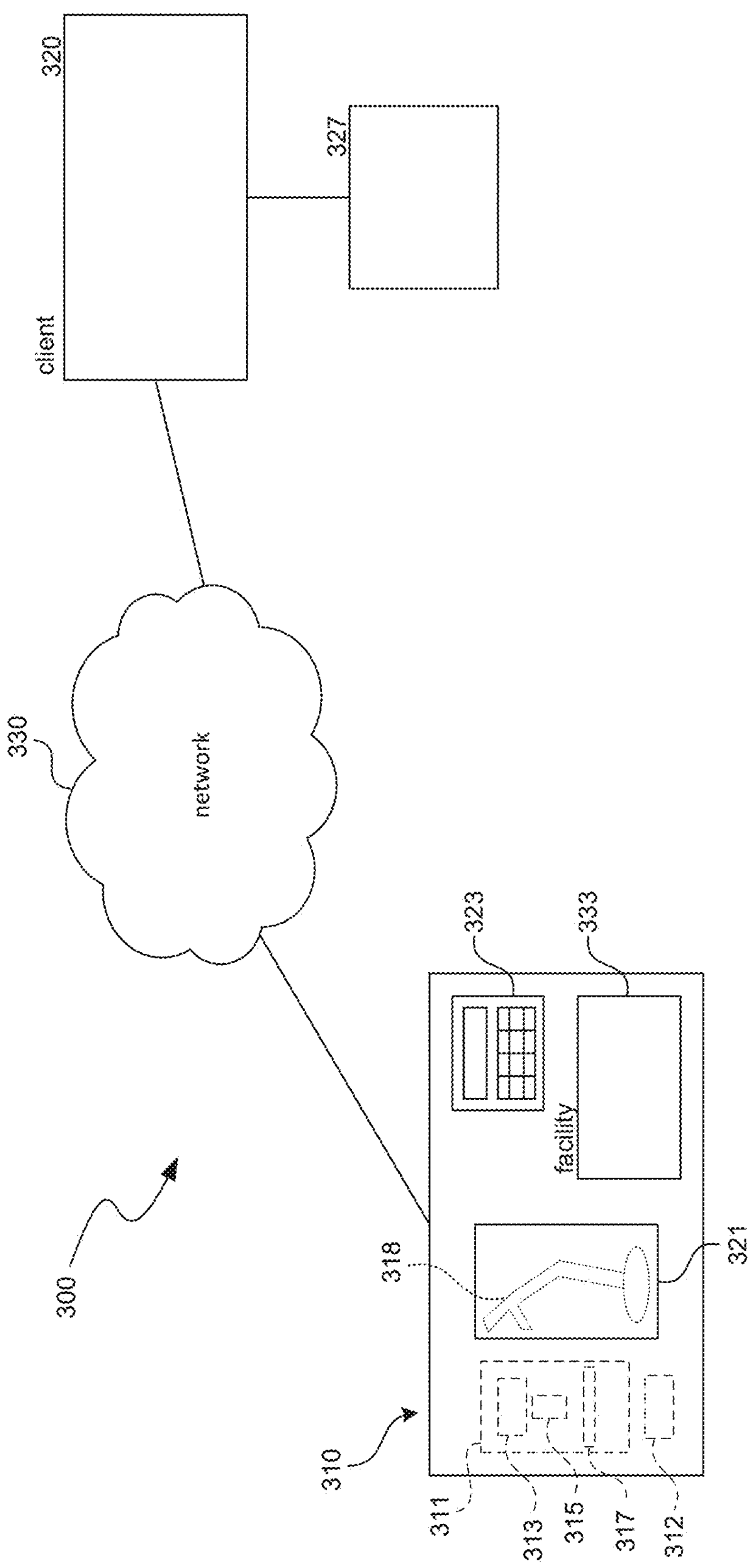
FIG. 8 illustrates a computer-based system for analyzing tissue specimens in accordance with an embodiment of the disclosed technology.

FIG. 8 illustrates a computer-based system 300 and environment for analyzing tissue specimens in accordance with an embodiment of the disclosed technology. The system 300 includes a digital scanner in the form of a multi-spectral imaging apparatus 310 and client computer system 320. Specimen-bearing microscope slides can be loaded into the imaging apparatus 311 that can provide narrow waveband or wavelength imaging, bright field imaging, and/or fluorescent imaging of the specimen-bearing microscope slides. In narrow waveband or wavelength imaging, the imaging apparatus 311 can include an illuminator 312 and a scanner head to perform the method discussed in connection with FIGS. 1-4. The imaging apparatus 311 may further be a whole-slide scanner. One example whole-slide scanner can be the VENTANA iScan HT product of the assignee Ventana Medical Systems, Inc. (Tucson, AZ) that is modified with an illuminator with multiple light sources (e.g., illuminator 140 of FIG. 3). The imaging system 310 can include a slide handler mechanism 318 movable to deliver one or more microscopes slides to the multi-spectral imaging apparatus and movable to remove one or more microscope slides from the multi-spectral imaging apparatus 311. The slide handler mechanism 318 can include one or more robotic arms, XYZ slide handlers, gripping mechanisms, transport devices, or the like capable of transporting microscope slides between various locations. The images can be sent to the client computer system 320 either through a direct connection (not shown) or via a network 330. The client computer system 320 display images to users, such as pathologists, histotechnologists, or the like.

The imaging apparatus 311 can include, without limitation, one or more image capture devices 313, one or more lenses 315, and facilities. (Internal components of the imaging system 310 are shown in phantom line.) Image capture device 313 can include, without limitation, a digital imager (e.g., a digital camera) with an optical system imaging sensors (e.g., a charge-coupled device (CCD), a complimentary metal-oxide semiconductor (CMOS) image sensor, or the like), or the like. Lenses 315 can cooperate to provide focusing (e.g., auto-focusing). In some embodiments, the image capture device 313 has red, green and blue color channels for producing multispectral color images. The optical system 315 can include multiple and/or tunable filters, and multispectral or color image channels are created by acquiring multiple images using different filters and/or filter settings. One method of producing a color enhanced image includes determining one or more scan areas comprising a region or slide position of the microscope slide that includes at least a portion of the specimen. The scan area may be divided into a plurality of snapshots. An image can be produced by combining the snapshots. The combined image of the whole specimen or slide can have snapshots with images in the RGB channels at the same or different focal planes.

The imaging apparatus 311 can also include an access door 321 and a controller 323. Slides can be loaded into the imaging system 310 via the access door 321, and the controller 323 can be used to control operation of the imaging apparatus 311. The controller 323 can include one or more programmable processors, storage devices, or the like.

The client computer system 320 can include a desktop computer, a laptop computer, a tablet, or the like and can include digital electronic circuitry, firmware, hardware, memory, a computer storage medium, a computer program, a processor (including a programmed processor), or the like and can store digital images in binary form. The images can also be divided into a matrix of pixels and displayed via a display 327.

A network 330 or a direct connection interconnects the imaging system 310 and the client computer system 320. The network 330 may include, without limitation, one or more gateways, routers, bridges, combinations thereof, or the like. The network 330 may include one or more servers and one or more websites that are accessible to users and can be used to send and receive information that the client computer system 320 can utilize. A server may include, without limitation, one or more associated databases for storing information (e.g., digital images, algorithms, staining protocols, or the like). The network 330 can include, but is not limited to, data networks using the Transmission Control Protocol (TCP), User Datagram Protocol (UDP), Internet Protocol (IP) and other data protocols. The client computer system 320 can perform the methods and techniques discussed herein. Components and features of the client computer system 320 can be mixed and matched with other components and features of the disclosed technology.

IV. Techniques for Detecting a Target in a Sample

Imaging system disclosed herein can provide enhanced digital images of tissue samples stained with a wide range of stains used for IHC, ISH, or other analyses. In various embodiments, substances applied to the tissue samples can include, without limitation, stains, wetting agents, probes, antibodies (e.g., monoclonal antibodies, polyclonal antibodies, etc.), antigen recovering fluids (e.g., aqueous- or non-aqueous-based antigen retrieval solutions, antigen recovering buffers, etc.), solvents (e.g., alcohol, limonene, or the like), or the like. Stains include, without limitation, dyes, hematoxylin stains, eosin stains, conjugates of antibodies or nucleic acids with detectable labels such as haptens, enzymes or fluorescent moieties, or other types of substances for imparting color and/or for enhancing contrast, as well as substances can be for antigen retrieval or other types of protocols (e.g., immunohistochemistry protocols, in situ hybridization protocols, etc.) for preparing specimens for visual inspection, fluorescent visualization, microscopy, or the like. Non-limiting exemplary stains, conjugates, signaling conjugates, amplifying conjugates, chromophore moieties, chromogens, probes, counterstains, and compositions are discussed below.

Conjugates can be used to detect one or more targets in a biological sample and can be used in standard assays, such as in situ hybridization, immunocytochemical, and immunohistochemical detection schemes. Any one of these assays may be combined with signal amplification, and/or the assays may concern multiplexing wherein multiple different targets may be detected using imaging systems (e.g., imaging systems 100, 300). One method uses an IHC detection scheme that is combined with an ISH detection scheme. Non-limiting exemplary embodiments of the disclosed staining and imaging techniques may be used for determining cell clonality (e.g., a cell expresses either one of two biomarkers, but not both), predicting response of cancer patients to cancer therapy (e.g., detecting predictive biomarkers to determine whether a particular patient will respond to treatment), simultaneous analysis of biomarker expression and internal control gene expression to monitor assay performance and sample integrity, and combinations thereof.

Detection methods may be used on biological sample having a solid phase, such as protein components of cells or cellular structures that are immobilized on a substrate (e.g., a microscope slide). In illustrative embodiments, the sample is a tissue or cytology sample, such as a formalin-fixed paraffin embedded sample, mounted on a glass microscope slide. In one embodiment, the method is particularly for an automated slide staining instrument.

A person of ordinary skill in the art will appreciate that numerous types of targets may be detected and viewed using enhanced imaging. The target may be a particular nucleic acid sequence, a protein, or combinations thereof. For example, the target may be a particular sequence of RNA (e.g., mRNA, microRNA, and siRNA), DNA, and combinations thereof. The sample may be suspected of including one or more target molecules of interest. Target molecules can be on the surface of cells and the cells can be in a suspension, or in a tissue section. Target molecules can also be intracellular and detected upon cell lysis or penetration of the cell by a probe. One of ordinary skill in the art will appreciate that the method of detecting target molecules in a sample will vary depending upon the type of sample and probe being used. Methods of collecting and preparing samples are known in the art.

Samples for use with the composition disclosed herein, such as a tissue or other biological sample, can be prepared using any method known in the art by of one of ordinary skill. The samples can be obtained from a subject for routine screening or from a subject that is suspected of having a disorder, such as a genetic abnormality, infection, or a neoplasia. The described embodiments of the disclosed method can also be applied to samples that do not have genetic abnormalities, diseases, disorders, etc., referred to as "normal" samples. Such normal samples are useful, among other things, as controls for comparison to other samples. The samples can be analyzed for many different purposes. For example, the samples can be used in a scientific study or for the diagnosis of a suspected malady, or as prognostic indicators for treatment success, survival, etc. Samples can include multiple targets that can be specifically bound by one or more detection probes. Throughout this disclosure when reference is made to a target protein it is understood that the nucleic acid sequences associated with that protein can also be used as a target. In some examples, the target is a protein or nucleic acid molecule from a pathogen, such as a virus, bacteria, or intracellular parasite, such as from a viral genome. For example, a target protein may be produced from a target nucleic acid sequence associated with (e.g., correlated with, causally implicated in, etc.) a disease.

MicroRNAs (miRNAs or miRs) are small, non-coding RNAs that negatively regulate gene expression, such as by translation repression. For example, miR-205 regulates epithelial to mesenchymal transition (EMT), a process that facilitates tissue remodeling during embryonic development. However, EMT also is an early step in tumor metastasis. Down-regulation of microRNAs, such as miR-205, may be an important step in tumor progression. For instance, expression of miR-205 is down-regulated or lost in some breast cancers. MiR-205 also can be used to stratify squamous cell and non-small cell lung carcinomas (*J. Clin Oncol.*, 2009, 27(12):2030-7). Other microRNAs have been found to modulate angiogenic signaling cascades. Down-regulation of miR-126, for instance, may exacerbate cancer progression through angiogenesis and increased inflammation. Thus, microRNA expression levels may be indicative of a disease state. For microRNA within the scope of the present disclosure, reference is made to PCT Application No. PCT/EP2012/073984.

The disclosed imaging systems and techniques may be used to analyze clinical breast cancer FFPE tissue blocks that have been characterized for HER2 gene copy number and Her2 protein expression using INFORM HER2 Dual ISH DNA Probe Cocktail and IHC assays (Ventana Medical Systems, Inc., "VMSI"), respectively. HER2 mRNA expression levels relative to ACTB (β-actin) can be determined using qPCR according to known methods. Results of the gene copy, protein expression, and qPCR analyses can be compared to results obtained through mRNA-ISH detection of HER2 and ACTB mRNA using the method disclosed herein to analyze FFPE samples.

The disclosed imaging systems and techniques may be used to identify monoclonal proliferation of certain types of cells. Cancer results from uncontrolled growth of a cell population; this population may arise from a single mutant parent cell and, therefore, comprise a clonal population. An example of cancer derived from a clonal population is B-cell non-Hodgkin lymphomas (B-NHL) which arise from monoclonal proliferation of B cells. Clonal expansion of a specific B cell population can be detected by sole expression of either KAPPA or LAMBDA light chain mRNA and protein as part of their B cell receptor antibody. Accordingly, one embodiment of the method disclosed herein concerns identifying monoclonal proliferation of B cells using chromogenic dual staining of KAPPA and LAMBDA mRNA.

Uniform expression of either light chain by malignant B cells enables differentiation of monoclonal B cell lymphomas from polyclonal KAPPA and LAMBDA light chain expressing B cell populations that result during the normal immune response. Determining light chain mRNA expression patterns is complicated by the copy number range of light chain mRNA and antibody protein expressed by B cell neoplasms derived from a variety of B cell stages (naïve and memory cells: 10-100 copies per cell; plasma cells: ~100 thousand copies per cell).

Methods

Figure 9:
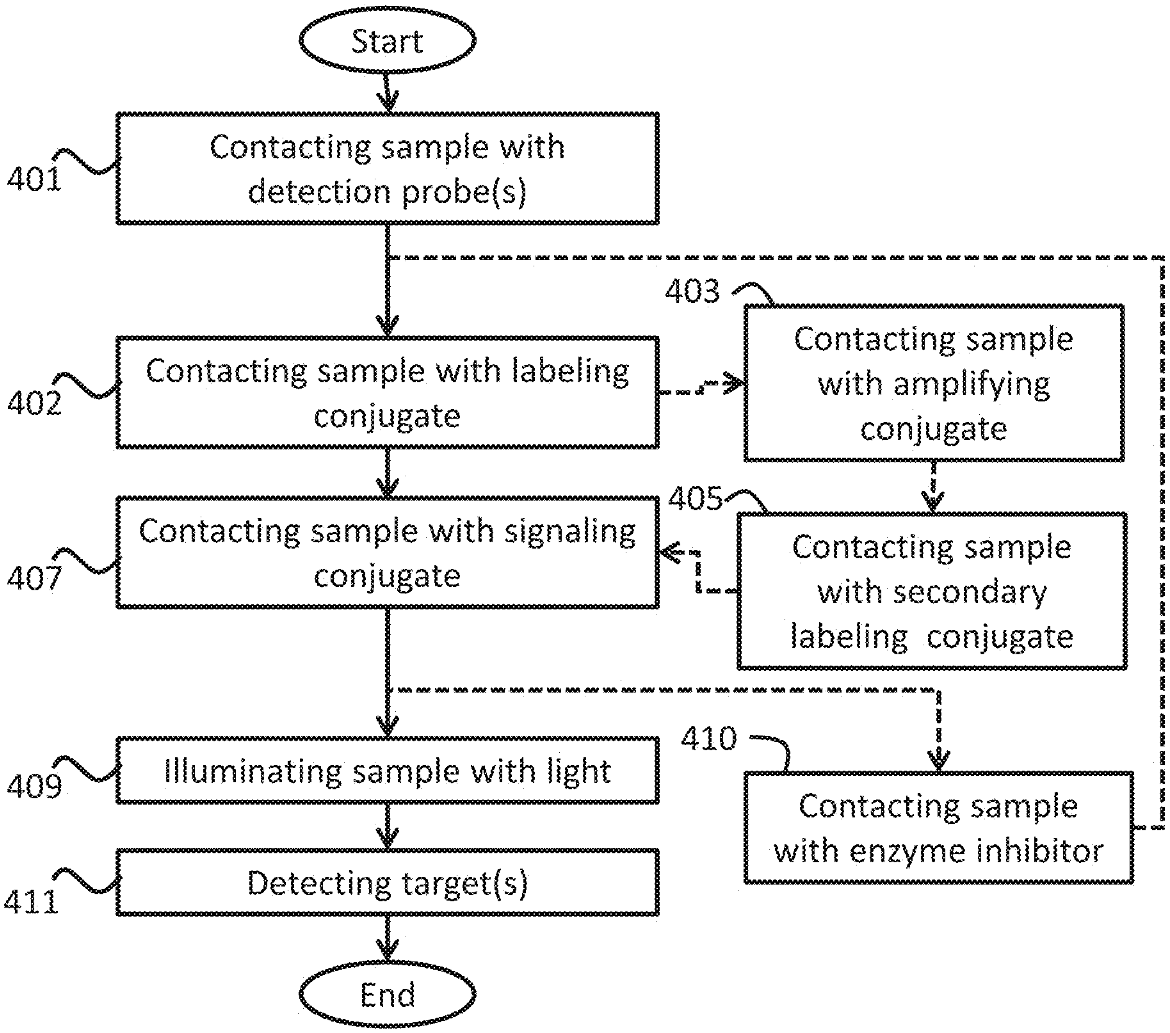
FIG. 9 is a flowchart for detecting a target in accordance with an embodiment of the disclosed technology.

A method of detecting a target in a biological sample can include contacting the biological sample with a detection probe, contacting the biological sample with a labeling conjugate, and contacting the biological sample with a signaling conjugate. FIG. 9 is a flowchart for detecting a target. In particular, the method includes a step 401 of contacting sample with a detection probe(s). The step can include either a single detection probe or a plurality of detection probes specific to a plurality of different targets. A subsequent step 402 includes contacting sample with a labeling conjugate. A further subsequent step 407 includes contacting sample with a signaling conjugate. Dashed lines to step 403, contacting sample with an amplifying conjugate, and step 405, contacting sample with a secondary labeling conjugate represent that these steps are optional. Dashed lines to step 410 of contacting sample with an enzyme inhibitor indicates that an optional loop can be used to detect multiple targets according to a multi-plexed approach. In particular disclosed embodiments, one or more steps may be used wherein an enzyme inhibitor is added to the biological sample. For example, in embodiments wherein two or more signaling conjugates are added to the sample, an enzyme inhibitor (e.g., a peroxidase inhibitor) can be added in order to inhibit or destroy any residual enzymatic activity after one signaling conjugate has been covalently deposited and before a second, different signaling conjugate is added.

Detecting targets within the sample can include contacting the biological sample with a first amplifying conjugate that associates with the first labeling conjugate. For example, the amplifying conjugate may be covalently deposited proximally to or directly on the first labeling conjugate. The first amplifying conjugate may be followed by contacting the biological sample with a secondary labeling conjugate. Illustratively, the amplification of signal using amplifying conjugates enhances the deposition of signaling conjugate. The enhanced deposition of signaling conjugate enables easier visual identification of the chromogenic signal, that is, the amplification makes the color darker and easier to see. For low expressing targets, this amplification may result in the signal becoming sufficiently dark to be visible, whereas without amplification, the target would not be apparent. In embodiments wherein an amplification step is used, the biological sample may first be contacted with the detection probe and labeling conjugate and then subsequently contacted with one or more amplifying conjugates. In particular disclosed embodiments, the amplifying conjugate comprises a latent reactive moiety coupled with a detectable label. For example, a tyramine moiety (or a derivative thereof) may be coupled with a hapten, directly or indirectly, such as with a linker. The amplifying conjugate may be covalently deposited by the enzyme of the enzyme conjugate, typically using conditions described herein or are known to a person of ordinary skill in the art that are suitable for allowing the enzyme to perform its desired function. The amplifying conjugate is then covalently deposited on or proximal to the target.

Conditions suitable for introducing the signaling conjugates with the biological sample are used, and typically include providing a reaction buffer or solution that comprises a peroxide (e.g., hydrogen peroxide), and has a salt concentration and pH suitable for allowing or facilitating the enzyme to perform its desired function. In particular disclosed embodiments, this step of the method is performed at temperatures ranging from about 35° C. to about 40° C. These conditions allow the enzyme and peroxide to react and promote radical formation on the latent reactive moiety of the signaling conjugate. The latent reactive moiety, and therefore the signaling conjugate as a whole, will deposit covalently on the biological sample, particularly at one or more tyrosine residues proximal to the immobilized enzyme conjugate, tyrosine residues of the enzyme portion of the enzyme conjugate, and/or tyrosine residues of the antibody portion of the enzyme conjugate. The biological sample is then illuminated with light and the target may be detected through absorbance of the light produced by the chromogenic moiety of the signaling conjugate.

Depending on the level of multiplexing, the optional loop can be repeated one, two, three, four, five, six, seven, eight, or more times depending on the number of targets that are to be detected in the sample. During subsequent detections, the labeling conjugate can be the same or different depending on the blocking reagents used. An example of different labeling conjugates would be a first enzyme-anti-hapten antibody conjugate and a second enzyme-anti-hapten antibody conjugate, wherein the first anti-hapten antibody and the second anti-hapten antibody are specific to different haptens. According to another example, the difference could involve different anti-species antibodies, wherein the targets were detected using primary antibodies derived from different species. During subsequent detections, the signaling conjugate used for each target would typically be different. For example, the different targets could be detected as different colors.

While step 401 of contacting the sample with detection probe(s) is shown in FIG. 9 to be the simultaneous detection of multiple targets during one step, multiplexing may also be performed sequentially. A sequential method would include adding a first detection probe followed by carrying out the various subsequent method steps (i.e. 402, 407, optionally 403, and 405). A second detection probe may then be added after the first signaling conjugate has been covalently deposited on or proximal to the first target, thereby providing the ability to detect a second target. This process may then be iteratively repeated using a different signaling conjugate comprising a chromophore moiety that differs from the others deposited.

The method also comprises a step 409 of illuminating sample with light and a detecting target(s) step 411. The signal produced by the signaling conjugate is detected, thereby providing the ability to detect a particular target. In particular disclosed embodiments, the signal produced by the signaling conjugate may be fluorescent, chromogenic, or combinations thereof. Exemplary embodiments concern detecting a chromogenic signal. The signal may be detected using suitable methods known to those of ordinary skill in the art, such as chromogenic detection methods, fluorogenic detection methods, and combinations thereof. For example, the signal may be detected using bright field detection techniques or dark-field detection techniques with or without digital enhancement.

Figure 10A:
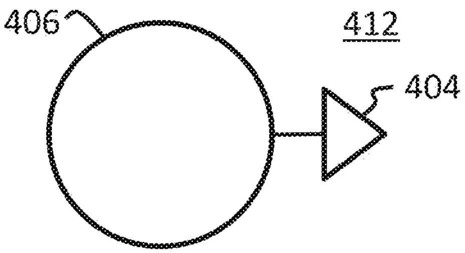
FIG. 10(A) illustrates a signaling conjugate comprising a latent reactive moiety and a chromophore moiety.
Figure 10B:
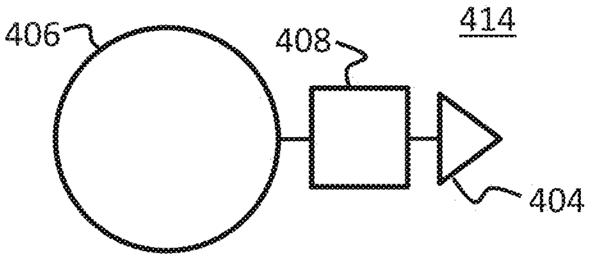
FIG. 10(B) illustrates an alternative signaling conjugate further comprising a linker.

FIGS. 10(A-B) are schematic diagrams of two embodiments of signaling conjugates. FIG. 10(A) illustrates a signaling conjugate 412 comprising a latent reactive moiety 404 and a chromophore moiety 406. FIG. 10(B) illustrates an alternative signaling conjugate 414, comprising chromophore moiety 406, latent reactive moiety 404, and further comprising a linker 408.

FIGS. 11(A-F) are schematic diagrams illustrating an embodiment of a method for detecting a target 417 on a sample 416. FIG. 11(A) shows a detection probe 418, which is shown illustratively to be a nucleic acid molecule with a hapten 419, binding to target 417, which, in this case, would be a nucleic acid target. FIG. 11(B) shows a labeling conjugate 420 binding to detection probe 418. Labeling conjugate is depicted as an anti-hapten antibody specific to hapten 419 conjugate to two enzymes, depicted as the circles containing an "E". While shown as being a conjugate of one antibody and two enzyme molecules, the number of enzymes per antibody can be altered and optimized for particular applications by a person of ordinary skill in the art. In particular, the number of enzymes could be modified from about 1 to about 10, depending on various factors including the size of the antibody and the size of the enzymes. FIG. 11(C) shows signaling conjugate 412 being enzymatically deposited onto sample 416. In particular, enzymes "E", part of labeling conjugate 420, catalyze conversion of the first latent reactive moiety of signaling conjugate 412 into a first reactive species 413. This catalysis is represented by a first large arrow 421 directing signaling conjugate 412 to enzymes "E" and a second large arrow 422 emanating from enzymes "E" to reactive species 413, which is made of chromophore moiety 406 (FIG. 10B) and a reactive moiety, which is represented by the dot replacing the arrow as shown on signaling conjugate 406 (FIG. 10B).

Figure 11A:
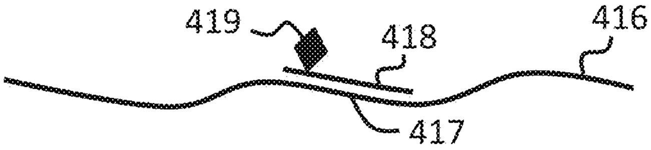
FIG. 11(A) shows a detection probe binding to the target.
Figure 11B:
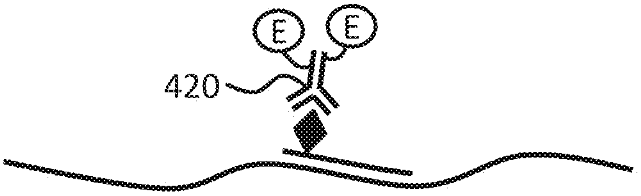
FIG. 11(B) shows a labeling conjugate binding to the detection probe.
Figure 11C:
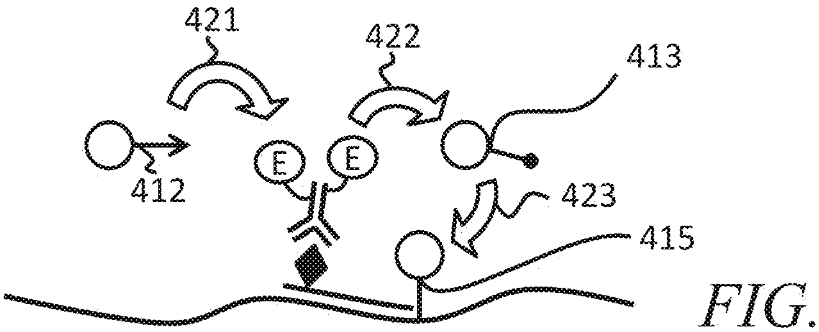
FIG. 11(C) shows a signaling conjugate being enzymatically deposited onto the sample.
Figure 11D:
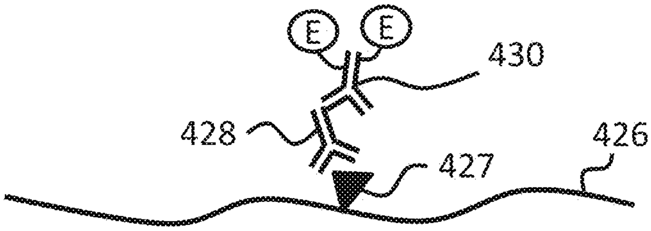
FIG. 11(D) shows an alternative embodiment in which an antibody-based detection probe is used to detect a different target.

Reactive species 413 covalently binds to the biological sample proximally to or directly on the first target, to form a covalently bound chromophore 415. FIG. 11(D) shows an alternative embodiment in which an antibody-based detection probe 428 is used to detect a protein target 427. FIG. 11(D) is included to show that detection of either nucleic acid target 417 and/or protein target 427 are analogous except that detection probe 428 is represented as an antibody as opposed to a nucleic acid (e.g., detection probe 418). Detection probe 428 is shown as not being haptenated, implying that labeling conjugate 430 is an anti-species antibody conjugated to enzymes "E". However, in alternative embodiments, detection probe 428 could be haptenated and labeling conjugate 430 could include an anti-hapten antibody.

Figure 11E:
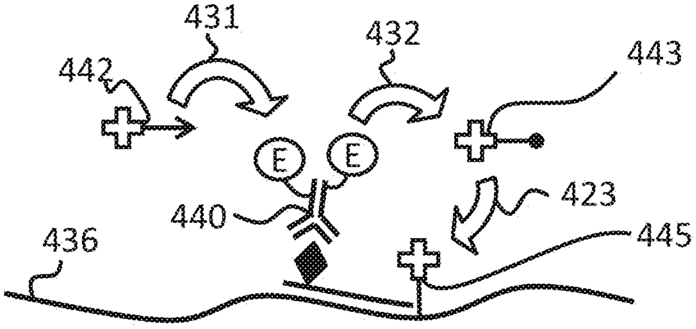
FIG. 11(E) shows an approach for detecting a target using an amplifying conjugate.
Figure 11F:
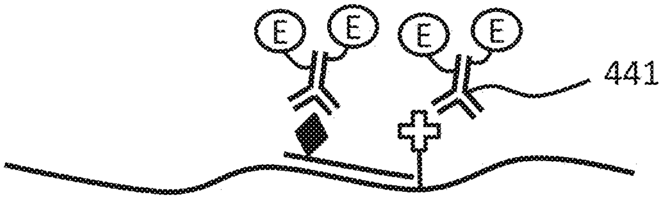
FIG. 11(F) shows that the amplifying conjugate was bound to the sample and was labeled with a secondary labeling conjugate.

FIG. 11(E) shows an approach to detecting the target which uses an amplifying conjugate 442. In particular, amplifying conjugate 442 is enzymatically deposited onto a sample 436. In particular, enzymes "E", part of labeling conjugate 440, catalyze conversion of the first latent reactive moiety of amplifying conjugate 442 into a first reactive species 443. This catalysis is represented by a first large arrow 431 directing amplifying conjugate 442 to enzymes "E" and a second large arrow 432 emanating from enzymes "E" to reactive species 443, which is made of a hapten (shown as a cross) and a reactive moiety, which is represented by the dot replacing the arrow as shown on amplifying conjugate 442. Reactive species 443 covalently binds to the biological sample proximally to or directly on the first target, to form a covalently bound hapten 445. The scheme depicted in FIG. 11(E) is shown here to make apparent the similarities between the scheme of FIG. 11(E) and the scheme of FIG. 11(C). In particular, the schemes are nearly identical except for the substitution of the chromophore moiety of signaling conjugate 412 for the hapten of amplifying conjugate 442. FIG. 11(F) shows that the amplifying conjugate bound to the sample (covalently bound hapten 445 as seen in FIG. 11(E)) can be labeled with a secondary labeling conjugate 441. While not shown, the scheme shown in FIG. 11(C) can then be used for to form a covalently bound chromophore. Deposition of amplifying conjugate 442 onto the sample provides a larger number of enzyme molecules (i.e. enzymes from labeling conjugate 440 and secondary labeling conjugate 441 are shown proximally to the target in FIG. 11(F)).

Figure 12A:
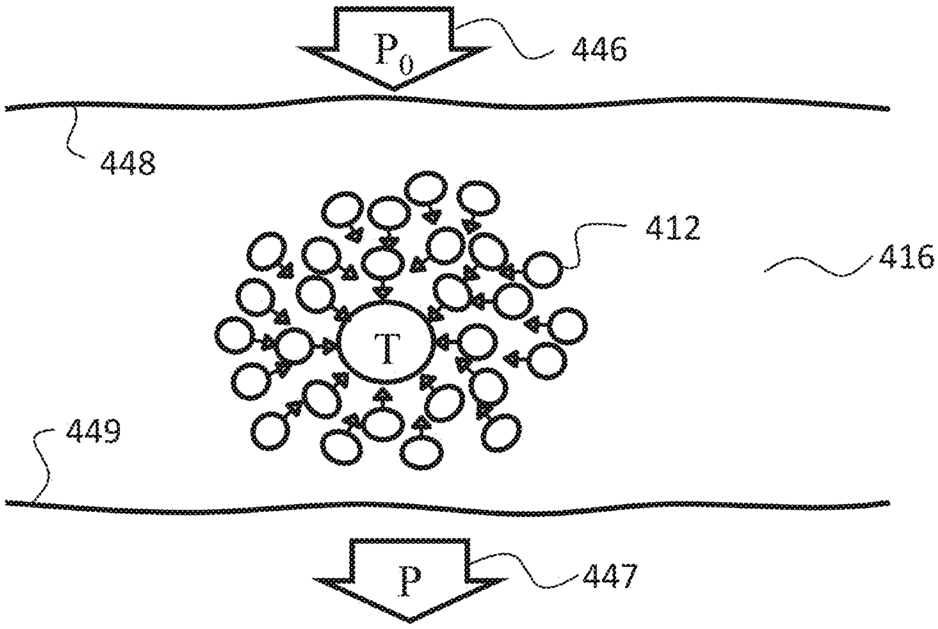
FIGS. 12(A-B) are schematic diagrams illustrating (A) a cross-sectional depiction of distribution of labeling conjugates proximally to target (T) and (B) a graph depicting the relationship between power of incident radiation ($P_0$) across the sample shown in (A) and power of transmitted radiation (P) through the sample, the y-axis representing radiation power and the x-axis representing linear distance across the sample.
Figure 12B:
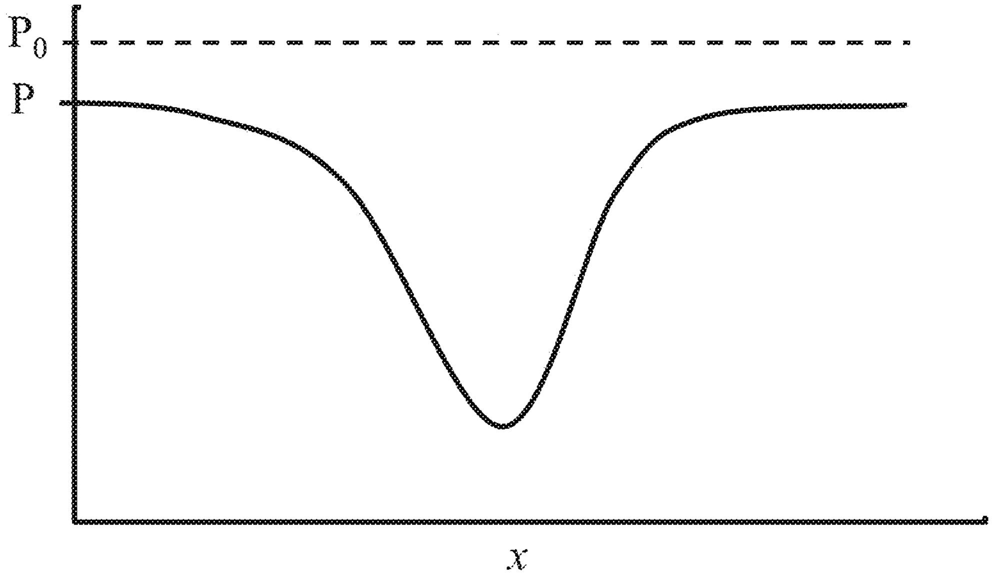

The signaling conjugate can be detected using digital bright-field detection methods, automated detection methods, etc. Automated detection methods can include, without limitation, producing digitally enhanced images/videos and using automated analysis techniques to detect targets. An overview of bright field detection is illustrated in FIGS. 12(A-B). FIG. 12(A) is a schematic of a cross-sectional view of sample 416 including an upper surface 448 and a lower surface 449 in which a plurality of the signaling conjugates 412 are located proximally to a target (T); the sample is shown having a first arrow 446 representing incident radiation directed towards upper surface 448 and a second arrow 447 representing transmitted radiation emanating from lower surface 449. FIG. 12(B) is a graph depicting the relationship between power of incident radiation ($P_0$) across sample 416 shown in FIG. 12(A) and power of transmitted radiation (P) through the sample, the y-axis being radiation power and the x-axis being linear distance across the sample. FIGS. 12(A-B) portray how a target could be visualized using signaling conjugate 412. Equation 1 provides the mathematical relationship between the power of the incident and transmitted radiation.

The disclosed method steps may be carried out in any suitable order, and are not limited to those described herein. In particular disclosed embodiments, the method may comprise steps wherein the labeling conjugates are added to the biological sample, followed by the signaling conjugate. In other disclosed embodiments, the method may comprise steps wherein the labeling conjugates are added to the biological sample, followed by an amplifying conjugate, an additional enzyme conjugate, and the signaling conjugate. The conjugates disclosed herein may be added simultaneously, or sequentially. The conjugates may be added in separate solutions or as compositions comprising two or more conjugates. Also, each class of conjugates used in the disclosed method may comprise the same or different conjugate components. For example, when multiple signaling conjugates are added to the sample, the conjugates may comprise the same or different chromogenic moieties and/or latent reactive moieties. Solely by way of example, one signaling conjugate may comprise a coumarin chromophore coupled to a tyramine moiety and another signaling conjugate may comprise a rhodamine chromophore coupled to a tyramine derivative moiety. The number of signaling conjugates suitable for use in the disclosed multiplexing assay may range from one to at least six or more typically from two to five. In particular disclosed embodiments, the method is used to detect from three to five different targets using from three to five different signaling conjugates. Illuminators disclosed herein can have light sources that output light for causing the conjugates to transmit radiation. Multiple targets may be detected in a single assay using the systems and methods disclosed herein. In another embodiment, any one or more of the steps disclosed herein for the method are performed by an automated slide staining instrument (e.g., imaging system 300 of FIG. 8).

Chromogenic vs. Fluorescence

Figure 13A:
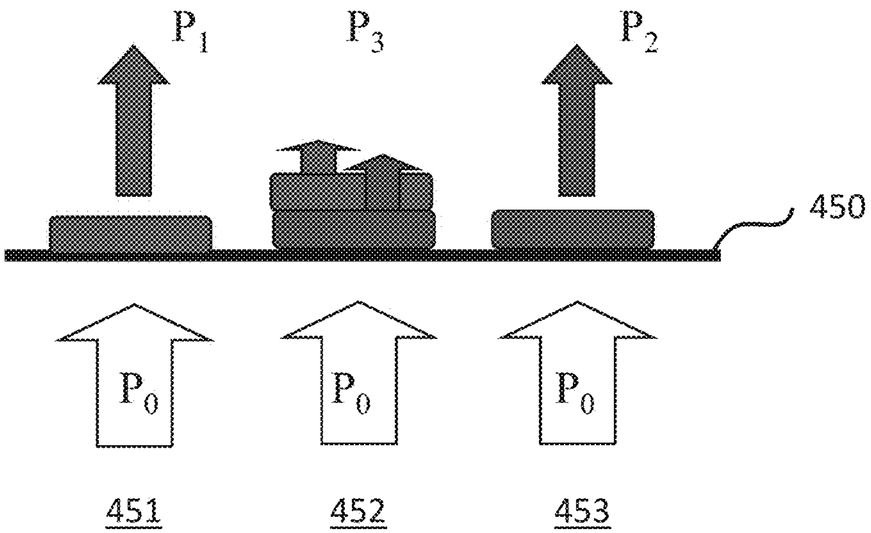
FIG. 13(A) illustrates detection of a chromogen wherein the transmitted light is detected.
Figure 13B:
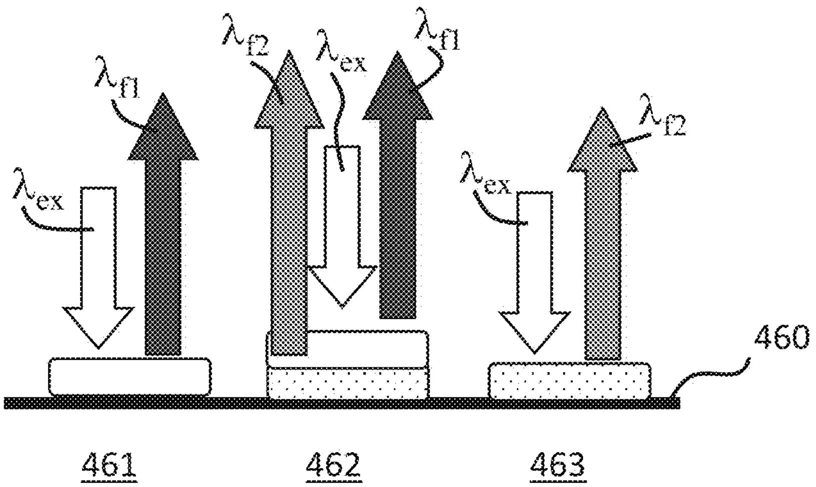
FIG. 13(B) illustrates the detection of a fluorophore wherein the emitted light is detected.

Embodiments disclosed herein can be used for chromogenic and fluorescence detection. The differences between chromogenic detection and fluorescence detection are pictorially illustrated in FIGS. 13(A) and 13(B). FIG. 13(A) shows a red chromogen example 451, a blue chromogen example 453, and a red and blue multiplexed chromogen example 452. When chromogens are exposed to light (i.e., exposed to light having an incident power of $P_0$), the chromogens interact with the light by absorbing various wavelengths. For example, light can be emitted by light sources 180*a-d* or other light sources/illuminators. The transmitted light will have a particular power (FIG. 13(A) $P_1$, $P_2$, and $P_3$) depending on the absorbance of the chromogen and the amount of chromogen present. The better detection event results in more chromogen being deposited, which absorbs more light and makes the observed signal smaller. Even for colored chromogens, a reduction of the transmitted light will eventually cause the chromogen to appear dark or black as no light is transmitted. Multiplexing often exacerbates this effect, as shown in red and blue multiplexed chromogen example 452. When a traditional red chromogen and a blue chromogen overlap in space, the absorbance is broad and the detection event appears blackish and dark, as illustrated by the $P_3$ signal being smaller than $P_1$ and $P_2$. Essentially, chromogenic detection with overlapping signals can result in a subtractive effect. This is in contrast to fluorescence which is shown in FIG. 13(B). With reference to FIG. 13(B), a purple fluor example 461, a green fluor example 463, and a purple and green multiplexed fluor example 462 are shown. The excitation light (shown as $\lambda_{ex}$ in the figure) can interact with the flour 461, 462, 463 can cause an emission. The excitation light can be the same across the three examples and 461 exhibits $\lambda_{f1}$ (purple fluorescence), 463 exhibits $\lambda_{f2}$ (green fluorescence), and 462 exhibits $\lambda_{f1}$ (purple fluorescence) and $\lambda_{f2}$ (green fluorescence). As more fluor is deposited on the sample a stronger fluorescence signal is generated. Similarly, in a multiplexed scenario, there is an additive affect for the fluorophores, whereas a subtractive effect occurs with the chromophores. This subtractive versus additive feature significantly compounds the difficulty of multiplexing using chromogens. The imaging systems disclosed herein can be used for chromogenic detection and fluorescence detection and can enhance color perception of the signals by using false-color composite images. For example, the illuminator 140 of FIG. 1 can be located on the front side of the slide for fluorescence detection.

Detecting & Illuminating

The signaling conjugate is configured to provide a variety of characteristics that facilitate providing a detectable signal. The signaling conjugate can comprise an appropriate chromophore moiety to provide a bright field signal. If the chromophore moiety provides a bright field signal, a bright field microscope can be used to visually detect the signal. Digital processing can also be used to facilitate detection of the signal. For example, the chromophore disclosed herein may be selected to produce an optical signal suitable for visually detecting the target disclosed herein. In particular disclosed embodiments, the chromophore has optical properties, such as those discussed below, that allow the signaling conjugate to be configured to provide the desired signal.

Figure 14A:
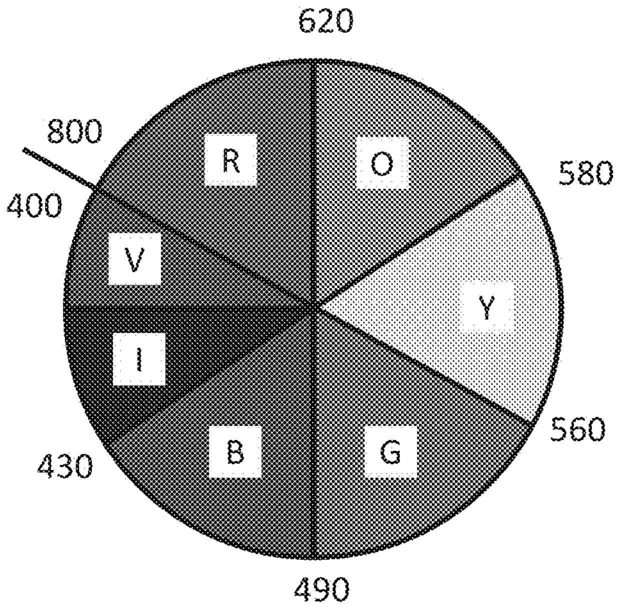
FIG. 14(A) is a color wheel depicting the relationship between an observed color.
Figure 14B:
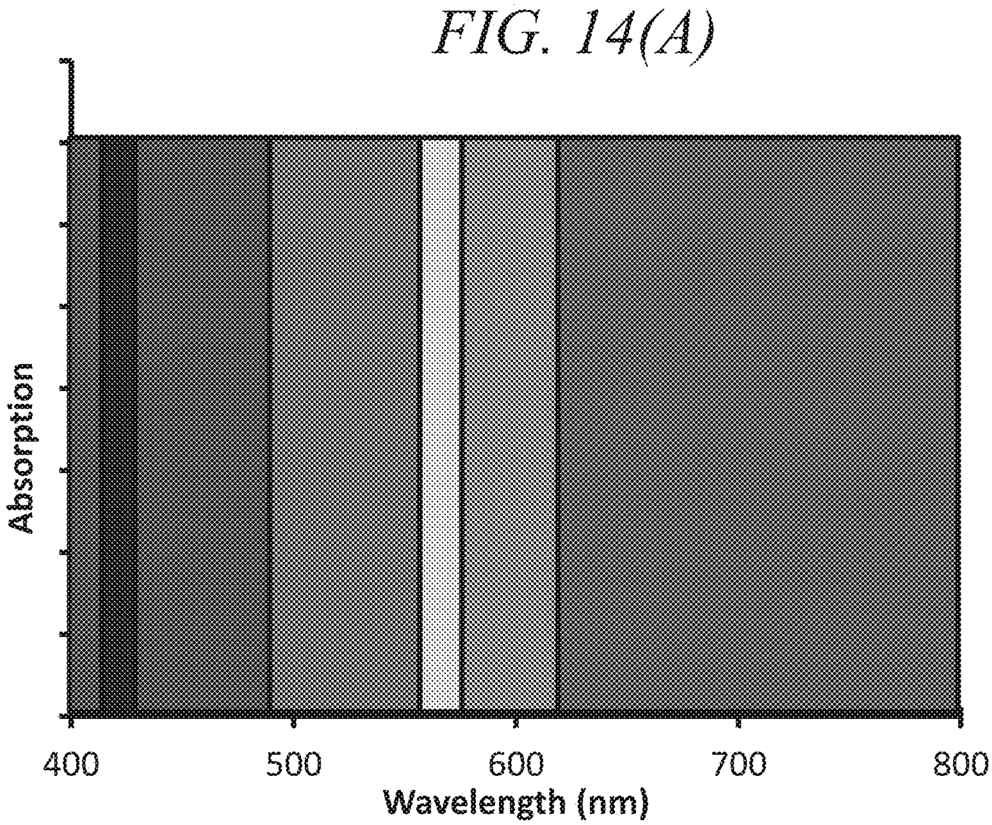
FIG. 14(B) is an image of absorbed radiation for signaling conjugates.

When light (i.e., visible electromagnetic radiation) passes through or is reflected by a colored substance, a characteristic portion of the spectral wavelength distribution is absorbed. The absorption of this characteristic portion imparts on the object a complementary color corresponding to the remaining light. FIGS. 14(A) and 14(B) show a color wheel (FIG. 14(A)) that illustrates the relationship between an observed color and absorbed radiation. The color wheel includes a number of pie pieces representing colors (R) Red, (O) Orange, (Y) Yellow, (G) Green, (B) Blue, (I) Indigo, and (V) Violet. Each color is shown as a separate pie piece from the next color with a series of lines terminating at numbers outside the wheel. These numbers designate the wavelength of light in nanometers of those wavelengths traditionally considered to be the transition points between colors. FIG. 14(B) shows the same distribution of colors on a linear graph having the wavelength of light on the x-axis. That is, the region from 620 to 800 nm is shown colored red as those wavelengths are "red" light wavelengths. Red LEDs can emit wavelengths in a range of about 620-800 nm. Typically, colors are perceived preferentially and some colors are perceived only for a very narrow span of wavelengths. For example, a light source having emission anywhere from 490 nm to 560 nm can be perceived as green (a 70 nm span). To be perceived as orange, the light can emit light in the range of 580 nm and 620 nm (40 nm). The graph is provided for representation only, and a person of ordinary skilled in the art appreciates that the electromagnetic spectrum is continuous in nature and not discrete as shown. However, the color classifications delineated herein facilitate an understanding of the technology as claimed herein.

When a substance absorbs a particular wavelength, the substance appears to be the complementary color, that color corresponding to the remaining light. The color wheel of FIG. 14(A) shows complementary colors diametrically opposed to each other. According to the color wheel, absorption of short wavelength bluer light (e.g., 420-430 nm light) imparts a yellow color to the substance (425 nm is opposite to that portion of the wheel that is yellow). Similarly, absorption of light in the range of 500-520 nm imparts a reddish to magenta color to the substance since the red pie area is opposite the numerical range of 500-520 nm. Green is unique in that absorption of short wavelength bluer light (e.g., near 400 nm) plus absorption of long wavelength redder light (e.g., near 650 nm) can impart a green color to the substance.

The concept that the absorption of light at wavelengths between 420-430 nm results in the substance appearing yellow is an over-simplification of many of the absorption phenomena described herein. In particular, the absorption spectral profile has a strong influence on the observed color. For example, a substance that is black absorbs strongly throughout the range of 420-430 nm, yet the black substance does not appear yellow. In this case, the black absorber will absorb light across the entire visible spectrum, including 420-430 nm. Thus, while absorption of light at a particular wavelength is important, absorption characteristics across the visible spectra (i.e., spectral absorption) also are important.

Figure 15A:
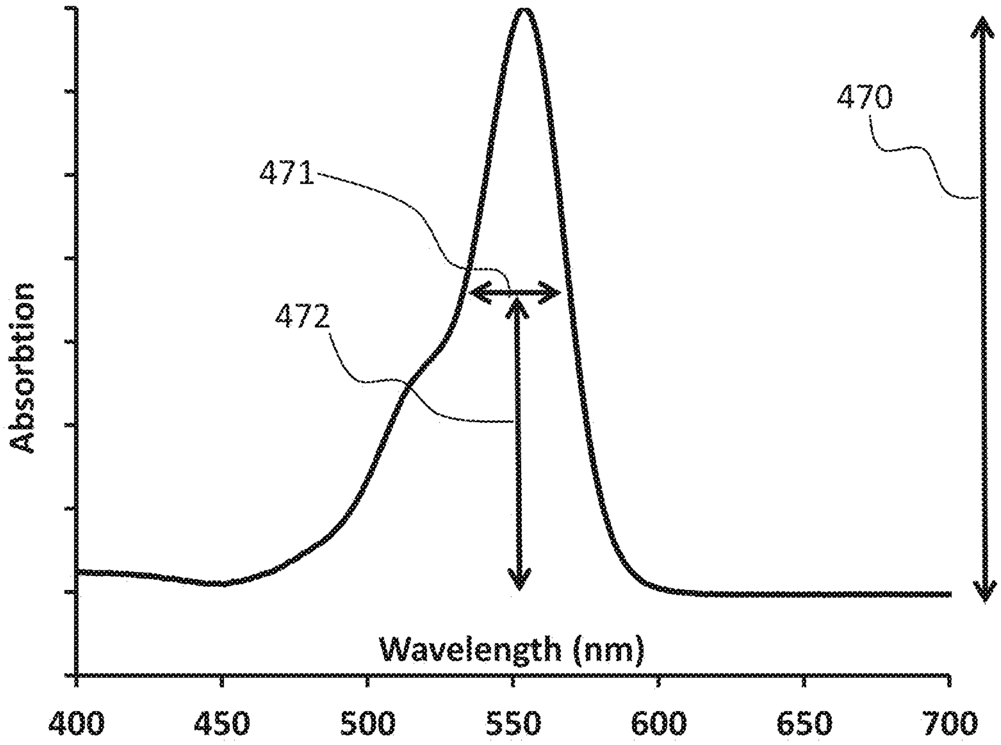
FIG. 15(A) is a graph illustrating the absorption spectrum of a 5-TAMRA-tyramide conjugate.
Figure 15B:
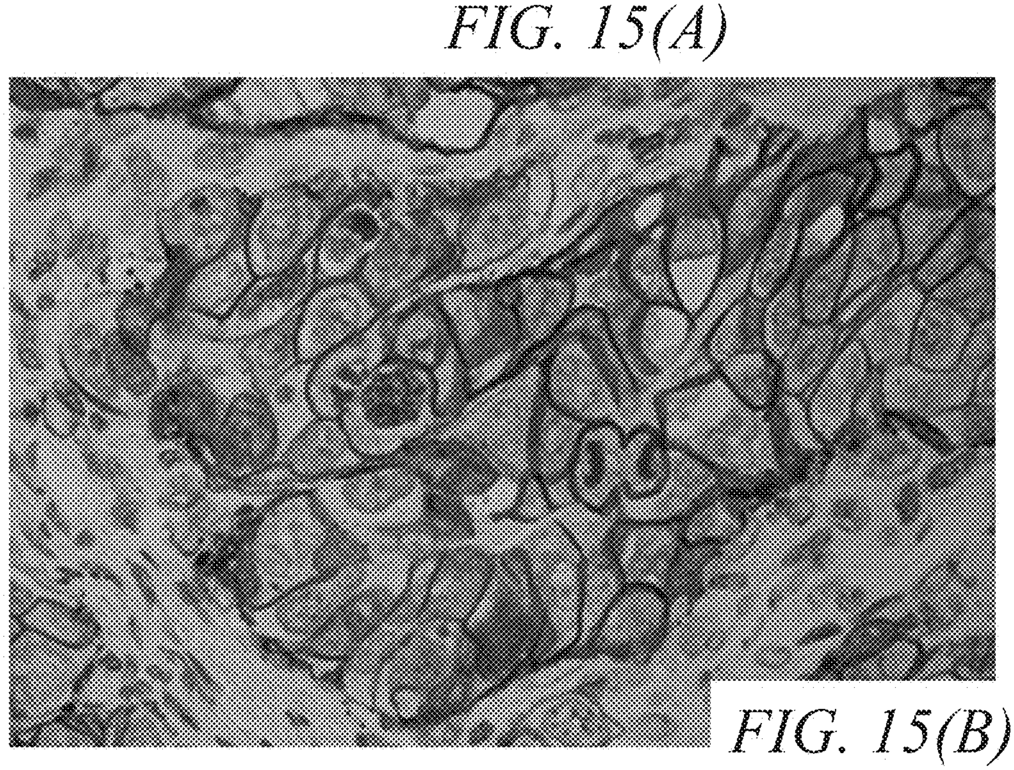
FIG. 15(B) is a photomicrograph illustrating a biological sample having targets detected by 5-TAMRA-tyramide conjugate.

Spectral absorption can be characterized according to several measurable parameters. The wavelength at which the maximum fraction of light is absorbed by a substance is referred to as $\lambda_{max}$. Because this wavelength is absorbed to the greatest extent, it is typically referred to as the absorbance wavelength. An illuminator can generate with a wavelength close or equal to the $\lambda_{max}$ of the feature of interest to be imaged. FIG. 15(A) is an absorption spectrum of a particular signaling conjugate, and FIG. 15(B) illustrates a photomicrograph of a protein stained using the signaling conjugate producing the absorption spectrum of FIG. 15(A). FIG. 15(A) includes a first arrow (470) illustrating the magnitude of the maximum absorbance. A second arrow (471) shows the magnitude of half of the maximum. A third arrow (472) shows the width of the peak at half of the maximum absorbance. For this exemplary signaling conjugate, $\lambda_{max}$ is 552 nm and the full width of the peak at the half maximum absorbance (e.g. FWHM) is approximately 40 nm. While $\lambda_{max}$ designates the wavelength of maximum absorption, the FWHM designates the breadth of the spectral absorbance. Both factors are important in describing the chromophore's color because broad absorption spectra do not appear to have a color as would be expected from their $\lambda_{max}$. Rather, they appear to be brown, black, or gray. Referring to FIG. 15(B), deposition of the signaling conjugate is clearly evident in those locations that would be expected for positive staining (HER2 (4B5) IHC in Calu-3 xenografts). Referring back to the color wheel (FIG. 14(A)), a $\lambda_{max}$ of 552 nm should correspond to a complementary color of red or red-violet. This matches the color observed in the tissue sample shown in FIG. 15(B) (note that the sample further includes hematoxylin nuclear counterstaining that is blue). Because the counterstain is confined to the nucleus, it does not appear to interfere or substantially affect the cell-membrane based HER2 staining.

Some exemplary chromophores can have strong absorbance characteristics. In some embodiments, the chromophores are non-fluorescent or weakly fluorescent. By virtue of its absorbance characteristics, a chromophore is a species capable of absorbing visible light. One preferred chromophore can be capable of absorbing a sufficient quantity of visible light with sufficient wavelength specificity so that the chromophore can be visualized using bright-field illumination, digital imaging techniques, etc. In another embodiment, the chromophore has an average molar absorptivity of greater than about 5,000 $M^{-1}$ $cm^{-1}$ to about 250,000 $M^{-1}$ $cm^{-1}$. For example, the average molar absorptivity may be greater than about 5,000 $M^{-1}$ $cm^{-1}$, greater than about 10,000 $M^{-1}$ $cm^{-1}$, greater than about 20,000 $M^{-1}$ $cm^{-1}$, greater than about 40,000 $M^{-1}$ $cm^{-1}$, or greater than about 80,000 $M^{-1}$ $cm^{-1}$. Strong absorbance characteristics can be used to increase the signal, or color, provided by the chromophore.

The deposition of signaling conjugates in the vicinity of the target creates absorption of the incident light. Because the absorption occurs non-uniformly across the sample, the location of the target, within the sample, can be identified, as discussed in connection with FIGS. 5(A-E).

Certain aspects, or all, of the disclosed embodiments can be automated, and facilitated by computer analysis and/or image analysis system. In some applications, precise color ratios are measured by imaging systems disclosed herein. In some embodiments, light microscopy is utilized for image analysis, as discussed in connection with FIG. 1. Digital images obtained of stained samples can be analyzed using image analysis software. For example, the software can be stored by the processing device 122. Color can be measured in several different ways. For example, color can be measured as red, blue, and green values; hue, saturation, and intensity values; and/or by measuring a specific wavelength or range of wavelengths using a spectral imaging camera.

Illustrative embodiments involve using bright-field imaging with the signaling conjugates, narrow waveband imaging, and/or wavelength imaging. In bright field illumination, white light in the visible spectrum is transmitted through the chromophore moiety. The chromophore absorbs light of certain wavelengths and transmits other wavelengths. This changes the light from white to colored depending on the specific wavelengths of light transmitted.

The narrow spectral absorbance enables chromogenic multiplexing at level beyond the capability of traditional chromogens. For example, traditional chromogens are somewhat routinely duplexed (e.g., Fast Red and Fast Blue, Fast Red and Black (silver), Fast Red and DAB). However, triplexed or three-color applications are atypical. In illustrative embodiments, the method includes detecting from two to about six different targets, such as three to six, or three to five, using different signaling conjugates or combinations thereof. In one embodiment, illuminating the biological sample with light comprises illuminating the biological sample with a spectrally narrow light source, the spectrally narrow light source having a spectral emission with a second full-width half-max (FWHM) of between about 30 nm (with filter could be 10 nm with bright source), and about 250 nm between about 30 nm and about 150 nm, between about 30 nm and about 100 nm, or between about 20 nm and about 60 nm. In another embodiment, illuminating the biological sample with light includes illuminating the biological sample with one or more LED light sources (e.g., LED light sources 180). In another embodiment, illuminating the biological sample with light includes illuminating the biological sample with a filtered light source. For example, the light sources 180 of FIG. 3 can include a lamp and one or more filters.

The samples also can be evaluated qualitatively and semi-quantitatively. Qualitative assessment includes assessing the staining intensity, identifying the positively-staining cells and the intracellular compartments involved in staining, and evaluating the overall sample or slide quality. Separate evaluations are performed on the test samples and this analysis can include a comparison to known average values to determine if the samples represent an abnormal state.

In one embodiment, the signaling conjugate is covalently deposited proximally to the target at a concentration suitable for producing a detectable signal, such as at a concentration greater than about $1\times10^{11}$ molecules per $cm^2\cdot\mu m$ to at least about $1\times10^{16}$ molecules per $cm^2\cdot\mu m$ of the biological sample. One of ordinary skill in the art could calculate the number of molecules per $cm^2\cdot\mu m$ of the biological sample by using Equation 1 and absorbance measurements across the sample, taking care to subtract the absorbance corresponding to the sample. In one embodiment of the disclosed method, such as a multiplexing method, detecting one signal includes detecting an absorbance 5% or more of incident light compared to a background, and detecting a different, separate signal includes detecting an absorbance of 5% or more of incident light compared to the background. In another embodiment, detecting one signal includes detecting an absorbance of 20% or more of incident light compared to a background, and detecting a different, separate signal includes detecting an absorbance of 20% or more of incident light compared to the background. In yet another embodiment, detecting one signal includes detecting an absorbance of 30% or more of incident light compared to a background, and detecting a different, separate signal includes detecting an absorbance of 30% or more of incident light compared to the background. An observer can view a composite image (see FIG. 5(E)) to visually identify such absorbance. For example, colored spots in a bright field image, digitally enhanced image, etc. can correspond to high absorbance regions.

In one embodiment, the first target and the second target can be genetic nucleic acids. Detecting the first target through absorbance of the light by the first signaling conjugate includes detecting a first colored signal selected from red, orange, yellow, green, blue, indigo, or violet. The first colored signal is associated with spectral absorbance associated with the first chromogenic moiety of the first signaling conjugate. Detecting the second target through absorbance of the light by the second signaling conjugate includes detecting a second colored signal selected from red, orange, yellow, green, blue, indigo, or violet. The second colored signal is associated with spectral absorbance associated with the second chromogenic moiety of the second signaling conjugate. The colored signals can be redefined to enhance color contrast. An overlap in proximity through absorbance of the light by the first signaling conjugate overlapping in proximity with the second signaling conjugate so that a third colored signal can be detected that is associated with overlapping spectral absorbance of the first spectral absorbance and the second spectral absorbance. According to one example, this third color signals a normal genetic arrangement and the first and second colors signal a genetic rearrangement or translocation.

ISH Three-Color Break Apart Probe

Figure 16A:
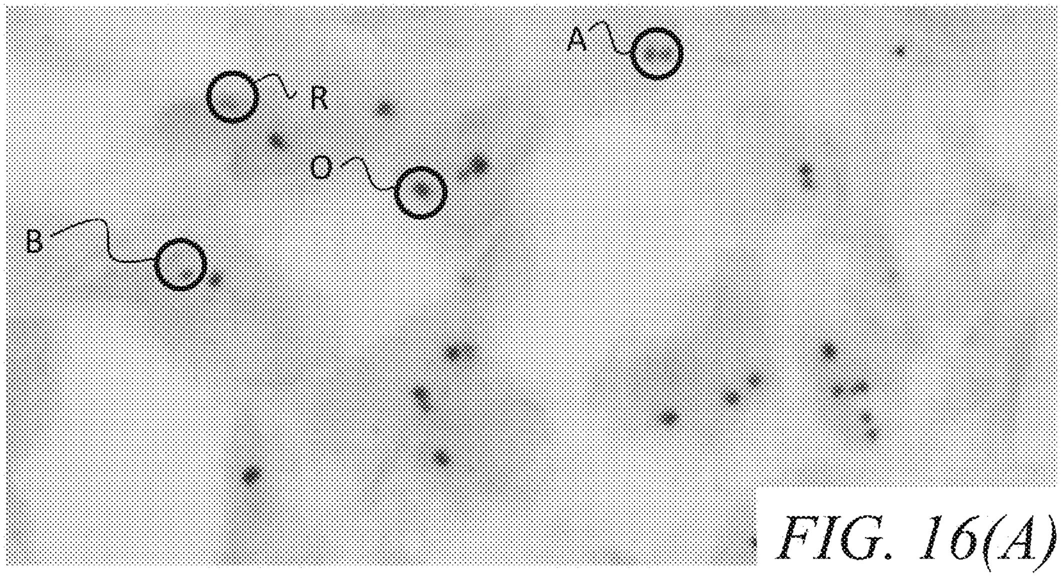
FIG. 16(A) is a photomicrograph of a dual stain of two gene probes on a lung tissue section testing for ALK rearrangements associated with non-small cell lung cancer.
Figure 16B:
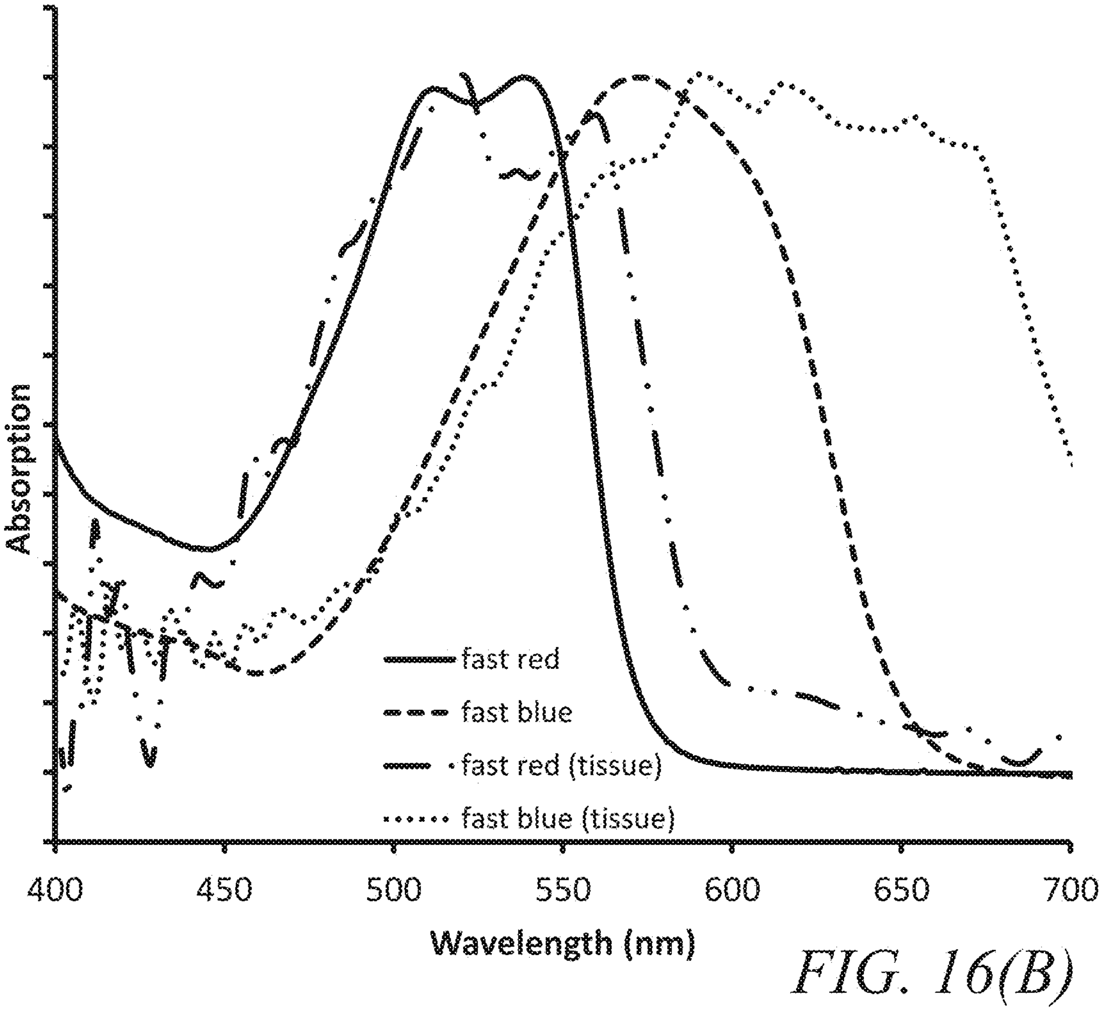
FIG. 16(B) is a UV-Vis spectra of fast red and fast blue in ethyl acetate solutions as well as traces obtained from tissue samples.
Figure 17A:
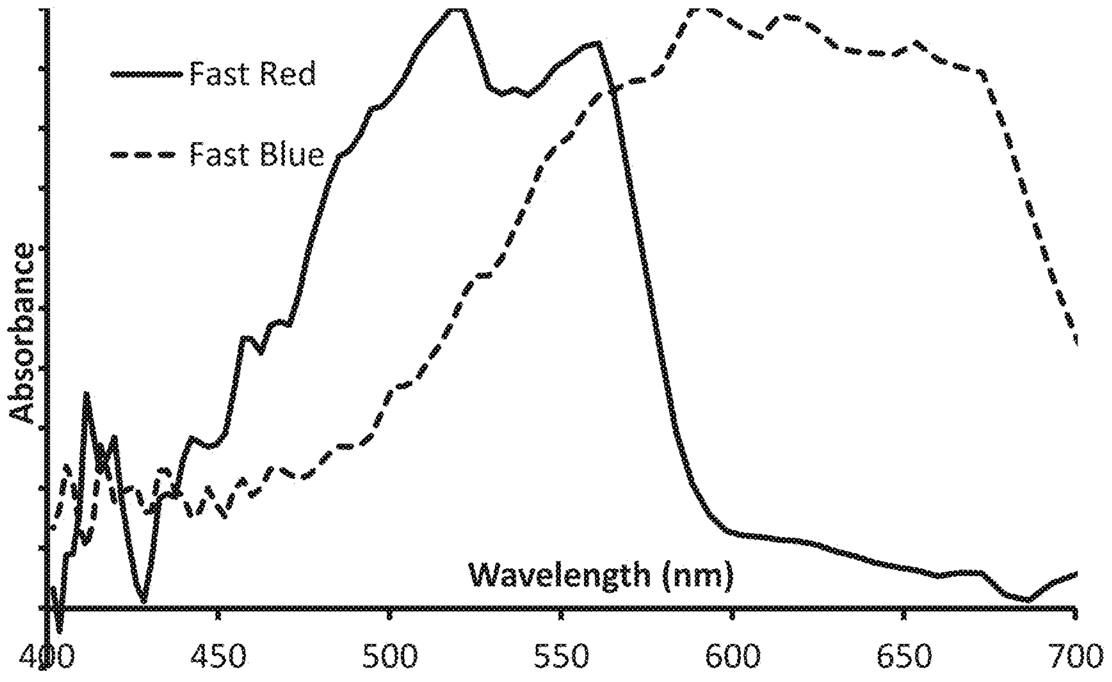
FIGS. 17(A) and 17(B) are graphs of wavelength versus absorbance and illustrate the two sets of traces.
Figure 17B:
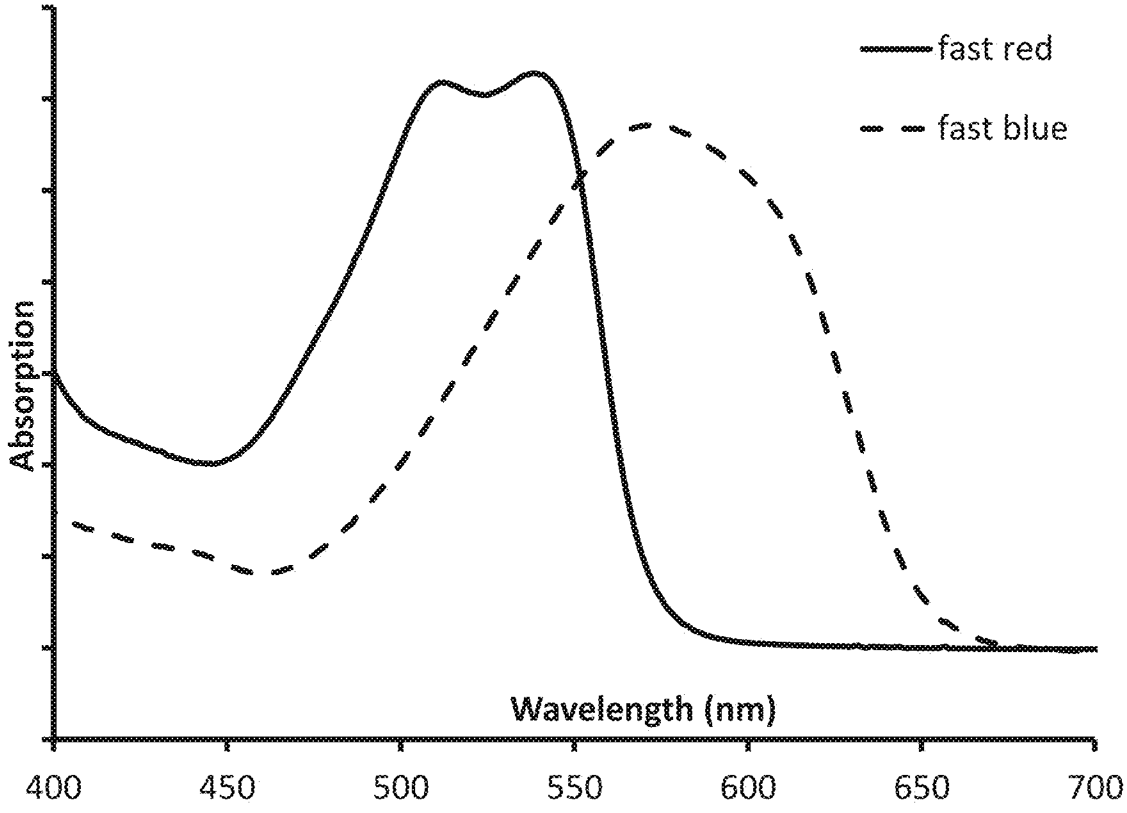

Signaling conjugates can be particularly useful in multiplexed assays, as well as assays using translocation probes. FIG. 16(A) is a bright field photomicrograph of a dual stain of two gene probes on section of lung tissue testing for ALK rearrangements associated with non-small cell lung cancer, and FIG. 16(B) is a UV-Vis spectra of fast red and fast blue in ethyl acetate solutions. The 3' probe was detected using fast red and the 5' probe was detected using fast blue. FIGS.

17(A) and 17(B) illustrate the traces of FIG. 16(B) separately. FIG. 16(B) shows that fast red and fast blue have broad and well-defined spectral absorption characteristics. Fast red shows strong absorption between about 475 nm and about 560 nm. Comparing this range to the color wheel, the expected color corresponding to the spectral absorption characteristic would be either red or orange. The range of absorption is so large it essentially covers all of those wavelengths one would expect to result in a red or an orange color. Fast blue exhibits strong absorption between about 525 nm and about 625 nm, a range even broader than fast red. Again, referring to the color wheel in FIG. 14(A), the absorption from 525-625 nm covers nearly half of the color wheel with blue, indigo, and violet being complementary. To enhance contrast between the fast red and fast blue, a light source can emit a wavelength with 475 nm-560 nm for imaging the fast red and another light source can emit a wavelength within 525-625 nm for imaging the fast blue. An enhanced image (not shown) can be produced based on absorption.

Referring now to FIG. 16(A), a fast red spot is highlighted by the circle (R), a fast blue spot is highlighted by the circle (B), a set of spots, one fast red spot and one fast blue spot, are labeled as adjacent by the circle (A), and a fast red spot and a fast blue spot overlapping each other is labeled by the circle (O). As predicted, the fast red spot (A) is red, and the fast blue spot (B) appears a dark bluish color one would expect from the mixture of blue, indigo and violet. The adjacent spots within circle (A) can be clearly distinguished from each other as separate red and blue spots. However, the spot that includes an overlapping red and blue spot results in an ambiguous color. It appears somewhat bluish and has a red fringe on one side. The color of the spot is difficult to distinguish and difficult to characterize. For an overlapping spot, the absorption of the fast red and the fast blue would be additive and the spectral absorption profile would span from about 475 nm to about 625 and have Amax of around 550 nm. Referring again to the color wheel (FIG. 14(A)), this range of wavelengths covers nearly the entire wheel. Broad based absorption covering the entire spectra typically gives a black or brown appearance with a tint of those colors absorbed least, in this case indigo and violet. A pathologist considering the photomicrograph in FIG. 16(A) may have difficulty distinguishing between a blue to indigo spot (B) and the overlapping spot (O).

Figure 18A:
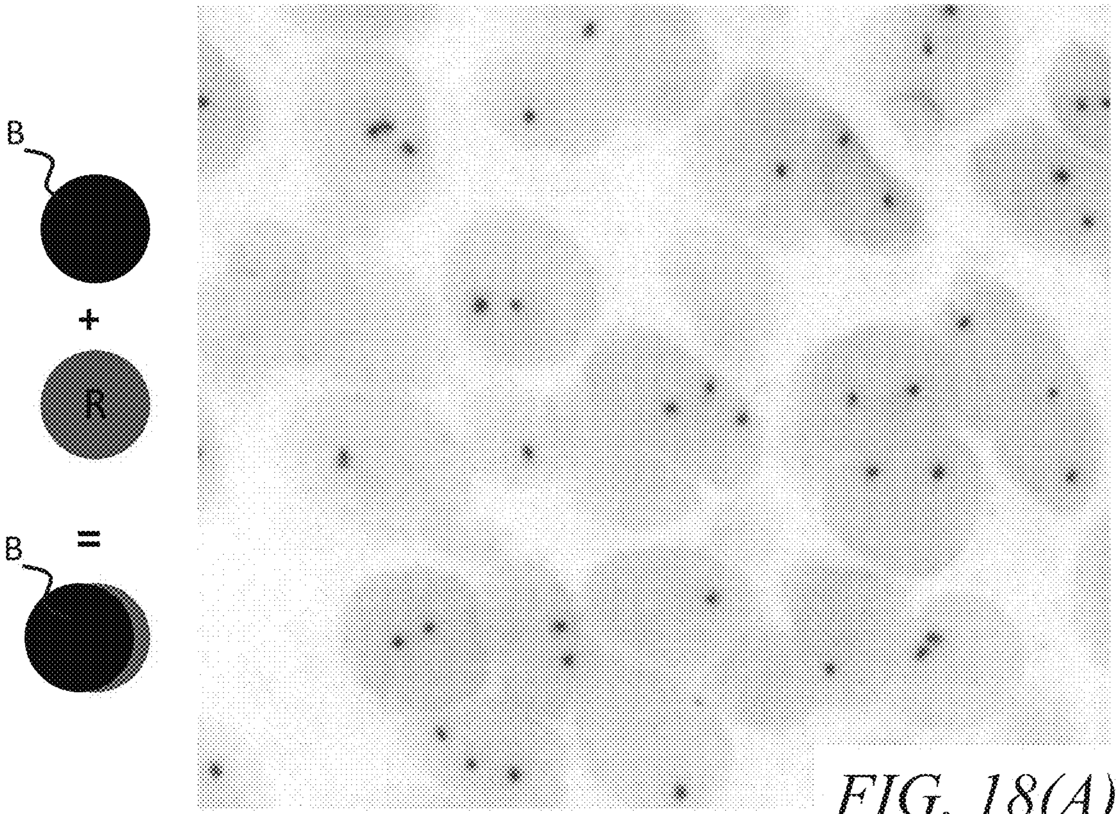
FIG. 18(A) shows a SISH/Red combined detection protocol and FIG. 18(B) shows a purple and yellow signaling conjugate as described herein. The signal produced by combining these two chromogens is detected as a third, unique color.
Figure 18B:
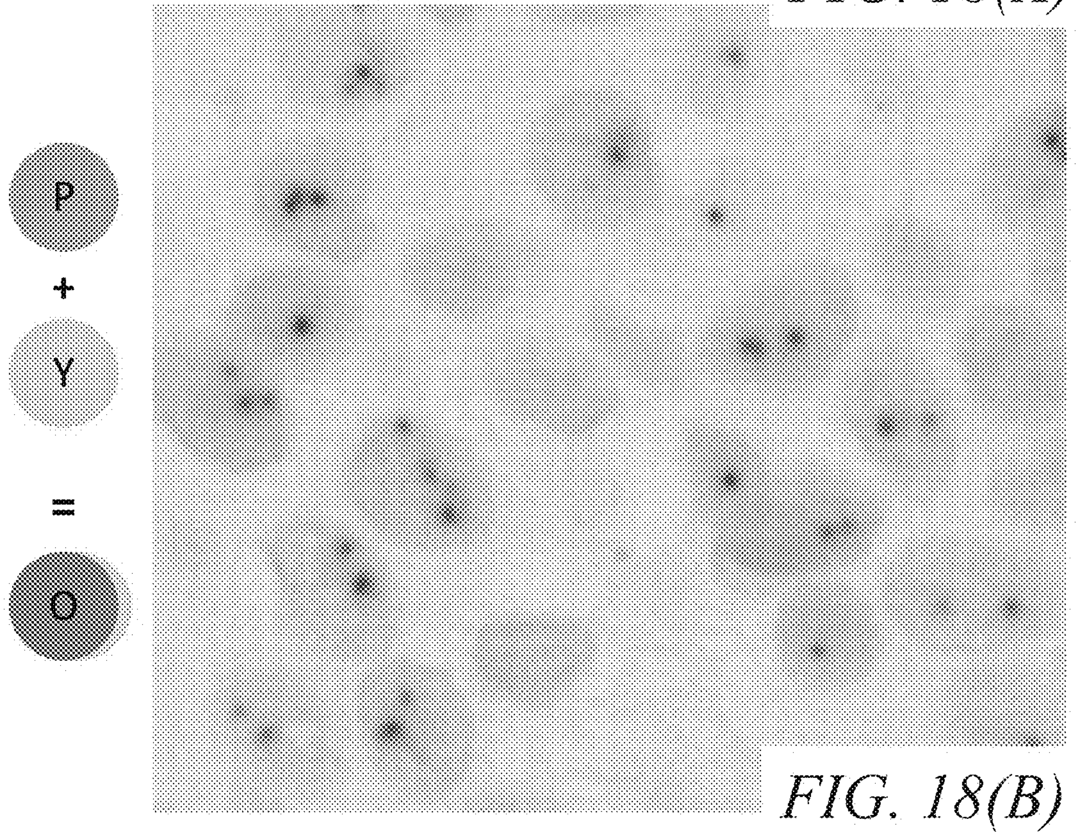
Figure 19A:
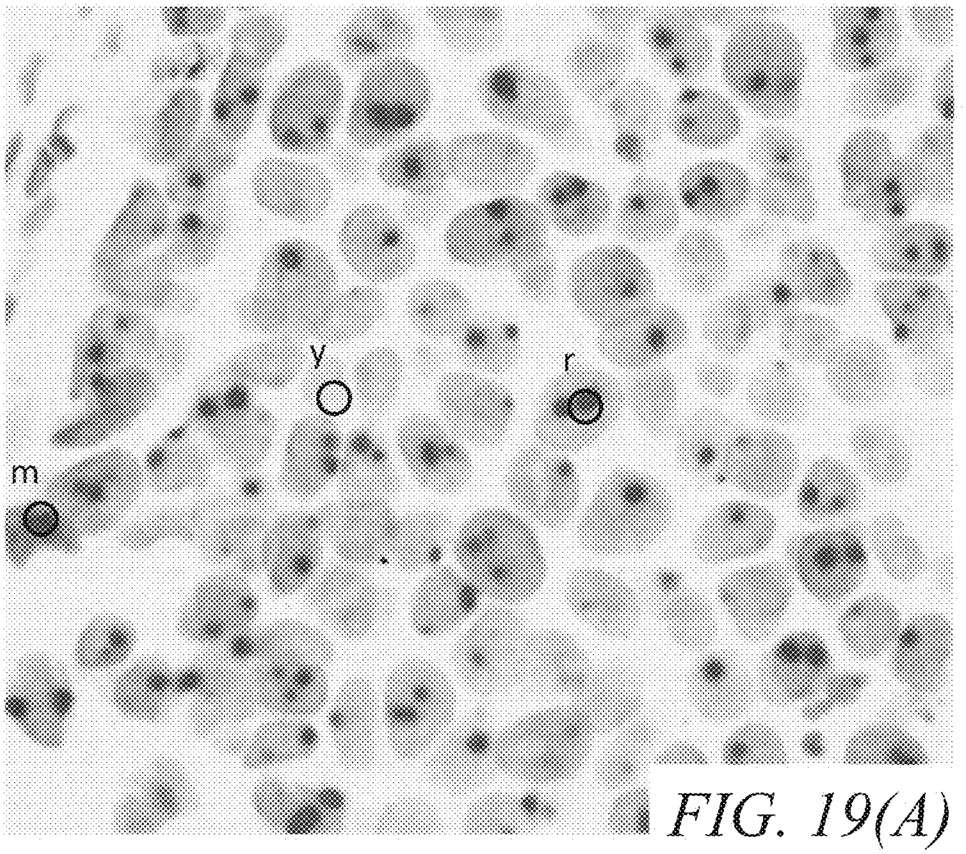
FIGS. 19(A-B) are photomicrographs showing two examples of depositing two colors proximally to create a visually distinct third color.
Figure 19B:
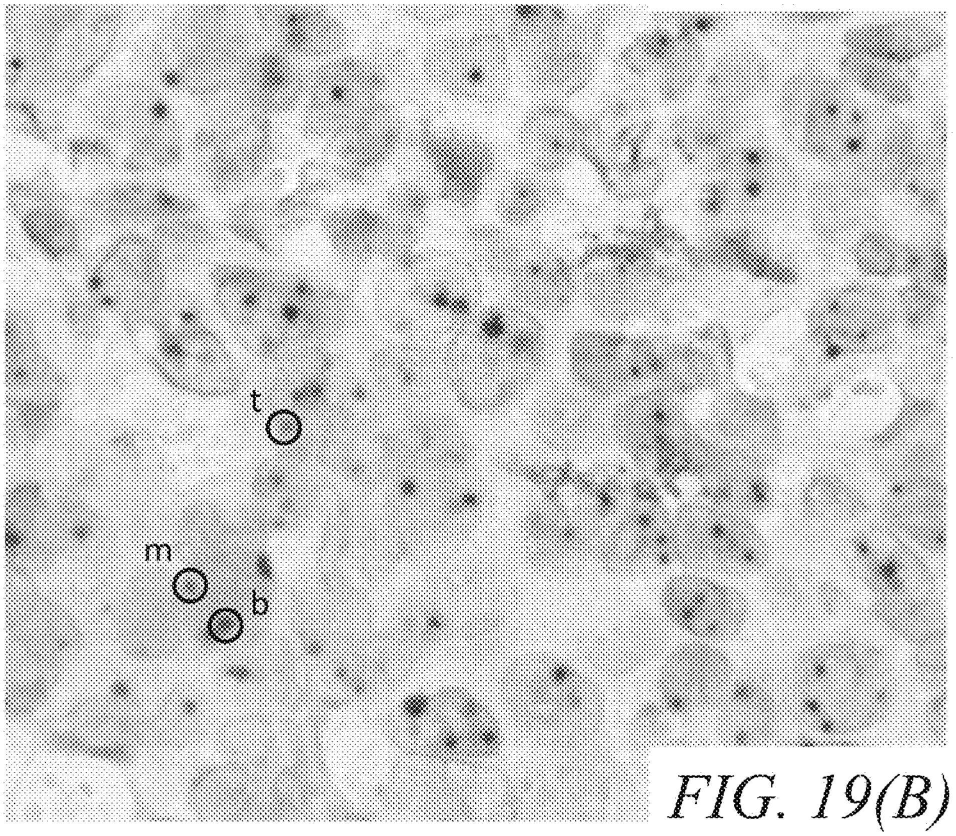

Different signaling conjugates can be purposefully selected and made to comprise chromogenic moieties that produce light at opposing ends of the UV-vis spectrum. FIGS. 18(A) and 18(B) illustrate how the disclosed signaling conjugates and method can be used for resolving the issue associated with probes comprising two different chromogenic moieties. With reference to FIG. 18(A), a chromogenic moiety capable of producing a black color ("B") is used in combination with a chromogenic moiety that produces a red color ("R"). When the two signaling conjugates overlap, it is unclear as two whether the observed black color ("B") is produced by the black chromogenic moiety or if it is produced by the overlap between the red and black chromogenic moieties. However, referring to FIG. 18(B), this problem can be solved by using two chromogenic moieties that, when combined, produce a third unique color. For example, a purple chromogenic moiety ("P") may be used in combination with a yellow chromogenic moiety ("Y"). The overlap between the two is readily observed, as an orange signal ("O") is produced. FIGS. 19(A-B) further show how two colors can be deposited proximally to create a visually distinct third color. In particular, FIG. 19(A) shows a yellow signal, shown with a letter "y", combined with magenta signal, shown with a letter "m", to create a vibrant cherry red color, shown with a letter "r". FIG. 19(B) shows a magenta signal indicated by the letter "m" and a turquoise signal, indicated by the letter "t" combine to create a dark blue signal, shown with a letter "b".

Illumination

A traditional white source and filter system may be used, such as those typically used by persons of ordinary skill in the art. For example, the illuminator 140 of FIG. 1 can include a white light source and a filter to produce set of color monochrome images. The color of the monochrome images can be redefined and combined to produce an enhanced digital image. In other disclosed embodiments, an LED light source may be used in the detection step in order to generate narrower illumination light, as discussed in connection with FIG. 3. Such light sources may be used in embodiments wherein one or more different signaling conjugates are used, particularly when three or more different conjugates are used. LED light sources can provide flexibility in the range of wavelength that can be absorbed by the disclosed signaling conjugate. In particular disclosed embodiments, the signaling conjugates can be visualized independently by illuminating the specimen with light of a wavelength where the chromogen absorbs, thus causing the chromogen to appear dark against a light background (light is absorbed by the chromogen, reducing the light intensity at that spot). For example, the light illuminating the specimen of FIG. 5(A) is absorbed by the chromogen 210, resulting in the chromogen 210 appearing relatively dark. In particular disclosed embodiments, illuminating the specimen with light that is not absorbed by the chromogen causes the chromogen to 'disappear' because the intensity of the light is not altered (absorbed) as it passes through the chromogen spot. For example, the light illuminating the specimen of FIG. 5(A) is not absorbed by the chromogen 211. The chromogen 211 thus appears relatively light compared to chromogen 210. The tissue features may cause some transmission losses, resulting in visualization of tissue features that do not absorb the light. Solely by way of example, illuminating a biological sample slide with green light causes the rhodamine chromogens to appear dark, whereas the Cy5 chromogen disappears. Conversely, illuminating the slide with red light causes the Cy5 chromogen to appear dark and the rhodamine chromogens to disappear.

Slides stained using certain disclosed signaling conjugates were illuminated using a multi-LED illuminator that was adapted to Olympus BX-51 light microscope. The specimen was imaged at each elimination step. Two LED illuminators were used: 1) a homebuilt 3-LED illuminator comprising a Lamina RGB light engine (EZ-43F0-0431) with 3 LED dynamics BuckPlus current regulated drivers with potentiometers and switches to permit on off control and variation of the red, green, and blue LED intensities independently; and 2) a TOFRA, Inc. RGBA Computer-Controlled LED Illuminator for Upright Microscopes modified for manual LED switching. To visualize only the tyramide chromogens, illuminating the specimen with light of a wavelength where the chromogen absorbs causes the chromogen to appear dark against a light background (light is absorbed by the chromogen, reducing the light intensity at that spot). Illuminating the specimen with light that is not absorbed by the chromogen causes the chromogen to 'disappear' because the intensity of the light is not altered (absorbed) as it passes through the chromogen spot.

Figure 20A:
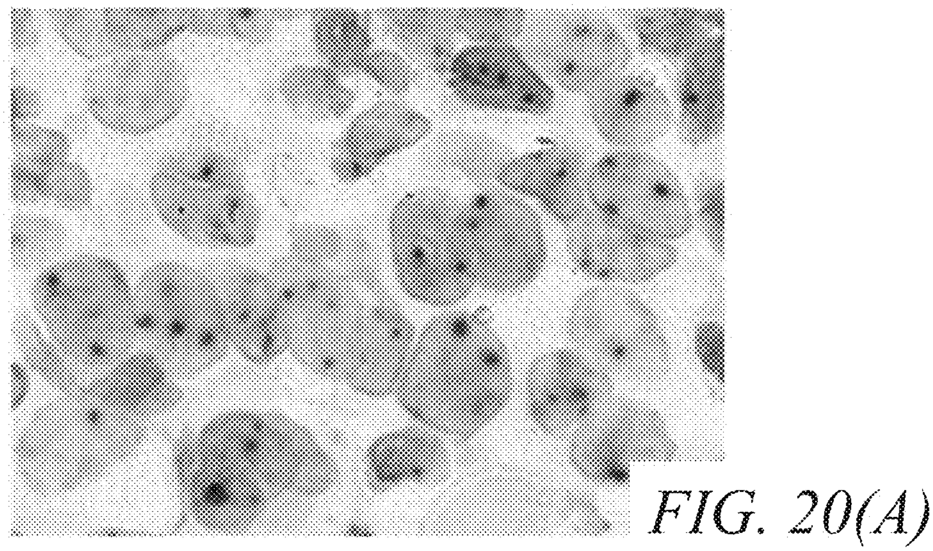
FIG. 20(A) shows white light illumination.
Figure 20B:
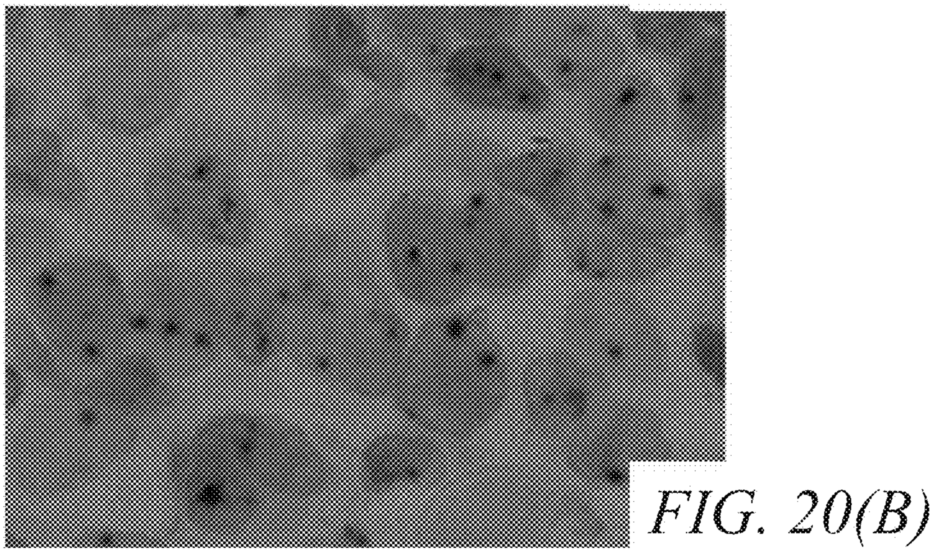
FIG. 20(B) shows green light illumination.
Figure 20C:
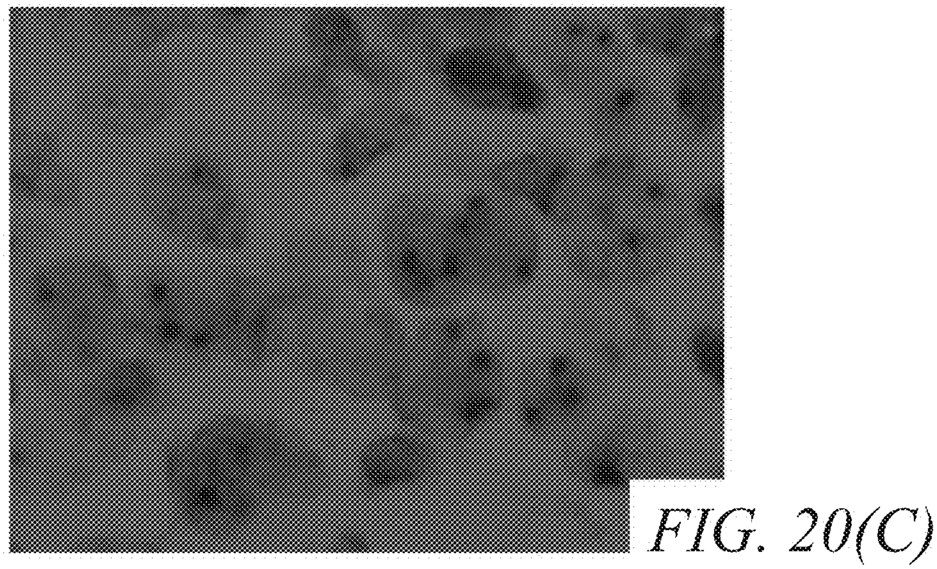
FIG. 20(C) shows red light illumination.

FIGS. 20(A-B) are photomicrographs of a sample that has been dual stained with a turquoise and magenta signaling conjugate under (A) white light illumination, (B) green light illumination, and (C) red light illumination. Illuminating the slide with red light causes the turquoise signaling conjugates to appear dark, whereas the magenta signaling conjugate disappears. Conversely, illuminating the slide with green light causes the magenta signaling conjugate to appear dark and the turquoise signaling conjugate to disappear. Overlap between the magenta and the turquoise signaling conjugates are dark in white light illumination, green light illumination, and red light illumination. The image of FIGS. 20(A, B) can be redefined (e.g., converted into different colors) and combined to promote contrast between the different conjugates. One of the perceived benefits of fluorescence microscopy is the ability to use filters to switch between the individual probe signals. Using the signaling conjugates described herein, it is possible to enable switching using chromogenic compounds. LED power sources can be easily added to a light microscope by replacing the condenser. The emission wavelength of the LED can be switched between colors by the user, with the push of a button 467 in FIG. 3 or automatically by the processing device 122. LED power sources can also replace the conventional illumination source of a brightfield microscope, with optics to appropriately guide the light into the illumination port of the microscope.

Tyrosine Enhancement

Tyramide signal amplification and the signaling conjugates described herein can react with tyrosine residues available from the sample and or the molecules/conjugates used to detect and label the targets. The amount of protein surrounding the biomarker to be detected is variable based on the natural variation between tissue samples. When detecting biomarkers present at high levels, or when detecting the co-localization of multiple biomarkers, the amount of protein to which the tyramide molecules can attach may be a limiting reactant in the deposition process. An insufficient amount of protein in the tissue can result in the diffusion of tyramide based detection, the potential to undercall the expression level of biomarkers, and the inability to detect co-localized biomarkers. One solution to these problems is to provide more protein binding sites (i.e. tyrosine) by coating the tissue with a proteinaceous solution and permanently cross-linking the protein to the tissue using formalin, or other fixatives.

The majority of work with TSA has been done in the context of fluorescent detection. Fluorescent TSA detection is accomplished by a single tyramide deposition of a fluorophore, and the deposition times are typically quite short because the sensitivity of the fluorescent detection is high, whereas the background associated with traditional TSA becomes problematic with longer deposition times. In contrast, chromogenic TSA detection may include multiple depositions of tyramide conjugates with extended deposition times. As such, the fluorescent TSA art does not suggest solutions to chromogenic TSA problems because the nature of the problem is so different. In particular, the saturation of a sample's tyrosine binding sites by tyramide reactive species is thought to be a unique problem particular to the detection chemistries described herein. Enhancements to TSA originating from the TSA fluorescence research typically addressed the diffusion of the reactive tyramide moieties and the lack of TSA signal. Solutions to these problems have been described in the art. For example, an increase in the viscosity of the reaction solution through the addition of soluble polymers was described for decreasing diffusion and HRP activity was enhanced through the addition of vanillin and/or iodophenol. These solutions were not sufficient to address some of the problems observed for the detection chemistries described herein.

Through various studies, it was discovered that the severity of the identified problem varies depending on the sample used. For example, it was found that breast cancer tissues and prostate cancer tissues included different levels of available tyramide binding sites. It is also known that there are differences in protein content in the cellular compartments (nucleus, cell membrane, cytoplasm, etc.) that are targeted in various IHC and/or ISH tests. Hence, in addition to being necessary for TSA co-localization, the proposed invention will normalize protein content (e.g. tyramide binding sites) and reduce variation between and across samples. In illustrative embodiments, the addition of a tyrosine enhancement agent may increase inter- and intra-sample reproducibility of assays described herein.

When using amplifying conjugates, as described herein, especially in conjunction with the signaling conjugates described herein, the amount of protein surrounding the target or targets may be insufficient. When detecting biomarkers present at high levels, or when detecting the co-localization of multiple biomarkers, the amount of protein in the sample to which the tyramide based detection reagents can attach may be the limiting reagent. An insufficiency in tyramide binding sites can cause a reduced reaction rate, allow the tyramide reactive molecules to diffuse away from the target, and generally results in a weaker response due to lower quantities of the signaling conjugates reacting in the vicinity of the target. It was discovered that providing more binding sites to the sample enhanced the detection as described herein. One approach to enhancing the available binding sites was to introduce a protein solution to the sample. So that the protein remains through various washes and so that the protein does not diffuse during or after subsequent detection steps, the protein was cross-linked to the sample using a fixative (e.g. formalin).

In illustrative embodiments, an additional amount of a tyrosine-containing reagent, such as a protein, may be incubated with and fixed to the biological sample in order to provide additional binding sites for multiple signaling or amplifying conjugates, such as in multiplexing or amplification. For example, when a translocation probe is used, clearer three-color staining may be obtained by adding an additional amount of protein to the biological sample. Additionally, non-specific probe binding can be decreased using this additional step. Exemplary embodiments concern adding BSA to the biological sample, followed by fixing the protein using a cross-linking agent, such as a fixative (e.g., 10% NBF).

To demonstrate the efficacy of the solution, it was first established that exogenous proteins can be fixed to a sample, (e.g. a histologically prepared paraffin-embedded tissue sample). To demonstrate that additional protein can be covalently attached to paraffin tissue sections, bovine serum albumin (BSA) was functionalized with a hapten (2,1,3-Benzoxadiaole-carbamide, "BF"). The BSA-BF was added to the tissue following a hybridization step where no probe was added, and all experiments were completed on a Benchmark XT automated slide stainer (Ventana Medical Systems, Inc., Tucson AZ). 10 μg of the BSA-BF conjugate was added to the slide and incubated for 16 minutes. BF-labeled BSA protein was then covalently fixed to the tissue by adding 100 μl of 4% paraformaldehyde, and incubating for 16 minutes.

Figure 21A:
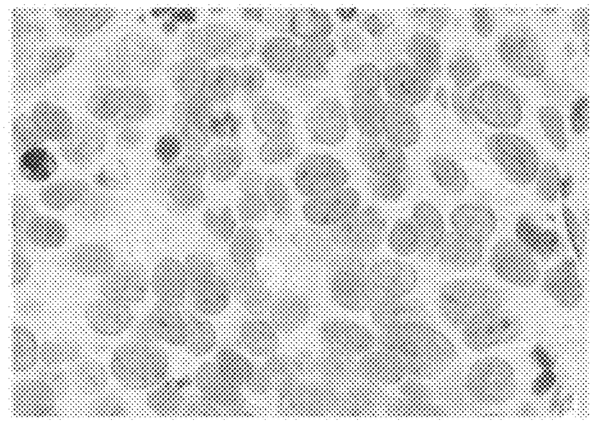
FIGS. 21(A-B) are photomicrographs showing FIG. 21(A) a control slide to which no BSA-BF was added and FIG. 21(B) a slide to which the BSA-BF had been attached to the sample.
Figure 21B:
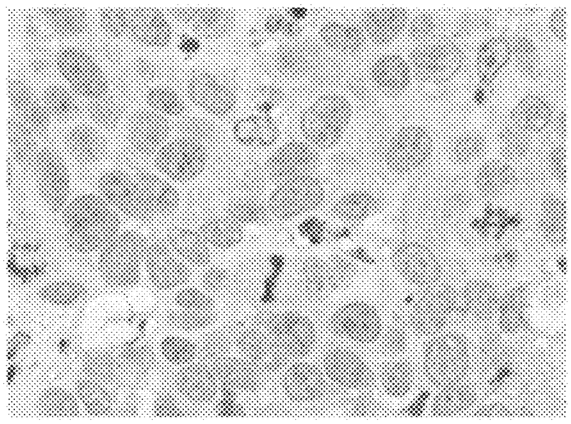

The presence of covalently attached BSA-BF was detected by adding an anti-BF monoclonal antibody that was functionalized with the horseradish peroxidase (HRP) enzyme. FIGS. 21(A-B) show a photomicrograph (FIG. 21(A)) of a control slide to which no BSA-BF was added, and FIG. 21(B) is a photomicrograph of the slide to which the BSA-BF had been used. The HRP enzyme catalyzed the deposition of tyramide-TAMRA which stains the slide with a pink chromogen where the BSA-BF was attached to the tissue. Without the presence of the BSA-BF, under the same experimental conditions, no pink chromogen is deposited (FIG. 21(A)), suggesting that exogenously added BSA protein can be permanently fixed into paraffin embedded tissue sections.

Figure 22A:
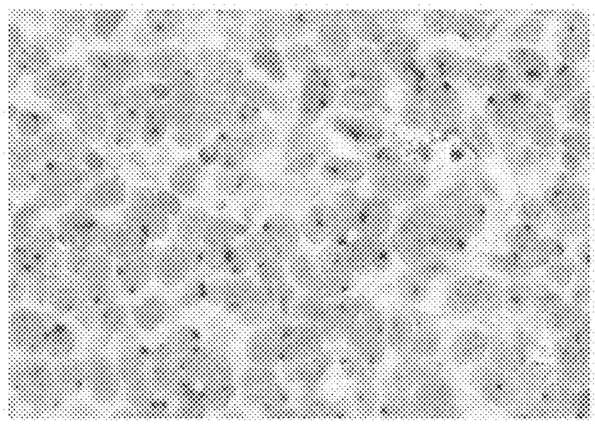
FIGS. 22(A-B) are photomicrographs showing a sample stained with a signaling conjugate FIG. 22(A) without tyrosine enhancement and FIG. 22(B) with tyrosine enhancement.
Figure 22B:
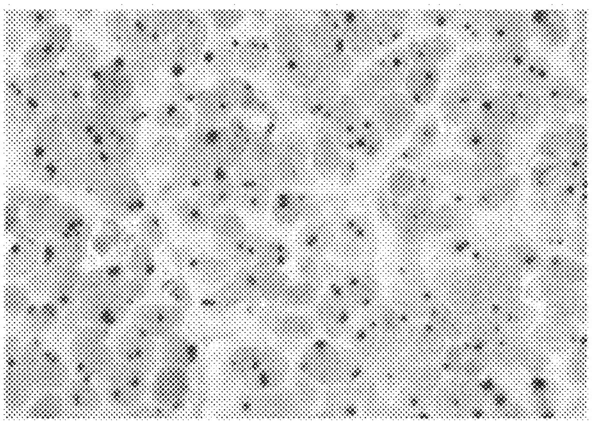

It was discovered that applying a signaling conjugate, as described herein, for certain embodiments is more efficient using a tyrosine enhancement agent following non-staining tyramide deposition cycles. To confirm this hypothesis, tissue samples were subjected to multiple rounds of TSA with a tyramide-hapten conjugate. FIGS. 22(A-B) are photomicrographs of a first sample (FIG. 22(A)) to which a signaling conjugate, as described herein, was deposited and FIG. 22(B) is a second sample in which a tyrosine enhancement solution was used prior to detection with the signaling conjugate. The difference between FIG. 22(A) and FIG. 22(B) supports the hypothesis that the availability of protein within the sample is diminished by TSA depositions and that the addition of the tyrosine-containing enhancers can provide more robust staining. In the absence of protein fixation (FIG. 22(A)) the subsequent deposition of the signaling conjugate produced a low level of chromogenic signal. When the exogenous protein was fixed into the tissue section using paraformaldehyde (FIG. 22(B)), the signaling conjugate produced signals significantly more intense and numerous. The data suggests that fixation of exogenous protein to tissue sections enhances tyramide signal amplification by providing additional protein binding sites for the tyramide reagents to covalently attach.

One disclosed embodiment of a method for detecting a target in a sample comprises: contacting the sample with a detection probe specific to the target; contacting the sample with a tyrosine enhancer; contacting the sample with a cross-linking agent; contacting the sample with a tyramide-based detection reagent; and detecting the target in the sample; wherein the cross-linking reagent covalently attaches the tyrosine enhancer to the sample. In one embodiment, the method further comprises contacting the sample with a labeling conjugate. In another embodiment, the method further comprises contacting the sample with an amplifying conjugate. In one embodiment, the method further comprises detecting a second target, wherein contacting the sample with the tyrosine enhancer occurs subsequent to contacting the sample with the tyramide-based detection reagents for the first target and prior to contacting the sample with tyramide-based detection reagents for the second target. In one embodiment, the tyrosine enhancer includes a protein. In another embodiment, the tyrosine enhancer is a polymer containing tyrosine residues. In one embodiment, the cross-linking agent is formalin or formaldehyde. In another embodiment, the crosslinking agent is neutral buffered formalin (NBF). In another embodiment the cross-linking agent is an imidoester, a dimethyl suberimidate, or a N-Hydroxysuccinimide-ester (NHS ester). In another embodiment, the cross-linking agent is light radiation. In one embodiment, the cross-linking agent is UV light or X-ray radiation. In one embodiment, detecting the target in the sample includes imaging at least one of the tyramide-based detection reagents. In another embodiment, detecting the target includes fluorescently imaging at least one of the tyramide-based detection reagents. In another embodiment, detecting the target includes imaging at least one of the tyramide-based detection reagents, the tyramide-based detection reagents yielding a chromogenic signal detectable using bright-field light microscopy. In another embodiment, detecting the target includes imaging a signaling conjugate. In another embodiment, detecting the target includes imaging a chromogen that was deposited in the vicinity of at least one of the tyramide-based detection reagents.

Counterstaining

Counterstaining is a method of post-treating the samples after they have already been stained with agents to detect one or more targets, such that their structures can be more readily visualized. For example, a counterstain is optionally used prior to cover-slipping to render the immunohistochemical stain more distinct. Counterstains differ in color from a primary stain. Numerous counterstains are well known, such as hematoxylin, eosin, methyl green, methylene blue, Giemsa, Alcian blue, and Nuclear Fast Red. In some examples, more than one stain can be mixed together to produce the counterstain. This provides flexibility and the ability to choose stains. For example, a first stain, can be selected for the mixture that has a particular attribute, but yet does not have a different desired attribute. A second stain can be added to the mixture that displays the missing desired attribute. For example, toluidine blue, DAPI, and pontamine sky blue can be mixed together to form a counterstain. One aspect of the present disclosure is that the counterstaining methods known in the art are combinable with the disclosed methods and compositions so that the stained sample is easily interpretable by a reader.

V. Conjugates

Disclosed herein are various different conjugates suitable for use in the disclosed systems and methods. The various classes of conjugates contemplated by the present disclosure are described below. A wide of different conjugates can be used for multiplexing.

Detection Probes

Detection probes can be used to detect a target in a sample, for example a biological sample. The detection probes can include a specific binding moiety that is capable of specifically binding to the target. Detection probes include one or more features that enable detection through a labeling conjugate. Representative detection probes include nucleic acid probes and primary antibody probes.

In illustrative embodiments, the detection probe is an oligonucleotide probe or an antibody probe. As described herein, detection probes may be indirect detection probes. Indirect detection probes are not configured to be detected directly. In particular, the probes are not configured for the purpose of direct visualization. Instead, detection probes will generally be one of two types, although these are not mutually exclusive types. The first type of detection probe is haptenated and the second type of detection probes are based on a particular species of antibody. Other types of detection probes are known in the art and within the scope of the current disclosure, but these are less commonly implemented, for example aptamer-labeled probes or antibodies, nucleic acid tagged probes or antibodies, antibodies that are covalently bound to other antibodies so as to provide dual-binding capabilities (e.g., through coupling techniques or through fusion proteins). While not configured as such, some of the detection probes may have properties that enable their direct detection. For example, using hapten fluorophores is within the scope of the present disclosure. According to one embodiment, the detection probe includes a hapten label. Those of ordinary skill in the art appreciate that a detection probe can be labeled with one or more haptens using various approaches. The detection probe may include a hapten selected from the group consisting an oxazole hapten, pyrazole hapten, thiazole hapten, nitroaryl hapten, benzofuran hapten, triterpene hapten, urea hapten, thiourea hapten, rotenoid hapten, coumarin hapten, cyclolignan hapten, di-nitrophenyl hapten, biotin hapten, digoxigenin hapten, fluorescein hapten, and rhodamine hapten. In other examples, the detection probe is monoclonal antibody derived from a second species such as goat, rabbit, mouse, or the like. For labeling a hapten-labeled detection probe, the labeling conjugate would include an anti-hapten antibody. For labeling a species-based detection probe, the labeling conjugate may be configured with an anti-species antibody.

In illustrative embodiments, the present disclosure describes nucleic acid probes that can hybridize to one or more target nucleic acid sequences. The nucleic acid probe preferably hybridizes to a target nucleic acid sequence under conditions suitable for hybridization, such as conditions suitable for in situ hybridization, Southern blotting, or Northern blotting. Preferably, the detection probe portion comprises any suitable nucleic acid, such as RNA, DNA, LNA, PNA or combinations thereof, and can comprise both standard nucleotides such as ribonucleotides and deoxyribonucleotides, as well as nucleotide analogs. LNA and PNA are two examples of nucleic acid analogs that form hybridization complexes that are more stable (i.e., have an increased Tm) than those formed between DNA and DNA or DNA and RNA. LNA and PNA analogs can be combined with traditional DNA and RNA nucleosides during chemical synthesis to provide hybrid nucleic acid molecules than can be used as probes. Use of the LNA and PNA analogs allows modification of hybridization parameters such as the Tm of the hybridization complex. This allows the design of detection probes that hybridize to the detection target sequences of the target nucleic acid probes under conditions that are the same or similar to the conditions required for hybridization of the target probe portion to the target nucleic acid sequence.

Suitable nucleic acid probes can be selected manually, or with the assistance of a computer implemented algorithm that optimizes probe selection based on desired parameters, such as temperature, length, GC content, etc. Numerous computer implemented algorithms or programs for use via the internet or on a personal computer are available. For example, to generate multiple binding regions from a target nucleic acid sequence (e.g., genomic target nucleic acid sequence), regions of sequence devoid of repetitive (or other undesirable, e.g., background-producing) nucleic acid sequence are identified, for example manually or by using a computer algorithm, such as RepeatMasker. Methods of creating repeat depleted and uniquely specific probes are found in, for example, US Patent Publication No. 2012/0070862. Within a target nucleic acid sequence (e.g., genomic target nucleic acid sequence) that spans several to several-hundred kilobases, typically numerous binding regions that are substantially or preferably completely free of repetitive (or other undesirable, e.g., background-producing) nucleic acid sequences are identified.

In some embodiments, a hapten is incorporated into the nucleic acid probe, for example, by use of a haptenylated nucleoside. Methods for conjugating haptens and other labels to dNTPs (e.g., to facilitate incorporation into labeled probes) are well known in the art. Indeed, numerous labeled dNTPs are available commercially, for example from Invitrogen Detection Technologies (Molecular Probes, Eugene, Oreg.). A label can be directly or indirectly attached to a dNTP at any location on the dNTP, such as a phosphate (e.g., α, β or γ phosphate), a ring or exocyclic position, or a sugar. The probes can be synthesized by any suitable, known nucleic acid synthesis method. In some embodiments, the detection probes are chemically synthesized using phosphoramidite nucleosides and/or phosphoramidite nucleoside analogs. For example, in some embodiments, the probes are synthesized by using standard RNA or DNA phosphoramidite nucleosides. In some embodiments, the probes are synthesized using either LNA phosphoramidites or PNA phosphoramidites, alone or in combination with standard phosphoramidite nucleosides. In some embodiments, haptens are introduced on abasic phosphoramidites containing the desired detectable moieties. Other methods can also be used for detection probe synthesis. For example, a primer made from LNA analogs or a combination of LNA analogs and standard nucleotides can be used for transcription of the remainder of the probe. As another example, a primer comprising detectable moieties is utilized for transcription of the rest of the probe. In still other embodiments, segments of the probe produced, for example, by transcription or chemical synthesis, may be joined by enzymatic or chemical ligation.

A variety of haptens may be used in the detectable moiety portion of the detection probe. Such haptens include, but are not limited to, pyrazoles, particularly nitropyrazoles; nitrophenyl compounds; benzofurazans; triterpenes; ureas and thioureas, particularly phenyl ureas, and even more particularly phenyl thioureas; rotenone and rotenone derivatives, also referred to herein as rotenoids; oxazole and thiazoles, particularly oxazole and thiazole sulfonamides; coumarin and coumarin derivatives; cyclolignans, exemplified by podophyllotoxin and podophyllotoxin derivatives; and combinations thereof. Fluorescein derivatives (FITC, TAMRA, Texas Red, etc.), Digoxygenin (DIG), 5-Nitro-3-pyrozolecarbamide (nitropyrazole, NP), 4,5,-Dimethoxy-2-nitrocinnamide (nitrocinnamide, NCA), 2-(3,4-Dimethoxyphenyl)-quinoline-4-carbamide (phenylquinolone, DPQ), 2,1,3-Benzoxadiazole-5-carbamide (benzofurazan, BF), 3-Hydroxy-2-quinoxalinecarbamide (hydroxy quinoxaline, HQ), 4-(Dimethylamino)azobenzene-4'-sulfonamide (DABSYL), Rotenone isoxazoline (Rot), (E)-2-(2-(2-oxo-2,3-dihydro-IH-benzo[b][1,4]diazepin-4-yl)phenozy)acetamide (benzodiazepine, BD), 7-(diethylamino)-2-oxo-2H-chromene-3-carboxylic acid (coumarin 343, CDO), 2-Acetamido-4-methyl-5-thiazolesulfonamide (thiazolesulfonamide, TS), and p-Mehtoxyphenylpyrazopodophyllamide (Podo). These haptens and their use in probes are described in more detail in U.S. Pat. No. 7,695,929.

Labeling Conjugates & Secondary Labeling Conjugates

In illustrative embodiments, the labeling conjugate specifically binds to the detection probe and is configured to label the target with an enzyme. As described above, detection probes configured from a second species or to include a hapten can be detected by either an anti-species antibody or an anti-hapten antibody. One approach to configuring a labeling conjugate has been to directly couple an enzyme to the anti-species or anti-hapten antibody. Conjugates of this kind, which may or may not include various linkers, are also described in U.S. Pat. No. 7,695,929. The labeling conjugate includes one or more enzymes. Exemplary enzymes include oxidoreductases or peroxidases. The signaling conjugate includes a latent reactive moiety and a chromogenic moiety. The enzyme catalyzes conversion of the latent reactive moiety into a reactive moiety which covalently binds to the biological sample proximally to or directly on the target.

The secondary labeling conjugate is used in connection with the amplifying conjugates, as described herein. Secondary labeling conjugates are configured in the same manner as labeling conjugates except that they are configured to label haptens deposited through an amplification process instead of haptens conjugated to detection conjugates. In illustrative embodiments, a secondary labeling conjugate comprises an anti-hapten antibody conjugated to an enzyme. In one embodiment, the enzyme is an oxidoreductase or a peroxidase.

Signaling Conjugate

Another type of conjugate disclosed herein is a signaling conjugate. The signaling conjugate provides the detectable signal that is used to detect the target, according to the methods disclosed herein. In particular disclosed embodiments, the signaling conjugate comprises a latent reactive moiety and a chromophore moiety.

Signaling conjugates may be configured to absorb light more selectively than traditionally available chromogens. Detection is realized by absorbance of the light by the signaling conjugate; for example, absorbance of at least about 5% of incident light would facilitate detection of the target. In other darker stains, at least about 20% of incident light would be absorbed. Non-uniform absorbance of light within the visible spectra results in the chromophore moiety appearing colored. The chromogen conjugates disclosed herein may appear colored due to their absorbance; the chromogen conjugates may appear red, orange, yellow, green, indigo, or violet depending on the spectral absorbance associated with the chomophore moiety. According to another aspect, the chromophore moieties may have narrower spectral absorbances than those absorbances of traditionally used chromogens (e.g., DAB, Fast Red, Fast Blue). In illustrative embodiments, the spectral absorbance associated with the first chromophore moiety of the first signaling conjugate has a full-width half-max (FWHM) of between about 30 nm and about 250 nm, between about 30 nm and about 150 nm, between about 30 nm and about 100 nm, or between about 20 nm and about 60 nm.

Narrow spectral absorbances enable the signaling conjugate chromophore moiety to be analyzed differently than traditional chromogens. While having enhanced features compared to traditionally chromogens, detecting the signaling conjugates remains simple. Detecting can include using a bright-field microscope, imaging systems disclosed herein, or an equivalent digital scanner.

An embodiment of the disclosed signaling conjugate is illustrated in FIGS. 10(A) and 10(B). Referring to FIGS. 10(A-B), the signaling conjugate 412 comprises a latent reactive moiety 404 and a chromophore moiety 6; in another embodiment, an alternative signaling conjugate 414 may include a linker 408 for conjugating chromophore moiety 406 to latent reactive moiety 404. In particular disclosed embodiments, the signaling conjugate has the following general Formula 1:

Formula 1

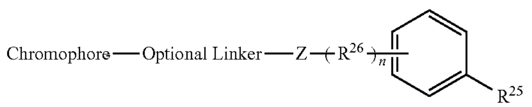

The disclosed signaling conjugate typically comprises a latent reactive moiety as described herein. For example, the latent reactive moiety may be the same or different from that of the disclosed amplification conjugate; however, each latent reactive moiety is capable of forming a reactive radical species and has the general formula provided herein. As shown in Formula 1, the signaling conjugate may comprise an optional linker. If a linker is used, it may be selected from any of the linkers disclosed herein. In particular disclosed embodiments, the linker is selected to improve hydrophilic solution solubility of the signaling conjugate, and/or to improve conjugate functionality on the biological sample. In particular disclosed embodiment, the linker is an alkylene oxide linker, such as a polyethylene glycol linker; however, any of the linkers disclosed herein may be used for the signaling conjugate.

Chromophore Moiety

A chromophore moiety is generally described as the part of a molecule responsible for its color. Colors arise when a molecule absorbs certain wavelengths of visible light and transmits or reflects others. The chromophore is a region in the molecule where the energy difference between two different molecular orbitals falls within the range of the visible spectrum, wherein visible light interacting with that region can be absorbed. The absorbance is usually associated with an electron transition from its ground state to an excited state. Molecules having ground state to excited state energy differences within the visible spectrum are often conjugated carbon structures. In these compounds, electrons transition between energy levels that are extended pi-orbitals, created by a series of alternating single and double bonds, often in aromatic systems. Common examples include various food colorings, fabric dyes (azo compounds), pH indicators, lycopene, β-carotene, and anthocyanins. The structure of the molecule imparts the characteristic of the pi-orbitals which result in the energy level. Typically, lengthening or extending a conjugated system with more unsaturated (multiple) bonds in a molecule will tend to shift absorption to longer wavelengths. Woodward-Fieser rules can be used to approximate ultraviolet-visible maximum absorption wavelength in organic compounds with conjugated pi-bond systems.

In illustrative embodiments, metal complexes can be chromophores. For example, a metal in a coordination complex with ligands will often absorb visible light. For example, chlorophyll and hemoglobin (the oxygen transporter in the blood of vertebrate animals) are chromophores that include metal complexes. In these two examples, a metal is complexed at the center of a porphyrin ring: the metal being iron in the heme group of hemoglobin, or magnesium in the case of chlorophyll. The highly conjugated pi-bonding system of the porphyrin ring absorbs visible light. The nature of the central metal can also influence the absorption spectrum of the metalloporphyrin complex or properties such as excited state lifetime.

In illustrative embodiments, the chromophore moiety is a coumarin or coumarin derivative. A general formula for coumarin and coumarin derivatives is provided below.

Formula 2

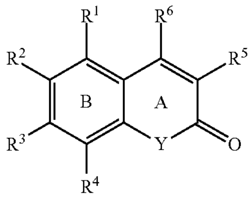

With reference to Formula 2, $R^1$-$R^6$ are defined herein. At least one of the $R^1$-$R^6$ substituents also typically is bonded to a linker or the latent reactive moiety (e.g., a tyramide or tyramide derivative). Certain working embodiments have used the position indicated as having an $R^5$ substituent for coupling to a linker or latent reactive moiety (e.g., a tyramide or tyramide derivative). Substituents other than hydrogen at the 4 position are believed to quench fluorescence, but are useful within the scope of the present disclosure. Y is selected from oxygen, nitrogen or sulfur. Two or more of the $R^1$-$R^6$ substituents available for forming such compounds also may be atoms, typically carbon atoms, in a ring system bonded or fused to the compounds having the illustrated general formula. Exemplary embodiments of these types of compounds include:

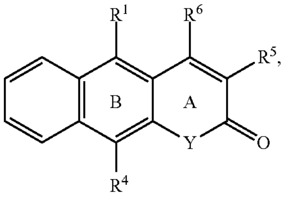

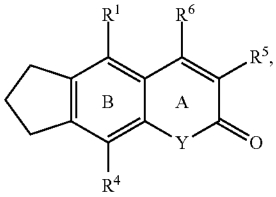

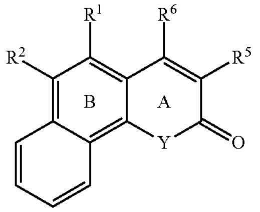

and

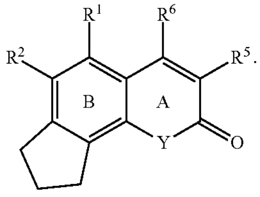

A person of ordinary skill in the art will appreciate that the rings also could be heterocyclic and/or heteroaryl.

Working embodiments typically comprise fused A-D ring systems having at least one linker, tyramide, or tyramide derivative coupling position, with one possible coupling position being indicated below:

Formula 3

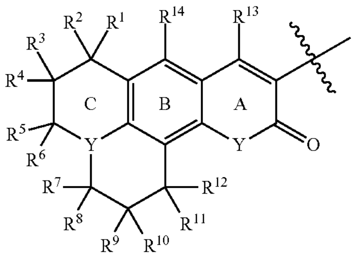

With reference to Formula 3, the R and Y variable groups are as stated herein. Most typically, $R^1$-$R^{14}$ independently are hydrogen or lower alkyl. Particular embodiments of coumarin-based chromophores include 2,3,6,7-tetrahydro-11-oxo-1H,5H,11H-[1]benzopyrano[6,7,8-ij]quinolizine-10-carboxylic acid

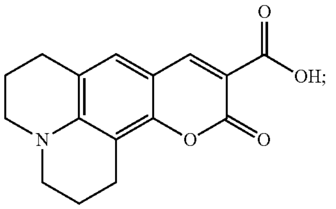 [SMILES: O=C(O)c1cc2cc3c4c(c2oc1=O)CCCN4CCC3]

and 7-(diethylamino) coumarin-3-carboxylic acid

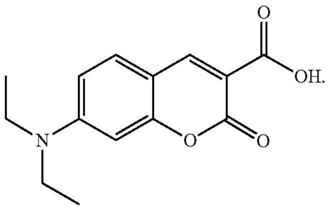 [SMILES: CCN(CC)c1ccc2cc(C(=O)O)c(=O)oc2c1]

Another class of chromogenic moieties suitable for use herein include diazo-containing chromogens. These particular chromophores may have a formula as illustrated below.

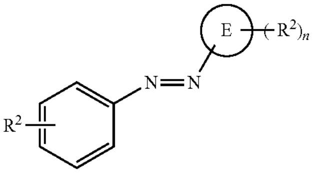

With respect to this formula, ring E may be selected from phenyl, imidazole, pyrazole, oxazole, and the like. Each $R^2$ independently may be selected from those groups recited herein. In particular disclosed embodiments, each $R^2$ independently is selected from amine, substituted amine, phenyl, hydroxyl, sulfonyl chloride, sulfonate, carboxylate, and combinations thereof; and n may range from zero to 5. Particular disclosed embodiments may be selected from the following diazo chromophores: DABSYL, which has a $\lambda_{max}$ of about 436 nm and has the following chemical structure

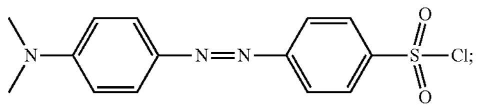 [SMILES: CN(C)c1ccc(N=Nc2ccc(S(=O)(=O)Cl)cc2)cc1]

and

Tartrazine, which has a $\lambda_{max}$ of about 427 nm and has the following chemical structure

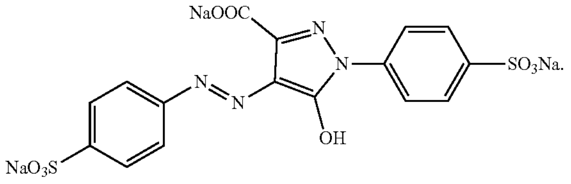

In yet other embodiments, the chromophore may be a triarylmethane compound. Triarylmethane compounds within the scope of the present disclosure may have the following formula.

Formula 4

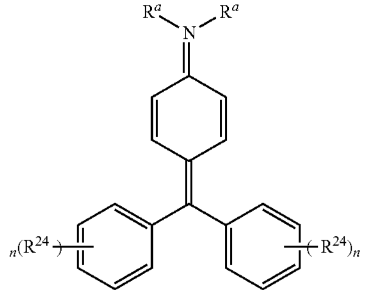

With respect to Formula 4, each $R^a$ independently may be selected from hydrogen, aliphatic, aryl, and alkyl aryl; and each $R^{24}$ may be selected from amine, substituted amine, hydroxyl, alkoxy, and combinations thereof; each n independently may range from zero to 5. Exemplary chromophores are provided below:

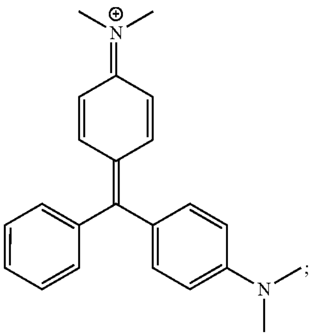

and

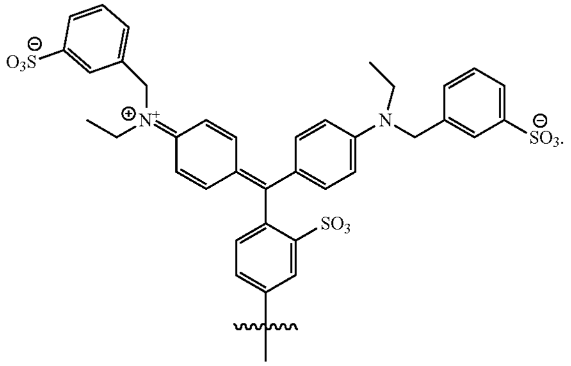

In other disclosed embodiments, the chromophore moiety may have the following formula

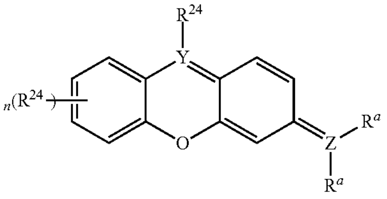

wherein each $R^a$ independently may be selected from hydrogen, aliphatic, aryl, and alkyl aryl; each $R^{24}$ independently may be selected from the groups provided herein, including substituted aryl, which comprises an aryl group substituted with one or more groups selected from any one of $R^1$-$R^{23}$, which are disclosed herein; Y may be nitrogen or carbon; Z may be nitrogen or oxygen; and n may range from zero to 4. In particular disclosed embodiments, Z is nitrogen and each $R^a$ may be aliphatic and fused with a carbon atom of the ring to which the amine comprising $R^a$ is attached, or each Ra may join together to form a 4 or 6-membered aliphatic or aromatic ring, which may be further substituted. Exemplary embodiments are provided as follows:

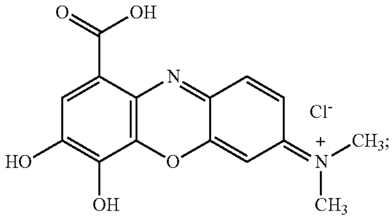

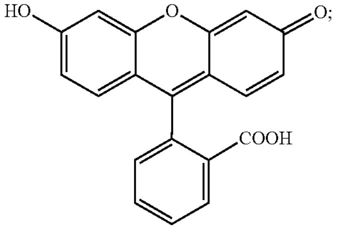

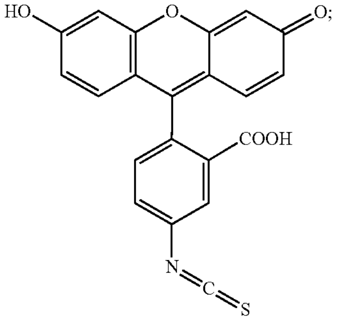

-continued

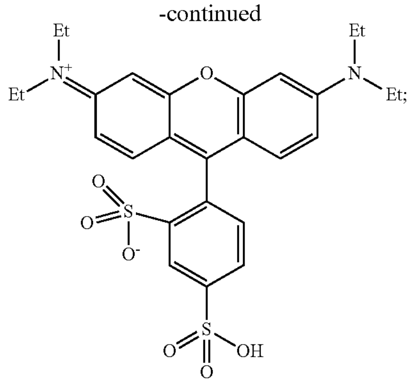

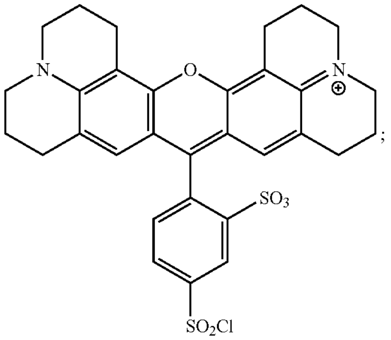

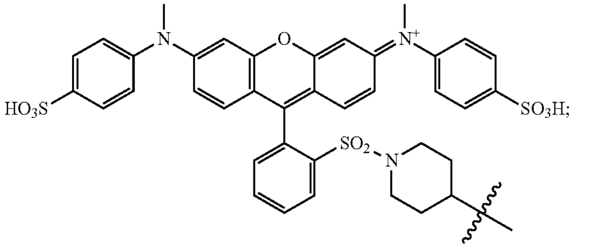

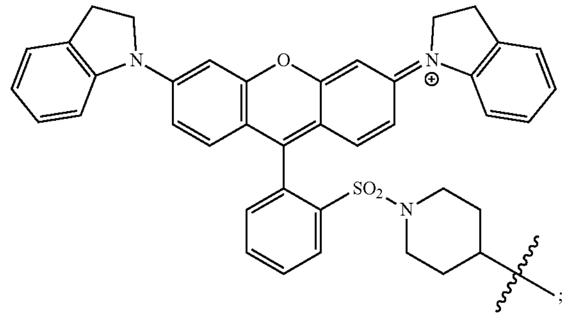

and other rhodamine derivatives, such as tetramethylrhodamines (including TMR, TAMRA, and reactive isothiocyanate derivatives), and diarylrhodamine derivatives, such as the QSY 7, QSY 9, and QSY 21 dyes.

Exemplary chromophores are selected from the group consisting of DAB; AEC; CN; BCIP/NBT; fast red; fast blue; fuchsin; NBT; ALK GOLD; Cascade Blue acetyl azide; Dapoxylsulfonic acid/carboxylic acid succinimidyl ester; DY-405; Alexa Fluor 405 succinimidyl ester; Cascade Yellow succinimidyl ester; pyridyloxazole succinimidyl ester (PyMPO); Pacific Blue succinimidyl ester; DY-415; 7-hydroxycoumarin-3-carboxylic acid succinimidyl ester; DYQ-425; 6-FAM phosphoramidite; Lucifer Yellow; iodoacetamide; Alexa Fluor 430 succinimidyl ester; Dabcyl succinimidyl ester; NBD chloride/fluoride; QSY 35 succinimidyl ester; DY-485XL; Cy2 succinimidyl ester; DY-490; Oregon Green 488 carboxylic acid succinimidyl ester; Alexa Fluor 488 succinimidyl ester; BODIPY 493/503 C3 succinimidyl ester; DY-480XL; BODIPY FL C3 succinimidyl ester; BODIPY FL C5 succinimidyl ester; BODIPY FL-X succinimidyl ester; DYQ-505; Oregon Green 514 carboxylic acid succinimidyl ester; DY-510XL; DY-481XL; 6-carboxy-4',5'-dichloro-2',7'-dimethoxyfluorescein succinimidyl ester (JOE); DY-520XL; DY-521XL; BODIPY R6G C3 succinimidyl ester; erythrosin isothiocyanate; 5-carboxy-2',4',5',7'-tetrabromosulfonefluorescein succinimidyl ester; Alexa Fluor 532 succinimidyl ester; 6-carboxy-2',4,4',5'7,7'-hexachlorofluorescein succinimidyl ester (HEX); BODIPY 530/550 C3 succinimidyl ester; DY-530; BODIPY TMR-X succinimidyl ester; DY-555; DYQ-1; DY-556; Cy3 succinimidyl ester; DY-547; DY-549; DY-550; Alexa Fluor 555 succinimidyl ester; Alexa Fluor 546 succinimidyl ester; DY-548; BODIPY 558/568 C3 succinimidyl ester; Rhodamine red-X succinimidyl ester; QSY 7 succinimidyl ester; BODIPY 564/570 C3 succinimidyl ester; BODIPY 576/589 C3 succinimidyl ester; carboxy-X-rhodamine (ROX); succinimidyl ester; Alexa Fluor 568 succinimidyl ester; DY-590; BODIPY 581/591 C3 succinimidyl ester; DY-591; BODIPY TR-X succinimidyl ester; Alexa Fluor 594 succinimidyl ester; DY-594; carboxynaphthofluorescein succinimidyl ester; DY-605; DY-610; Alexa Fluor 610 succinimidyl ester; DY-615; BODIPY 630/650-X succinimidyl ester; erioglaucine; Alexa Fluor 633 succinimidyl ester; Alexa Fluor 635 succinimidyl ester; DY-634; DY-630; DY-631; DY-632; DY-633; DYQ-2; DY-636; BODIPY 650/665-X succinimidyl ester; DY-635; Cy5 succinimidyl ester; Alexa Fluor 647 succinimidyl ester; DY-647; DY-648; DY-650; DY-654; DY-652; DY-649; DY-651; DYQ-660; DYQ-661; Alexa Fluor 660 succinimidyl ester; Cy5.5 succinimidyl ester; DY-677; DY-675; DY-676; DY-678; Alexa Fluor 680 succinimidyl ester; DY-679; DY-680; DY-682; DY-681; DYQ-3; DYQ-700; Alexa Fluor 700 succinimidyl ester; DY-703; DY-701; DY-704; DY-700; DY-730; DY-731; DY-732; DY-734; DY-750; Cy7 succinimidyl ester; DY-749; DYQ-4; and Cy7.5 succinimidyl ester.

In particular disclosed embodiments, the chromophore moiety may be selected from tartrazine, 7-diethylaminocoumarin-3-carboxylic acid, succinimidyl ester, Dabsyl sulfonyl chloride, fluorescein isothiocyanate (FITC) carboxy succinimidyl ester (DY-495), Rhodamine Green carboxylic acid succinimidyl ester (DY-505), eosin isothiocyanate (EITC), 6-carboxy-2',4,7,7'-tetrachlorofluorescein succinimidyl ester (TET), carboxyrhodamine 6G succinimidyl ester, carboxytetramethylrhodamine succinimidyl ester (TMR, TAMRA) (DY-554), QSY 9 succinimidyl ester, sulforhodamine B sulfonyl chloride (DY-560), Texas Red (sulforhodamine 101), gallocyanine, Fast Green FCF, Malachite Green, isothiocyanate, and QSY 21 succinimidyl ester. In certain disclosed embodiments, the chromophore moiety of the signaling conjugate is Dabsyl sulfonyl chloride, FITC, 7-diethylaminocoumarin-3-carboxylic acid, succinimidyl ester, Rhodamine Green carboxylic acid succinimidyl ester (DY-505), eosin isothiocyanate (EITC), 6-carboxy-2',4,7,7'-tetrachlorofluorescein succinimidyl ester (TET), carboxytetramethylrhodamine succinimidyl ester (TMR, TAMRA) (DY-554), sulforhodamine B sulfonyl chloride (DY-560), Texas Red (sulforhodamine 101), and gallocyanine.

Further exemplary chromogenic moieties that are used for the signaling conjugate are provided below:

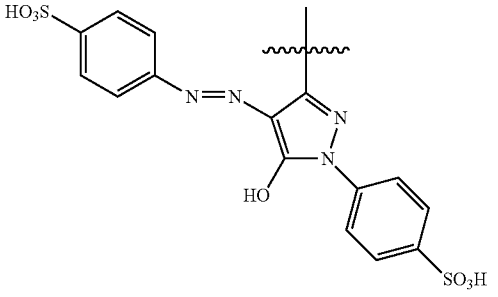

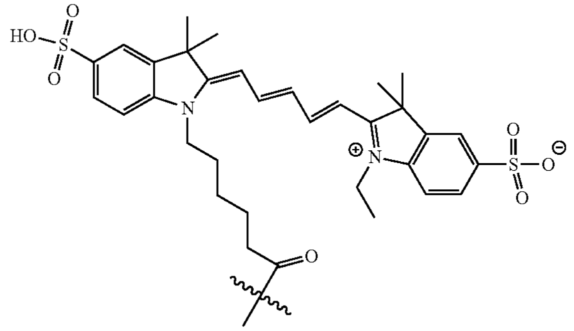

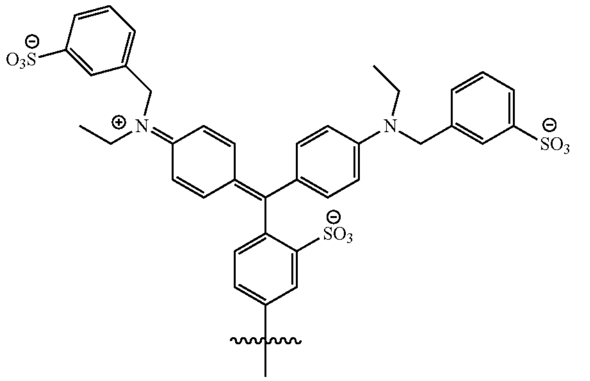

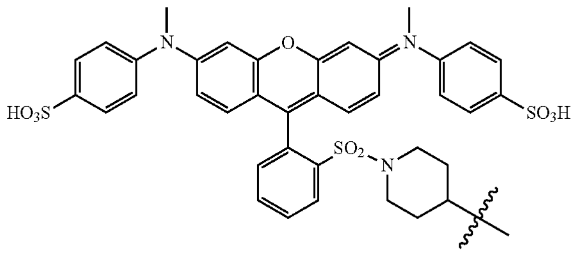

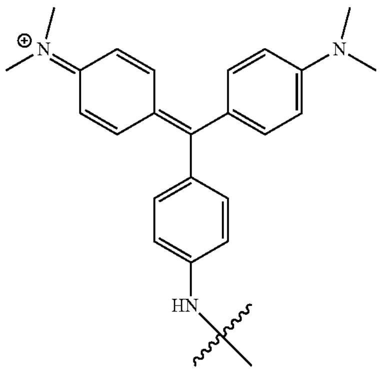

-continued

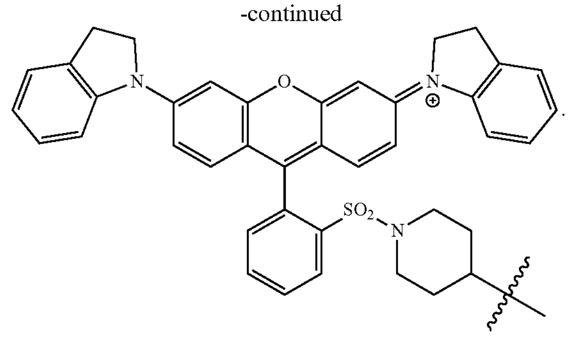

The signaling conjugate can have absorption maxima and absorption breadths particularly suited for bright-field imaging of targets in biological samples. In one embodiment, a signaling conjugate is configured to provide an absorbance peak having a $\lambda_{max}$ of between about 350 nm and about 800 nm, between about 400 nm and about 750 nm, or between about 400 nm and about 700 nm. These wavelength ranges are of particular interest because they translate into colors visible to humans. However, the approaches described herein could also be applied to chromophore moieties useful for near infrared (NIR), infrared (IR), or ultraviolet (UV) diagnostic methodologies. The signaling conjugates non-visible peaks can be imaged and converted into colors. In some embodiments, the illuminator 140 of FIGS. 1 and 3 can include one or more IR and/or UV sources. Referring to FIG. 3, for example, the light sources 180 can be IR and/or UV sources that emit IR/UV energy towards the specimen. The image capture device 120 can be configured to capture an image of the specimen based on the IR/UV energy from the specimen. The captured image can be converted into a viewable color image (e.g., a false color monochrome image). If multiple viewable color images are captured for multiplexing, the set of images can be combined to produce a composite image (e.g., a digitally enhanced image).

In one embodiment the signaling conjugate is configured to produce a colored signal selected from the group consisting of red, orange, yellow, green, indigo, violet, or mixtures thereof. In one embodiment, a signaling conjugate has a Amax of between about 400 nm and 430 nm. In another embodiment, the signaling conjugate produces a yellow signal. In one embodiment, a signaling conjugate has a Amax of between about 430 nm and 490 nm. In another embodiment, the signaling conjugate produces an orange signal. In one embodiment, a signaling conjugate has a Amax of between about 490 nm and 560 nm. In another embodiment, the signaling conjugate produces a red signal. In one embodiment, a signaling conjugate has a Amax of between about 560 nm and 570 nm. In another embodiment, the signaling conjugate produces a violet signal. In one embodiment, a signaling conjugate has a Amax of between about 570 nm and 580 nm. In another embodiment, the signaling conjugate produces an indigo signal. In one embodiment, a signaling conjugate has a Amax of between about 580 nm and 620 nm. In another embodiment, the signaling conjugate produces a blue signal. In one embodiment, a signaling conjugate has a Amax of between about 620 nm and about 800 nm. In another embodiment, the signaling conjugate produces a green to blue-green signal.

In one embodiment, the signaling conjugate is configured to have a full-width half-max (FWHM) of between about 20 nm and about 60 nm, between about 30 and about 100 nm, between about 30 and about 150 nm, or between about 30 and about 250 nm. In particular disclosed embodiments, the FWHM is less than about 300 nm, less than about 250 nm, less than about 200 nm, less than about 150 nm, less than about 100 nm, less than about 50 nm. In illustrative embodiments, a signaling conjugate having a FWHM of less than about 150 nm is described. In one embodiment, the FWHM is less than about 150 nm, less than about 120 nm, less than about 100 nm, less than about 80 nm, less than about 60 nm, less than about 50 nm, less than about 40 nm, less than about 30 nm, between about 10 nm and 150 nm, between about 10 nm and 120 nm, between about 10 nm and 100 nm, between about 10 nm and 80 nm, between about 10 nm and 60 nm, between about 10 nm and 50 nm, or between about 10 nm and 40 nm.

In another embodiment, the signaling conjugate has an average molar absorptivity of greater than about 5,000 M-1 cm-1 to about 250,000 M-1 cm-1. Cy dyes can have extinction coefficients >200,000 M-1 cm-1. For example, an average molar absorptivity of greater than about 5,000 M-1 cm-1, greater than about 10,000 M-1 cm-1, greater than about 20,000 M-1 cm-1, greater than about 40,000 M-1 cm-1, or greater than about 80,000 M-1 cm-1. In yet another embodiment, the signaling conjugate has a solubility in water of at least about 0.1 mM to about 1 M. For example, the signaling conjugate has a solubility in water of at least about 0.1 mM, at least about 1 mM, at least about 10 mM, at least about 100 mM, or at least about 1 M. In one embodiment, the signaling conjugate is stable against precipitation in an aqueous buffered solution for greater than about 1 month to about 30 months. For example, the signaling conjugate is stable against precipitation in an aqueous buffered solution for greater than about 1 month, greater than about 3 months, greater than about 6 months, greater than about 12 months, greater than about 18 months, or greater than about 24 months.

Figure 23A:
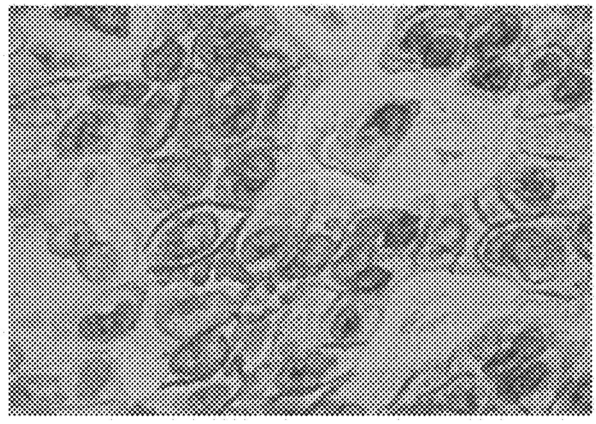
FIGS. 23(A-B) are photomicrographs showing a HER2 (4B5) IHC in Calu-3 xenografts stained with two different signaling conjugate.
Figure 23B:
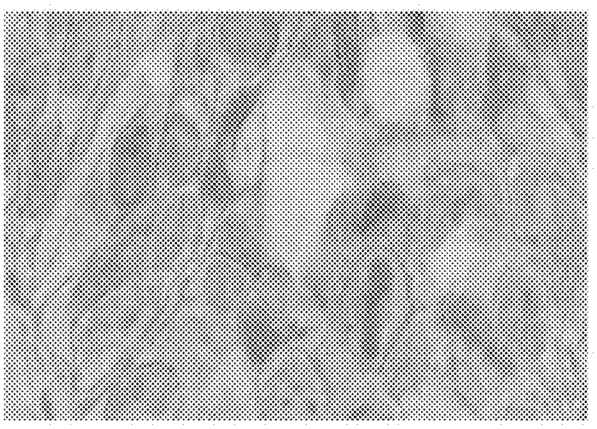
Figure 24:
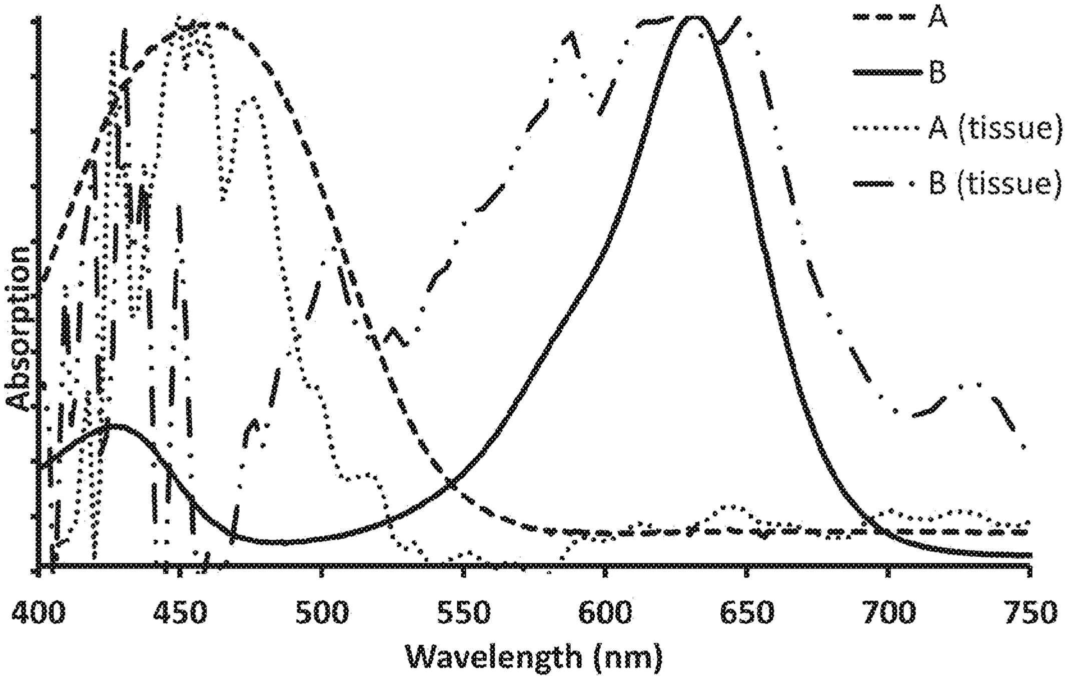
FIG. 24 illustrates absorbance spectra of two signaling conjugates in solution and as used to stain the samples shown in FIGS. 23(A-B).

FIG. 23(A) is a first photomicrograph and FIG. 23(B) is a second photomicrograph of a protein stained (HER2 (4B5) IHC in Calu-3 xenografts) using the signaling conjugate having the absorption spectra shown in FIG. 24. Trace A corresponds to the signaling conjugate used for FIG. 23(A) and trace B corresponds to the signaling conjugated used for FIG. 23(B); note that each signaling conjugate was analyzed with spectrometry in solution prior to staining and on the slide subsequent to having detected the HER2 (the dashed traces representing the spectra obtained on the tissue). The signaling conjugate used to stain the tissue shown in FIG. 23(A) has a $\lambda_{max}$ of about 456 nm and a FWHM of about 111 nm. The signaling conjugate used to stain the tissue shown in FIG. 23(B) has a Amax of about 628 nm and a FWHM of about 70 nm.

Latent Reactive Moiety

The latent reactive moiety is configured to undergo catalytic activation to form a reactive species that can covalently bond with the sample or to other detection components. The catalytic activation is driven by one or more enzymes (e.g., oxidoreductase enzymes and peroxidase enzymes, like horseradish peroxidase). In the presence of peroxide, these enzymes can catalyze the formation of reactive species. These reactive species, e.g. free radicals, are capable of reacting with phenolic compounds proximal to their generation, i.e. near the enzyme. The phenolic compounds available in the sample are often tyrosyl residues within proteins. As such, the latent reactive moiety can be added to a protein-containing sample in the presence of a peroxidase enzyme and a peroxide (e.g., hydrogen peroxide), which can catalyze radical formation and subsequently cause the reactive moiety to form a covalent bond with the biological sample.

In particular disclosed embodiments, the latent reactive moiety comprises at least one aromatic moiety. In exemplary embodiments, the latent reactive moiety comprises a phenolic moiety and binds to a phenol group of a tyrosine amino acid. It is desirable, however, to specifically bind the labeling conjugate via the latent reactive moiety at, or in close proximity to, a desired target with the sample. This objective can be achieved by immobilizing the enzyme on the target region, as described herein. Only latent reactive moieties in close proximity to the immobilized enzyme will react and form bonds with tyrosine residues in the vicinity of, or proximal to, the immobilized enzyme, including tyrosine residues in the enzyme itself, tyrosine residues in the antibody to which the enzyme is conjugated, and/or tyrosine residues in the sample that are proximal to the immobilized enzyme. In particular disclosed embodiments, the labeling conjugate can be bound proximally, such as within about 800 nm, within about 100 nm, within about 10 nm, or within about 5 nm of the immobilized enzyme. For example, the tyrosine residue may be within a distance of about 10 angstroms to about 800 nm, about 100 angstroms to about 50 nm, about 10 angstroms to about 10 nm, or about 10 angstroms to about 5 nm from the immobilized enzyme. Such proximal binding allows the target to be detected with at least the same degree of specificity as conventional staining methods used with the detection methods disclosed herein. For example, embodiments of the disclosed method allow sub cellular structures to be distinguished, e.g., nuclear membrane versus the nuclear region, cellular membrane versus the cytoplasmic region, etc.

Latent reactive moiety can be the general formula illustrated below.

Formula 5

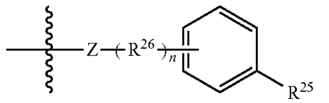

With reference to Formula 5, $R^{25}$ is selected from the group consisting of hydroxyl, ether, amine, and substituted amine; $R^{26}$ is selected from the group consisting of alkyl, alkenyl, alkynyl, aryl, heteroaryl, $—OR_m$, $—NR_m$, and $—SR_m$, where m is 1-20; n is 1-20; Z is selected from the group consisting of oxygen, sulfur, and $NR^a$ where $R^a$ is selected from the group consisting of hydrogen, aliphatic, aryl, and alkyl aryl. An exemplary embodiment of the latent reactive moiety is tyramine (or tyramide, which is the name given to a tyramine molecule conjugated with the detectable label and/or optional linker), or a derivative thereof.

In particular disclosed embodiments, the signaling conjugate has a minimum concentration, when covalently deposited on the sample, of greater than about 1×1011 molecules per cm2·µm or greater than about to about 1×1013 molecules per cm2·µm within the biological sample. In particular disclosed embodiments, the concentration of signaling conjugate deposited ranges from about to about 1×1011 molecules per cm2·µm to about to about 1×1016 molecules per cm2·µm.

Embodiments of the disclosed signaling conjugate can be made using the general procedure illustrated in Scheme 1. In particular disclosed embodiments, the conjugate is formed without an optional linker. For example, a carboxylic acid moiety of the chromophore may be coupled with a tyramine molecule or tyramine derivative by first converting the carboxylic acid to an activated ester and then forming an amide bond between the chromophore and the tyramine molecule or tyramine derivative. An exemplary method for making a signaling conjugate without a linker is illustrated below in Scheme 2.

Scheme 1

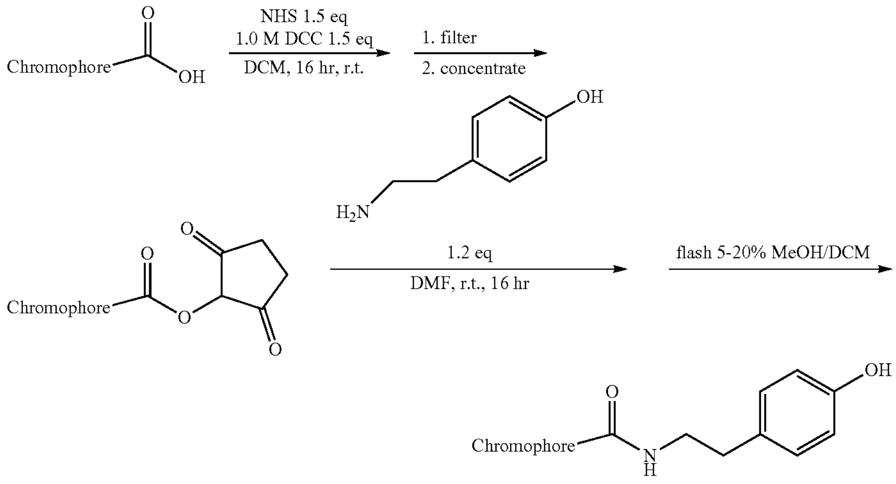

In embodiments wherein the linker is present, the carboxylic acid moiety of the chromophore may be coupled with an amine-terminated linker (e.g., an alkylene oxide) by first converting the carboxylic acid to an activated ester and then forming an amide bond between the chromophore and the amine-terminated linker. The remaining terminus of the linker may then be activated and subsequently coupled with a tyramine molecule or tyramine derivative. An exemplary method for making the signaling conjugate is provided below in Scheme 2.

Scheme 2

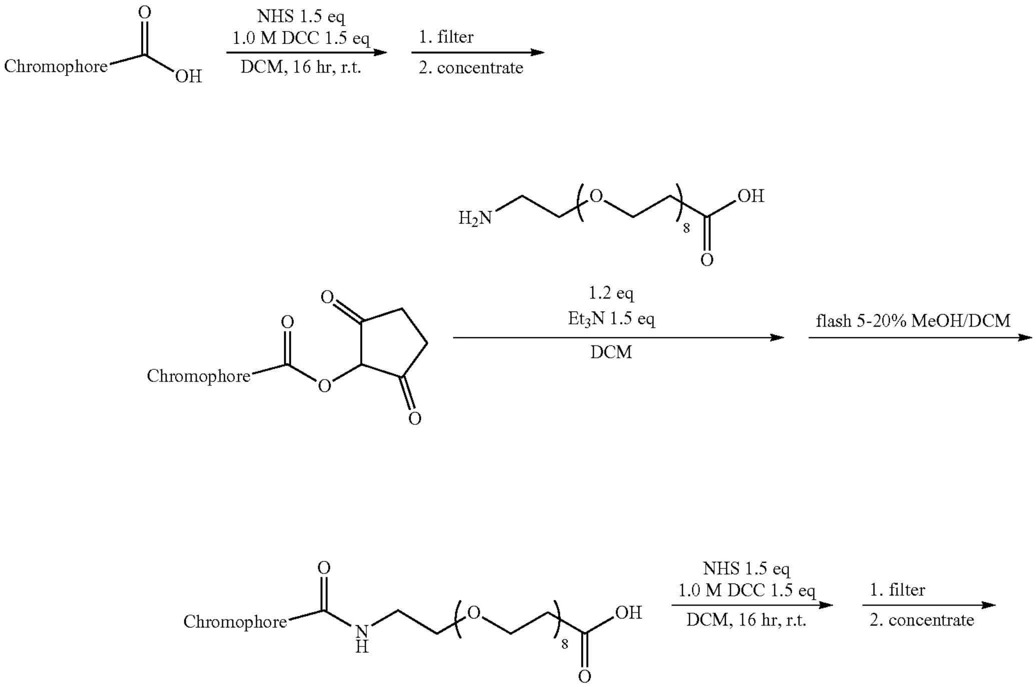

-continued
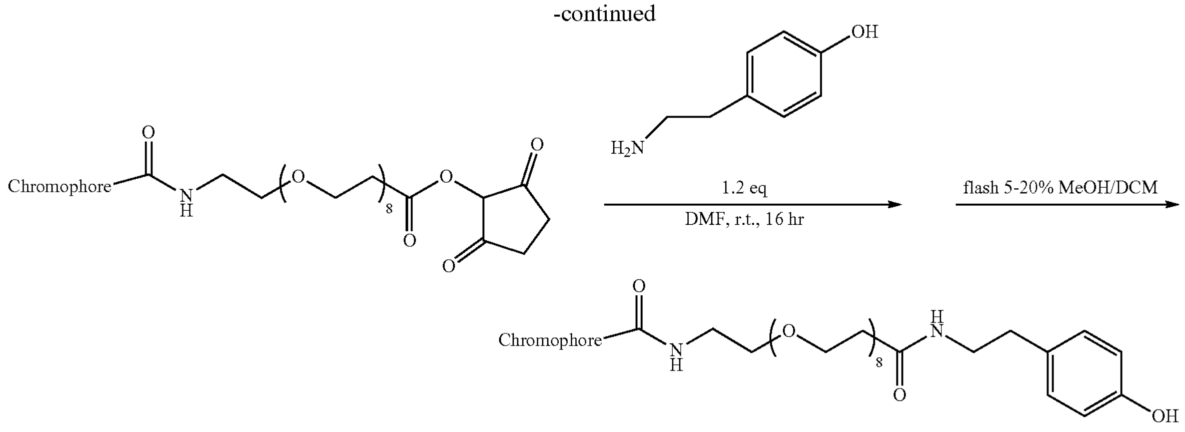
Exemplary signaling conjugates are provided below.
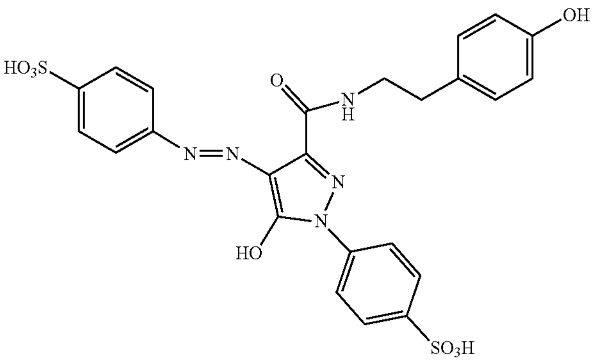
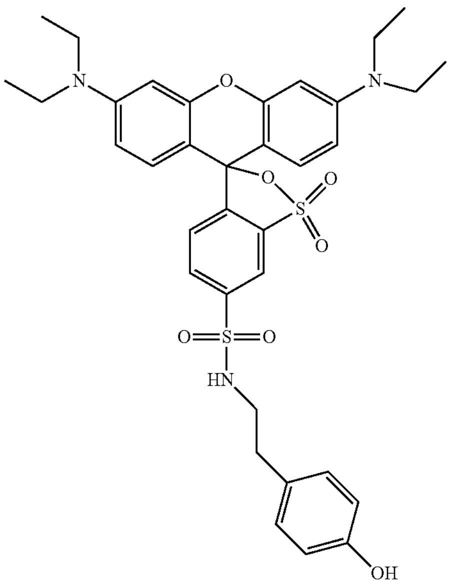
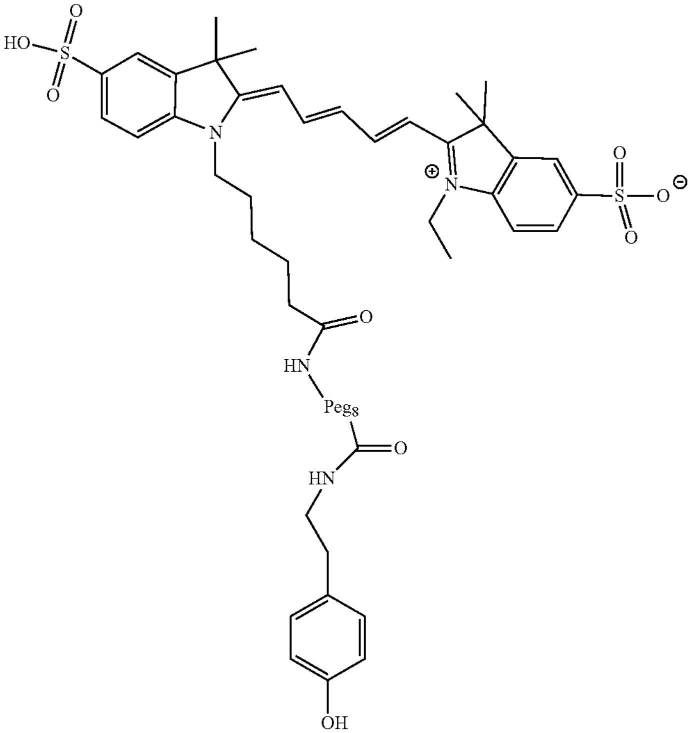

-continued
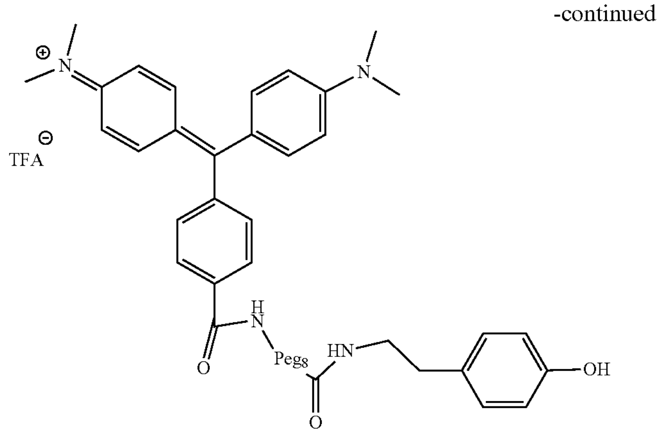
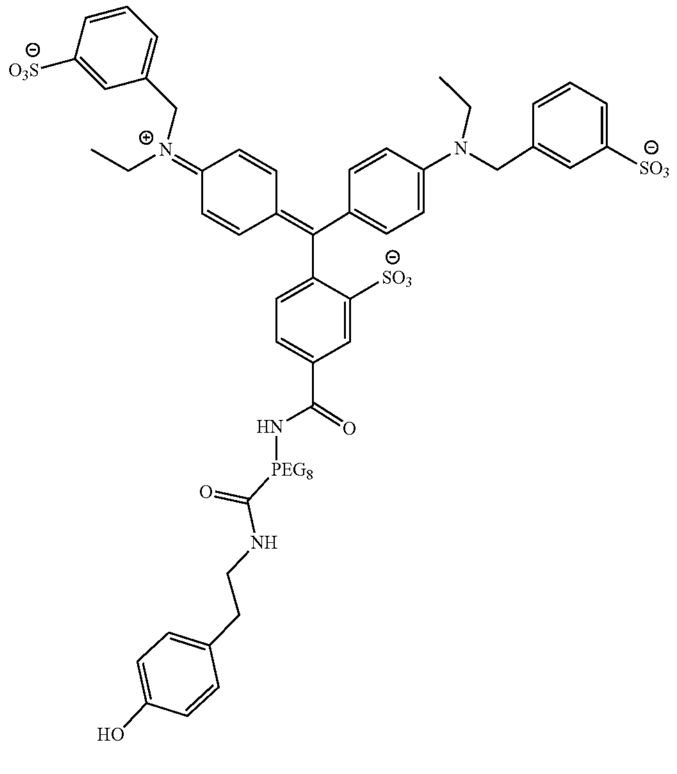

-continued
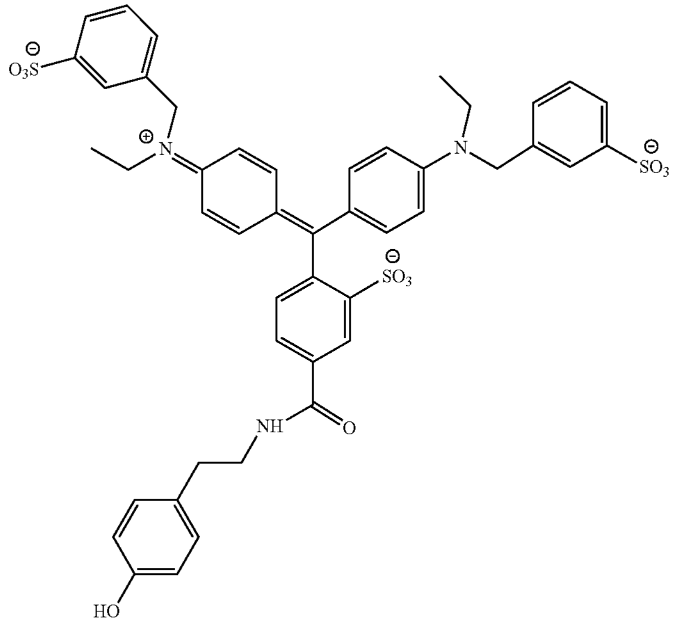
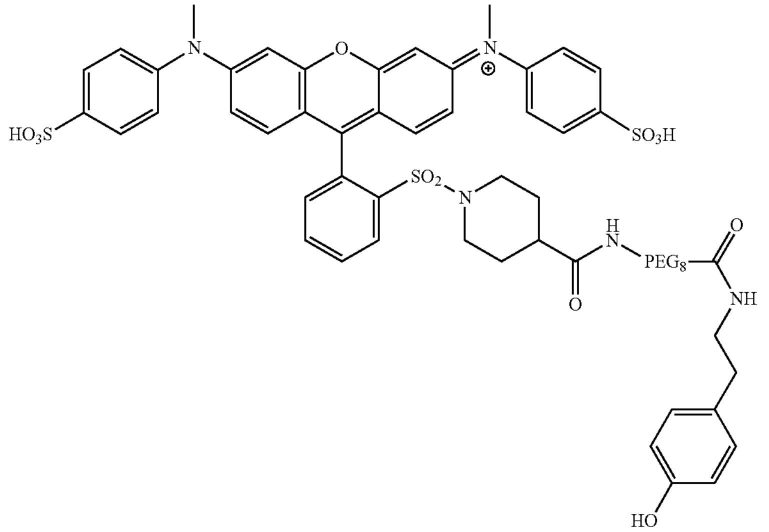
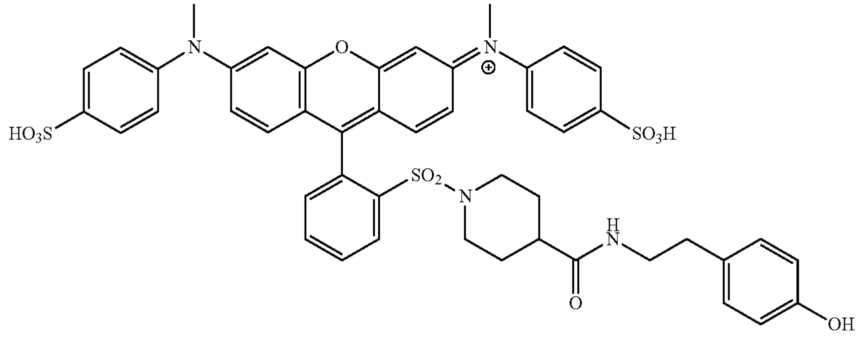

-continued
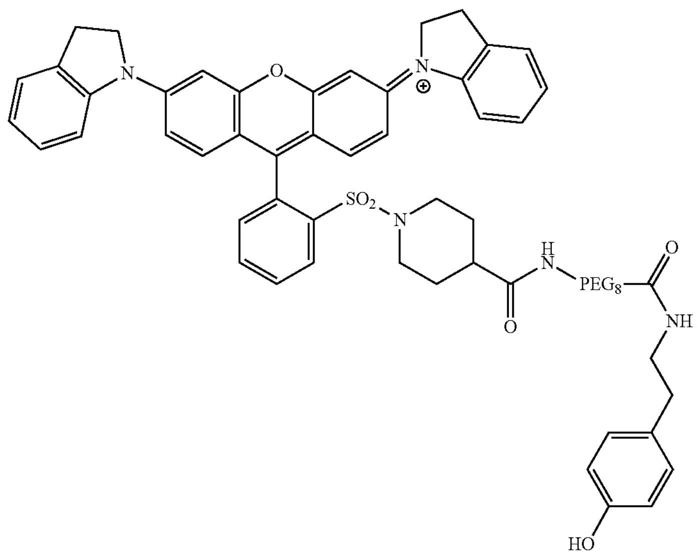
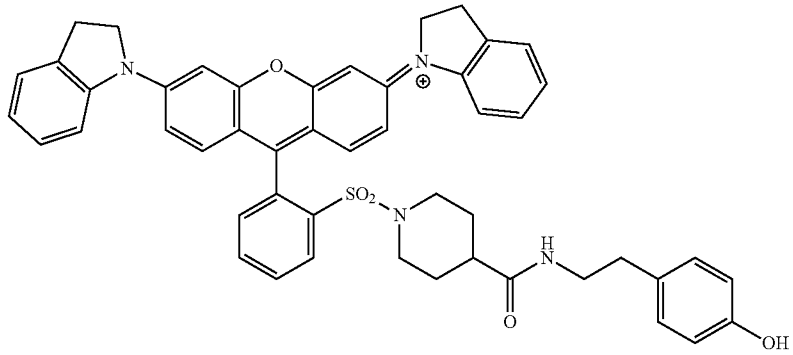
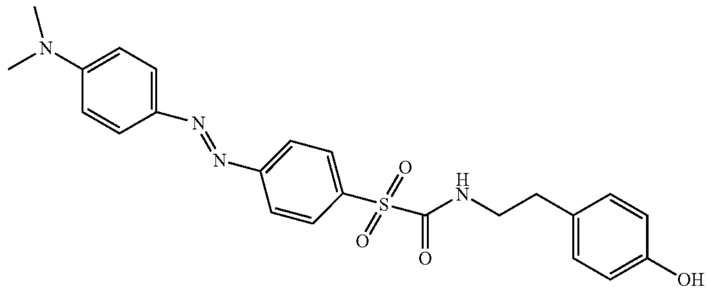
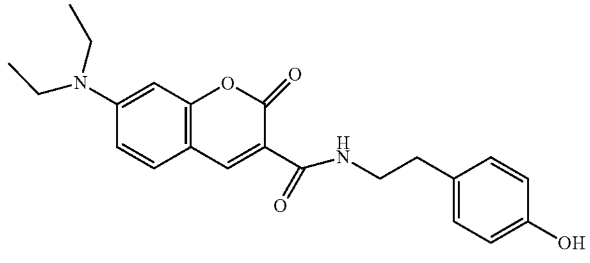
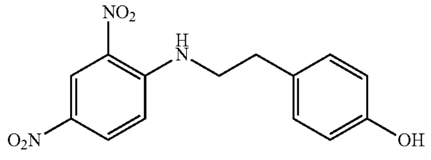
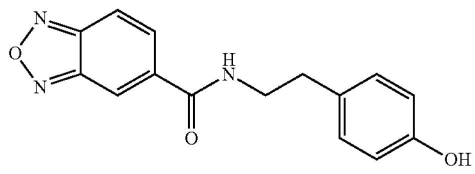
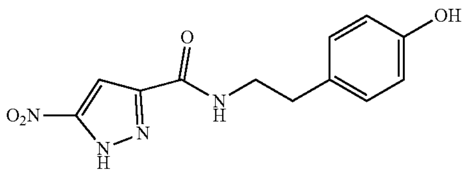

-continued
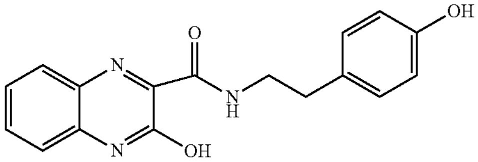
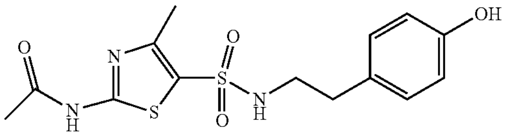
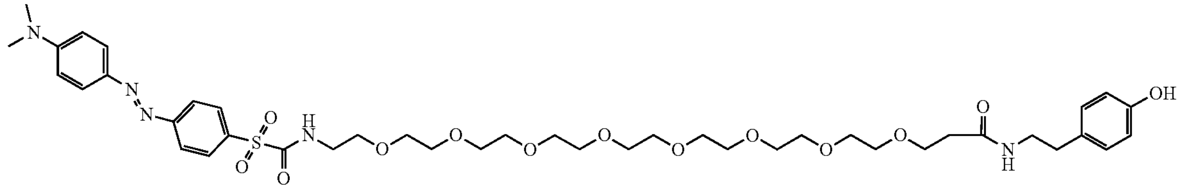
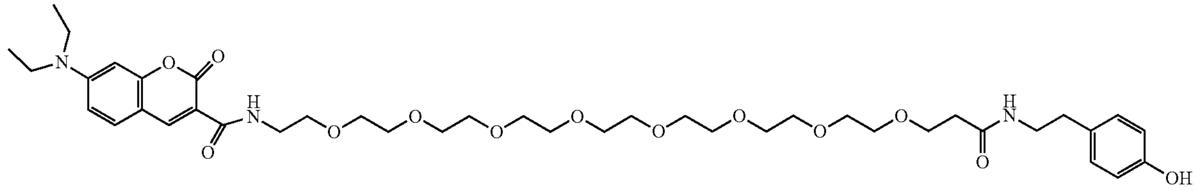
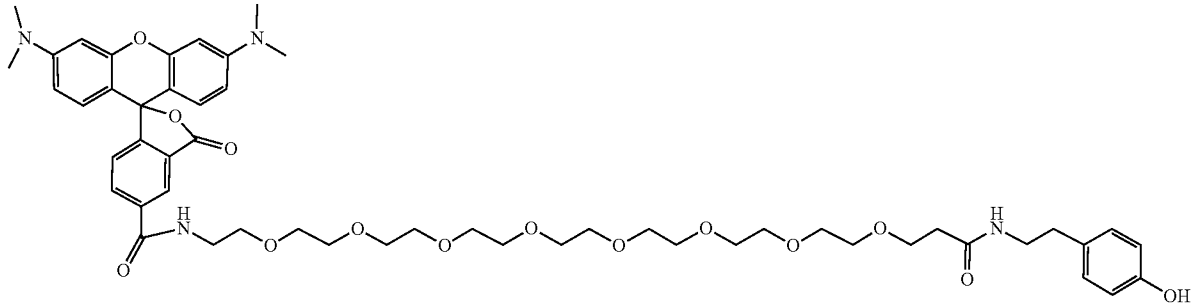
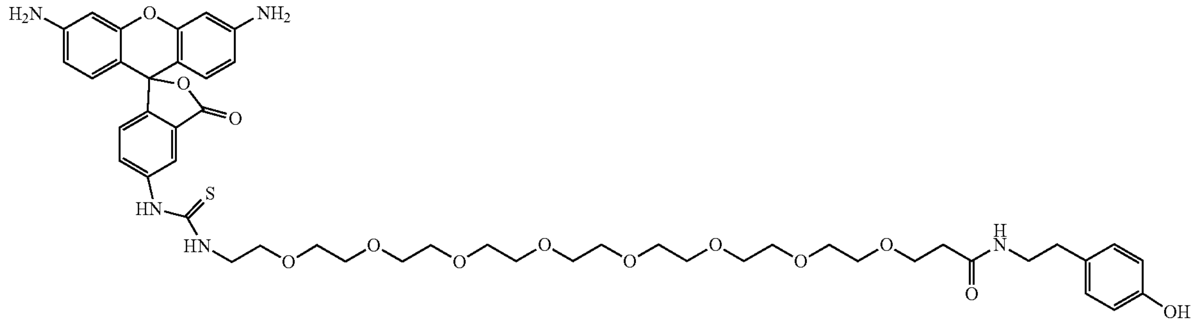
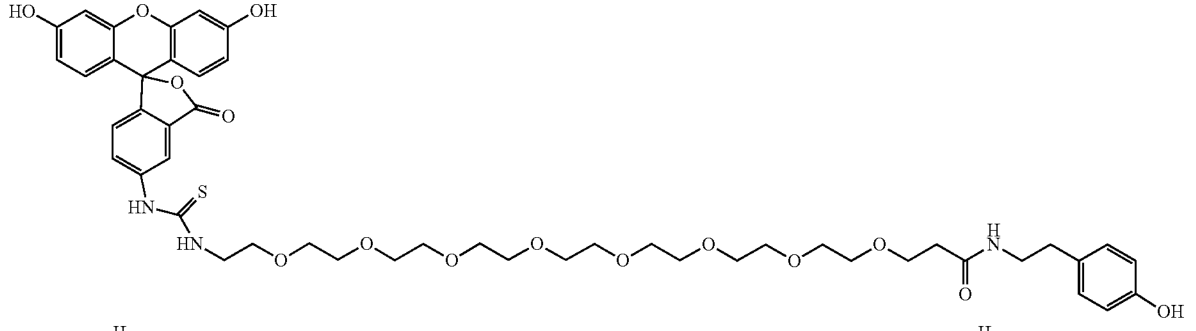
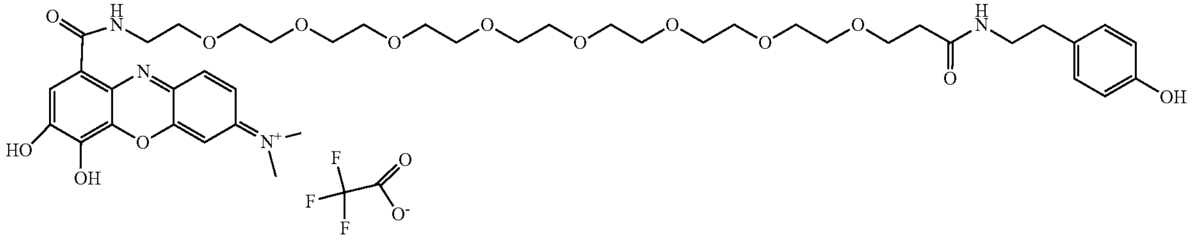

-continued
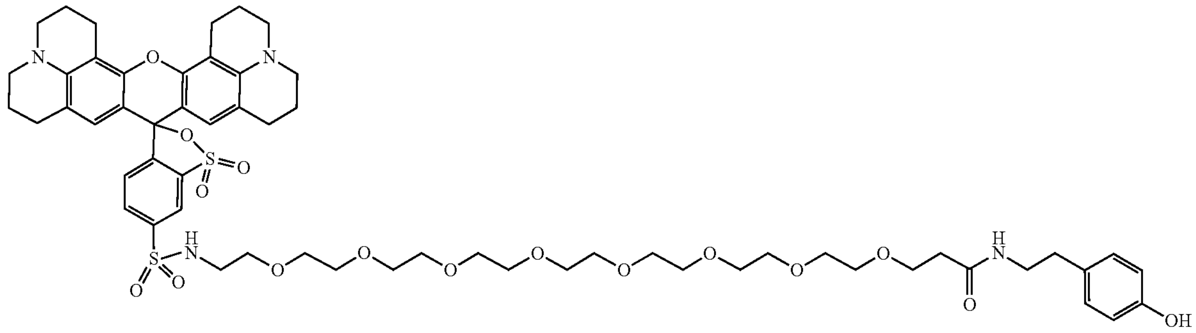
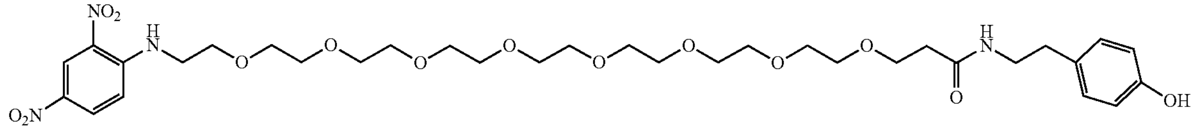
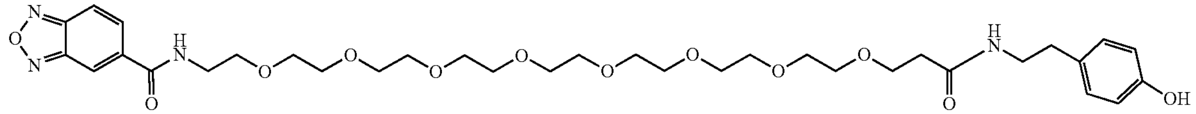
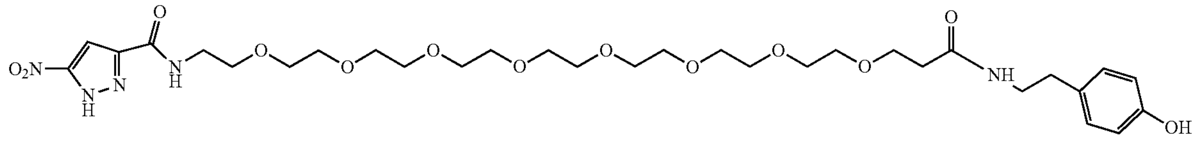
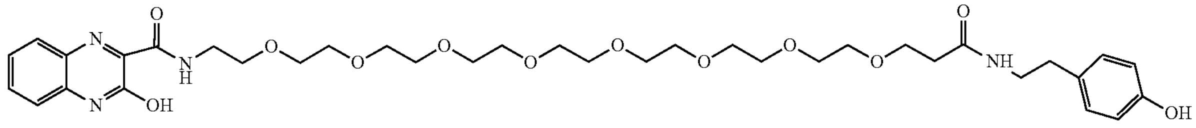
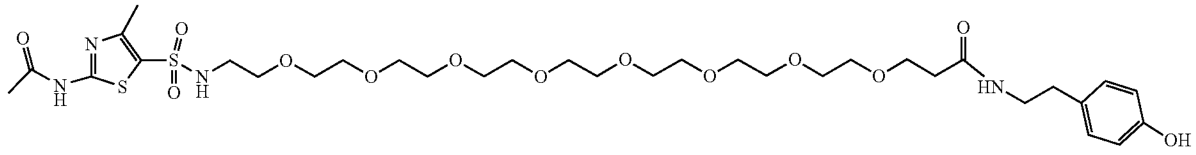
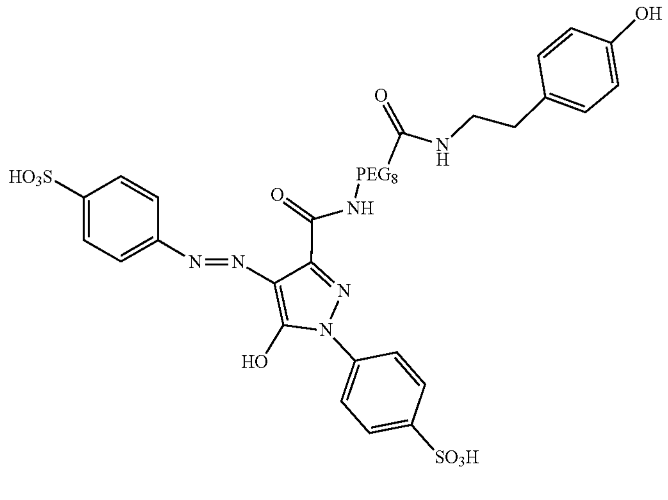

-continued
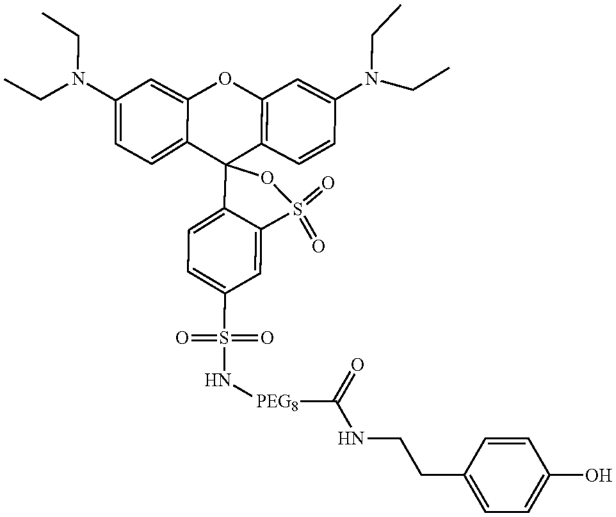
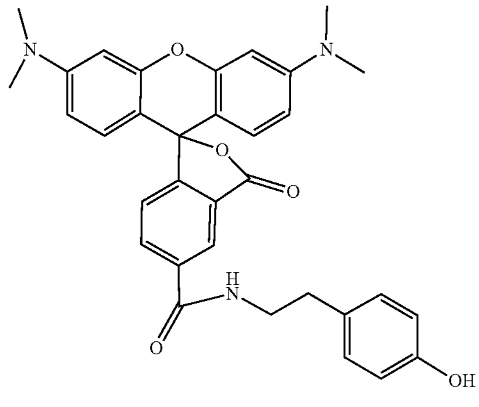
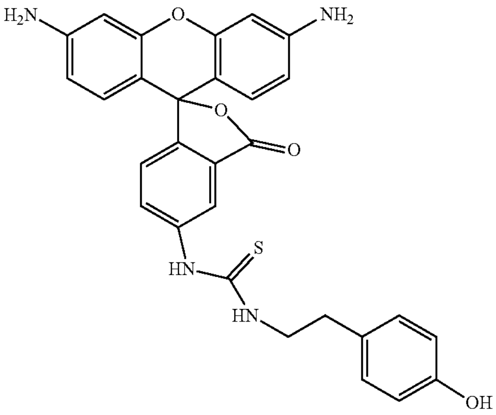
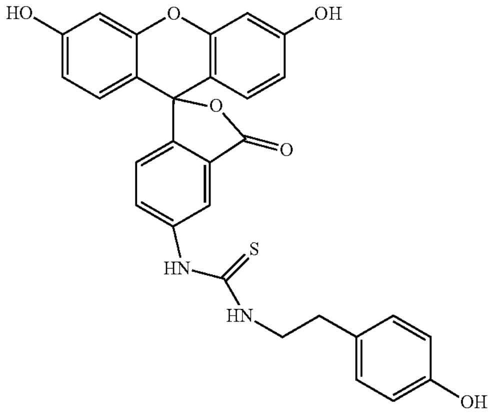
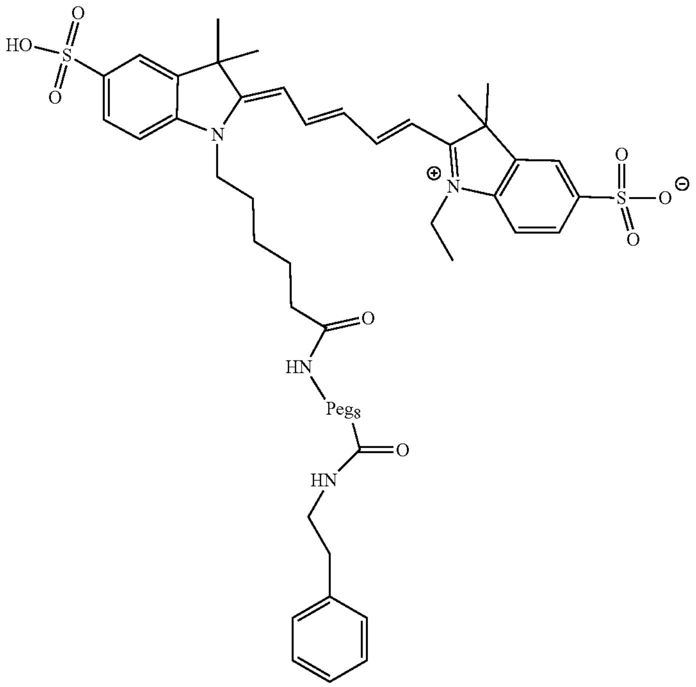

-continued
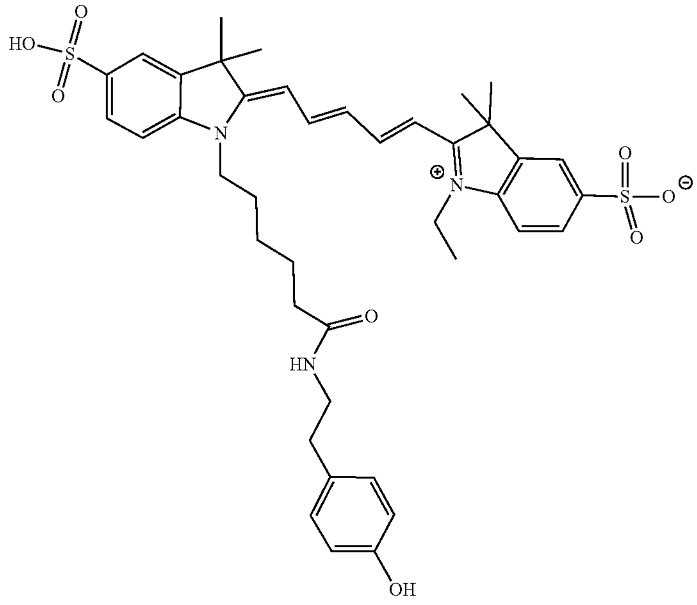
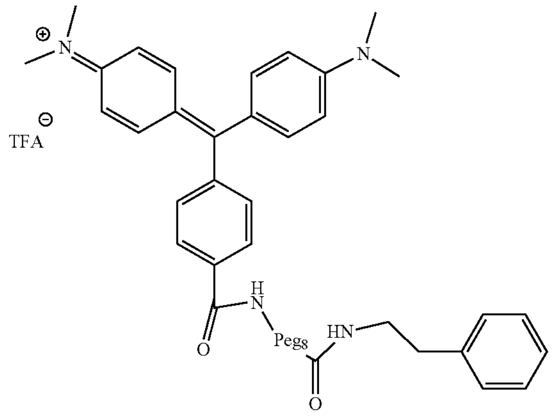
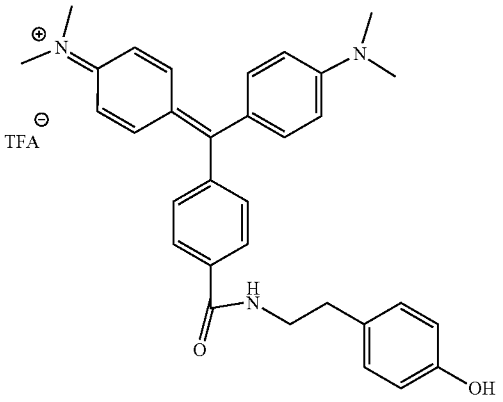
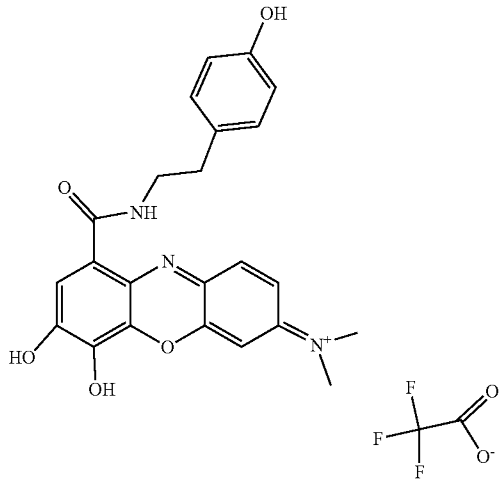
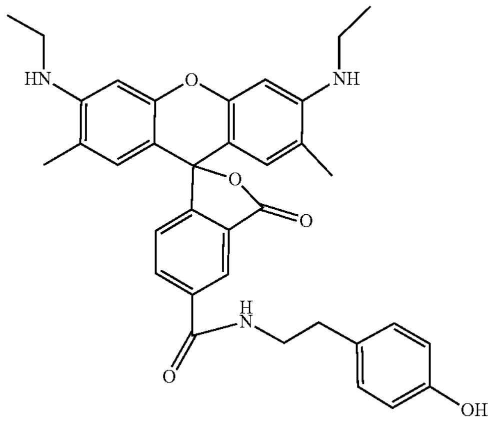

-continued

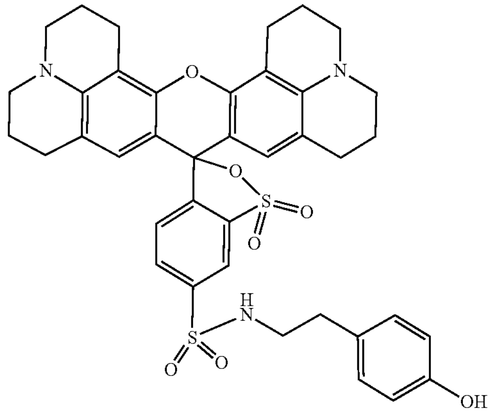

Amplifying Conjugates

Also disclosed herein are conjugates suitable for amplifying a signal obtained from carrying out the method disclosed herein. The amplifying conjugates typically comprise a latent reactive moiety, a detectable label, and an optional linker.

The detectable label of the amplifying conjugate may be any detectable label provided herein. In particular disclosed embodiments, the detectable label is a hapten, such as any of the haptens disclosed herein. Reference is made to U.S. Pat. No. 7,695,929, which discloses structures and synthetic approaches to making amplifying conjugates and their corresponding specific antibodies. In particular disclosed embodiments, a hapten having an electrophilic functional group (or having a functional group capable of being converted to an electrophilic functional group) is conjugated to the latent reactive moiety or to a linker, (e.g., an aliphatic or poly(alkylene oxide) linker). In certain embodiments, the hapten includes a carboxylic acid functional group, which is converted to an activated, electrophilic carbonyl-containing functional group, such as, but not limited to, an acyl halide, an ester (e.g., a N-hydroxysuccinimide ester), or an anhydride. The latent reactive moiety includes a nucleophilic functional group (e.g., amino, hydroxyl, thiol, or anions formed therefrom) capable of reacting with the hapten's activated electrophilic functional group. The hapten's electrophilic group can be coupled to the latent reactive moiety's nucleophilic group using organic coupling techniques known to a person of ordinary skill in the art of organic chemistry synthesis. In embodiments where the conjugate includes a linker, the linker typically has a nucleophilic functional group at one end and an electrophilic functional group at the other end. The linker's nucleophilic group can be coupled to the hapten's electrophilic group, and the linker's electrophilic group can be activated and coupled to the latent reactive moiety's nucleophilic group using organic coupling techniques known to a person of ordinary skill in the art of organic chemical synthesis.

In further illustrative embodiments, the signaling conjugate is used as an amplifying conjugate. The signaling conjugate can be used as an amplifying conjugate where the chromophore moiety is an effective labeling moiety. In illustrative embodiments, an antibody specific to a chromophore moiety enables that chromophore moiety to serve as a signaling and labeling conjugate. From another perspective, a hapten which possesses physical attributes, as disclosed herein, for effective chromophore moieties, may be used as both a chromophore moiety and as a hapten. There are particular benefits of using a signaling conjugate as an amplifying conjugate. In particular, the amplifying step would result in the deposition of significant, e.g. potentially detectable, amounts of the chromophore moiety. As such, the subsequent chromogenic detection could be stronger. Similarly, as described herein with respect to mixing chromogens from different classifications, a unique color could be generated using the overlap of absorbances from two or more chromophore moieties.

VI. Compositions

An illustrative composition can be specimen including a biological sample and a plurality of signaling conjugates. In particular disclosed embodiments, the composition comprises a biological sample that comprises one or more enzyme-labeled targets for visualization. The enzyme used to label the target may originate from a labeling conjugate, such as an enzyme conjugate. The composition also may further comprise one or more detection probes. The plurality of signaling conjugates are as disclosed herein and are configured to provide a bright-field signal. The plurality of signaling conjugates are covalently bound proximally to or directly on the one or more targets. In particular disclosed embodiments, configured to provide a bright-field signal comprises choosing a particular chromogenic moiety for the signaling conjugate that is capable of absorbing about 5% or more of incident light. In particular disclosed embodiments, about 20% of the incident light may be absorbed.

The composition comprises a signaling conjugate that has been configured to provide the particular wavelength maxima disclosed herein for the chromogenic moieties of the signaling conjugates. Solely by way of example, the signaling conjugate is configured to provide a bright-field signal such that an absorbance peak having a Amax as is disclosed herein. Two different absorbance peaks also may be obtained by configuring different signaling conjugates to comprise different chromogenic moieties that have absorbance peaks of differing Amax values, as disclosed herein. The composition also may comprise a plurality of signaling conjugates configured to provide a bright-field signal by being selected as having a particular FWHM value. Suitable FWHM values are disclosed herein. In other disclosed embodiments, at least a portion of the plurality of signaling conjugates has an average molar absorptivity selected from the particular values provided herein.

Particular disclosed embodiments of the composition also concern a plurality of signaling conjugates that have a particular solubility in water, such as those values provided herein. Also, the plurality of signaling conjugates also may be stable in an aqueous buffer solution for the period of time provided herein.

In particular disclosed embodiments, the composition comprises a plurality of signaling conjugates that are configured to impart an optically apparent color under brightfield illumination, such as red, orange, yellow, green, indigo, or violet. The optically apparent color may also be a mixture, such as that a first optically distinct color, a second optically distinct color, a third optically distinct color, a fourth optically distinct color, and even a fifth optically distinct color may be obtained and visualized.

The biological sample present in the disclosed composition can be a tissue or cytology sample as is disclosed herein. In particular disclosed embodiments, the biological sample may comprise two targets, a first target and a second target and the composition may further comprise a first detection probe that is specific for the first target and a second detection probe that is specific for the second target.

VII. Kits

Also disclosed herein are embodiments of a kit comprising the signaling conjugate for use with the imaging systems disclosed herein. In another embodiment, the kit includes a detection probe. In another embodiment, the kit includes a labeling conjugate. In another embodiment, the kit includes a amplifying conjugate and a secondary labeling conjugate. In another embodiment, the kit may further comprise a peroxide solution. In illustrative embodiments, the kit includes a detection probe. In illustrative embodiments, the reagents of the kit are packaged in containers configured for use on an automated slide staining platform. For example, the containers may be dispensers configured for use and a BENCHMARK Series automated IHC/ISH slide stainer.

In illustrative embodiments, the kit includes a series of reagents contained in different containers configured to work together to perform a particular assay. In one embodiment, the kit includes a labeling conjugate in a buffer solution in a first container. The buffer solution is configured to maintain stability and to maintain the specific binding capability of the labeling conjugate while the reagent is stored in a refrigerated environment and as placed on the instrument. In another embodiment, the kit includes a signaling conjugate in an aqueous solution in a second container. In another embodiment, the kit includes a hydrogen peroxide solution in a third container for concomitant use on the sample with the signaling conjugate. In the second or third container, various enhancers (e.g. pyrimidine) may be found for increasing the efficiency by which the enzyme activates the latent reactive species into the reactive species. In a further embodiment, the kit includes an amplifying conjugate.

Kits can include wide range of cocktail assays, including the ULTRAVIEW SISH Detection Kit (Ventana Medical Systems, Inc., p/n 780-001), the INFORM HER2 DNA Probe (Ventana Medical Systems, Inc., p/n 780-4332), the Rabbit Anti-DNP Antibody (Ventana Medical Systems, Inc., p/n 780-4335), the Rabbit Anti-HER2 (4B5) Antibody (Ventana Medical Systems, Inc., p/n 800-2996), the ULTRAVIEW Universal Alkaline Phosphatase Red Detection Kit (Ventana Medical Systems, Inc., p/n 760-501), the silver wash (Ventana Medical Systems, Inc., p/n 780-002), and/or the INFORM Chromosome 17 Probe (Ventana Medical Systems, Inc., p/n 780-4331). Another cocktail assay is the INFORM HER2 Dual ISH DNA Probe sold by (Ventana Medical Systems, Inc.), which includes the INFORM HER2 Dual ISH DNA Probe Cocktail (Ventana Medical Systems, Inc., p/n 800-4422), the HybReady (Ventana Medical Systems, Inc., p/n 780-4409), the ultraView SISH DNP Detection Kit (Ventana Medical Systems, Inc., p/n 800-098), the ultraView Red ISH DIG Detection Kit (Ventana Medical Systems, Inc., p/n 800-505), the ultraView Siler Wash II (Ventana Medical Systems, Inc., p/n 780-003), and/or the HER2 Dual ISH 3-in-1 Xenograft Slides (Ventana Medical Systems, Inc., p/n 783-4332). Other cocktail assays can be used. Cocktail assays can be used to quantitatively detect amplification of the HER2 gene via two color chromogenic ISH in formalin-fixed, paraffin-embedded tissue specimens of human breast cancer and gastric cancer, including the gastro-oesophagal junction and can be an aid in the assessment of patients for whom Herceptin (trastuzumab) may be a treatment option. In yet other protocols, the cocktail assay is the VENTANA HER2 DNA Probe Assay sold by Ventana Medical Systems, Inc., p/n 800-4422. U.S. patent application Ser. No. 11/809,024 (corresponding to U.S. Patent Publication No. 2008/299555) entitled MULTICOLOR CHROMOGENIC DETECTION OF BIOMAKERS and U.S. patent application Ser. No. 11/809,024 (corresponding to U.S. Patent Publication No. 2011/0136130) entitled METHOD FOR CHROMOGENIC DETECTION OF TWO OR MORE TARGET MOLECULES IN A SINGLE SAMPLE disclose substances, protocols, and specimen processing techniques and are incorporated by reference in their entireties. Other assays or cocktails can also be used.

In some embodiments, a tissue sample processed according to an ISH protocol. The ISH protocol can provide visualization of specific nucleic acid sequences (e.g., DNA, mRNA, etc.) in frozen tissue sections, fixed/paraffin embedded tissue sections, or other cell preparations by hybridizing complementary strands of nucleotides (e.g., probes) to the sequence of interest. The ISH protocol can include, without limitation, a dual SISH and Red ISH protocol, single Red ISH protocol, single SISH protocol, or the like. To determine a HER2/chromosome 17 ratio in breast tissue, the imaging apparatus 112 of FIG. 1 can capture images that include silver in situ hybridization signals, red in situ hybridization signals, or the like. Digitally enhanced images/video can be produced based on the images and viewed on the display. The tissue is scored based on the signals corresponding to HER2 genes and chromosome 17s to determine the HER2/CR17 ratio. Based on the ratio, the specimen's HER2 gene is determined to be amplified or not amplified. To automatically score the breast tissue sample, candidate nuclei can be selected for quantitative analysis. The processing device 122 of FIG. 1 can automatically counts different features (e.g., HER2 genes, chromosome 17s, etc.) and determines the ratio of the number of features. Additional nuclei can be scored. A diagnosis can be made based, at least in part, on the ratios. Results can be displayed on the display 114 of FIG. 1. To evaluate whether the tissue sample (e.g., breast tissue) is a carcinoma, the processing device 122 of FIG. 1 can assist the user in obtaining information about the selected region by, for example, detecting the amplification of genes by evaluating the ratio of the number of HER2 gene signals to the number of chromosome 17 signals.

VIII. Conclusion

The technology disclosed herein can be used on different types of biological samples. Biological samples can be a tissue sample or samples (e.g., any collection of cells)

removed from a subject. The tissue sample can be a collection of interconnected cells that perform a similar function within an organism. A biological sample can also be any solid or fluid sample obtained from, excreted by, or secreted by any living organism, including, without limitation, single-celled organisms, such as bacteria, yeast, protozoans, and amebas, multicellular organisms (such as plants or animals, including samples from a healthy or apparently healthy human subject or a human patient affected by a condition or disease to be diagnosed or investigated, such as cancer). In some embodiments, a biological sample is mountable on a microscope slide and includes, without limitation, a section of tissue, an organ, a tumor section, a smear, a frozen section, a cytology prep, or cell lines. An incisional biopsy, a core biopsy, an excisional biopsy, a needle aspiration biopsy, a core needle biopsy, a stereotactic biopsy, an open biopsy, or a surgical biopsy can be used to obtain the sample.

The biological samples can be carried by standard microscope slide made of glass, such as borosilicate glass (e.g., BK7 glass). The slide can have a length of about 3 inches (75 mm), a width of about 1 inch (25 mm), and a thickness of about 1 mm. Slides made of different materials and with different dimensions can be used. Coverslips can also be made of glass (e.g., borosilicate glass) or other optically transparent or semi-transparent materials (e.g., plastics or polymers). Both the slide (e.g., slide 134 of FIG. 3) and coverslip (e.g., coverslip 139 of FIG. 3) can be substantially flat substrates. The term "substantially flat substrate" refers, without limitation, to any object having at least one substantially flat surface, but more typically to any object having two substantially flat surfaces on opposite sides of the object, and even more typically to any object having opposed substantially flat surfaces, which opposed surfaces are generally equal in size but larger than any other surfaces on the object. The imaging systems and techniques can be modified for use with other types of specimen carriers.

The imaging systems disclosed herein can utilize different types of multispectral images by re-defining the spectral characteristics of images such that the targeted features are optimally perceived by the observer. For example, color re-definition and/or contrast enhancement can be performed to better visually distinguish each target feature and adapt to the observers color acuity. In embodiments, the image capture device 120 of FIG. 1 is a multispectral camera, and the processing device 122 of FIG. 1 can perfrom spectral unmixing of colors, or similar techniques, as part of re-definition to provide optimal color separation. The spectral unmixing of colors can be performed using known unmixing algorithms, including, without limitation, the apparatuses, algorithms, and methods disclosed in U.S. Pat. No. 8,285,024 and PCT App. PCT/EP2012/058253 (PCT Pub. No. WO2012/152693), which are hereby incorporated by reference in their entireties. Additionally, tissue-based analyses, cell-based analyses, or other types of analyses can be performed on the unmixed images. One or more of the unmixed images can be re-defined and two or more of the unmixed images can be combined to produce one or more enhanced images (e.g., false color composite images).

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments. For example, U.S. Provisional Patent Application No. 61/616,330, filed on Mar. 27, 2012, U.S. Provisional Patent Application No. 61/710,607, filed on Oct. 5, 2012, and U.S. Provisional Patent Application No. 61/778,093, filed on Mar. 12, 2013 are all incorporated herein by reference in their entireties.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. An imaging system for imaging a sample on a microscope slide, the imaging system comprising:

an energy emitter including a first light source and a second light source;

one or more image capture devices; and a controller communicatively coupled to the energy emitter and the one or more image capture devices, the controller including at least one processor and memory storing instructions that, when executed by the at least one processor, cause the imaging system to perform a process including:

capturing, using the one or more image capture devices, a first monochrome image of the sample exposed to a first light waveband from the first light source, wherein the first light waveband interacts with a first target of the sample, and a second monochrome image of the sample exposed to a second light waveband from the second light source, wherein the second light waveband interacts with a second target of the sample, wherein the second light waveband is different from the first light waveband, assigning a first false color for the first target, assigning a second false color for the second target, wherein the second false color is different from the first false color, combining the first target and the second target illustrated in the first and second false colors to generate an enhanced composite image of the sample, and outputting the enhanced composite image.

2. The imaging system of claim 1, wherein the first light waveband is an ultraviolet waveband, a near infrared waveband, or an infrared waveband.

3. The imaging system of claim 1, wherein at least one of the first light source or the second light source includes an ultraviolet light source, a near infrared light source, or an infrared light source.

4. The imaging system of claim 1, wherein the enhanced composite image of the sample is an enhanced color composite image having an enhanced color contrast between the first and second targets greater than a natural color contrast between the first and second targets.

5. The imaging system of claim 1, wherein the process further comprises:

obtaining a detection protocol for the sample;

analyzing the enhanced composite image according to the detection protocol to identify one or more features of interest of the sample; and labelling at least one of the features of interest in the enhanced composite image.

6. The imaging system of claim 1, wherein the process further comprises:
obtaining stain information for the sample; and
determining the first false color for the first target based on the stain information.

7. The imaging system of claim 1, wherein the process further comprises:
obtaining stain information for multiple stains applied to the sample; and
determining the first false color for the first target based on the stain information and characteristics of the second target in the second monochrome image.

8. The imaging system of claim 1, wherein outputting the enhanced composite image includes transmitting the enhanced composite image to a trained classifier configured to identify one or more features of interest in the enhanced composite image, and wherein the trained classifier has been trained using a set of training slides and one or more detection algorithms.

9. The imaging system of claim 1, wherein the process further comprises:
pulsing the first and second light sources, and
synchronizing capturing of the first and second monochrome images with pulsing of the first and second light sources.

10. The imaging system of claim 9, wherein each of the first and second light sources includes a light-emitting diode.

11. The imaging system of claim 1, wherein the one or more image capture devices include a digital camera.

12. The imaging system of claim 1, wherein:
in the first monochrome image, the sample is exposed only to the first light waveband from the first light source; and
in the second monochrome image, the sample is exposed only to the second light waveband from the second light source.

13. An imaging system for imaging a sample on a microscope slide, comprising:
a slide imager configured to generate an enhanced composite image of the sample, the slide imager including:
an energy emitter including a first light source and a second light source;
one or more image capture devices; and
a controller communicatively coupled to the energy emitter and the one or more image capture devices, the controller including at least one processor and memory storing program instructions that, when executed by the at least one processor, cause the slide imager to perform a process including:
capturing, using the one or more image capture devices,
a first monochrome image of the sample exposed to a first light waveband from the first light source, wherein the first light waveband interacts with a first target of the sample, and
a second monochrome image of the sample exposed to a second light waveband from the second light source, wherein the second light waveband interacts with a second target of the sample, wherein the second light waveband is different from the first light waveband,
combining the first target illustrated in a first false color and the second target illustrated in a second false color different than the first false color to generate the enhanced composite image of the sample, and
identifying, using a trained classifier, one or more features of interest in the enhanced composite image.

14. The imaging system of claim 13, wherein at least one of the first light source or the second light source includes an ultraviolet light source, a near infrared light source, or an infrared light source.

15. The imaging system of claim 13, wherein the trained classifier has been trained using a set of training slides and one or more detection algorithms.

16. The imaging system of claim 13, further comprising a slide handler mechanism configured to deliver the microscope slide to the slide imager and to remove the microscope slide from the slide imager.

17. The imaging system of claim 16, wherein the slide handler mechanism includes at least one of a robotic arm, a XYZ slide handler, a gripping mechanism, or a transport device.

18. The imaging system of claim 13, further comprising an automated slide staining instrument configured to stain the sample, and wherein the controller is programmed to select the first or second false color based on at least one stain that has been applied to the sample by the automated slide staining instrument.

19. The imaging system of claim 13, wherein the first light waveband has a full width at half maximum between about 30 nm and about 250 nm.

20. An imaging system for imaging a sample on a microscope slide, the imaging system comprising:
an energy emitter including a light source;
one or more image capture devices; and
a controller communicatively coupled to the energy emitter and the one or more image capture devices, the controller including at least one processor and memory storing instructions that, when executed by the at least one processor, cause the imaging system to perform a process including:
determining, using the at least one processor, a first light waveband for interacting with a first target of the sample and a second light waveband for interacting with a second target of the sample,
performing an illumination protocol via the light source to sequentially illuminate the sample with the first light waveband and the second light waveband,
capturing, using the one or more image capture devices, a first monochrome image and a second monochrome image of the sample, wherein the first monochrome image is captured while the sample is illuminated with the first light waveband and the second monochrome image is captured while the sample is illuminated with the second light waveband, and
generating an enhanced image of the sample with the first target illustrated in a first false color and the second target illustrated in a second false color different than the first false color.

21. The imaging system of claim 20, further comprising:
selecting one or more first target detection algorithms based on the first light waveband; and
detecting the first target in the enhanced image using the one or more first target detection algorithms.

22. The imaging system of claim 20, wherein the first target is marked by labeling a conjugate.

23. The imaging system of claim 20, wherein the process includes determining, using a classifier, a number and types of stains applied to the sample.

24. The imaging system of claim 20, wherein the process includes combining the first monochrome image and the second monochrome image using non-linear mixing methods.

25. The imaging system of claim 20, wherein the first target reacts to the first light waveband such that characteristics of features of interest of the sample vary between the second monochrome image and a third image, and wherein the third image is different from the first and second monochrome images.

26. The imaging system of claim 20, wherein the imaging system further comprises a display configured to display the first monochrome image and the second monochrome image or video footage of the sample while performing the process.

27. The imaging system of claim 20, wherein the illumination protocol includes capturing, using the one or more image capture devices, a third image wherein the third image is captured when the energy emitter is emitting white light.

28. The imaging system of claim 20, wherein the capturing of the first and second monochrome images is performed using light filters.

29. The imaging system of claim 20, wherein at least one of the first light waveband or the second light waveband is an ultraviolet waveband, a near infrared waveband, or an infrared waveband.

30. An imaging system for imaging a sample on a microscope slide, the imaging system comprising:

an energy emitter including a first light source and a second light source;

one or more image capture devices; and a controller communicatively coupled to the energy emitter and the one or more image capture devices, the controller including at least one processor and memory storing a plurality of false color protocols and instructions that, when executed by the at least one processor, cause the imaging system to perform a process including:

capturing, using the one or more image capture devices, a first monochrome image of the sample exposed to a first light waveband from the first light source, wherein the first light waveband interacts with a first feature of the sample, and a second monochrome image of the sample exposed to a second light waveband from the second light source, wherein the second light waveband interacts with a second feature of the sample, wherein the second light waveband is different from the first light waveband, selecting at least one false color protocol representing a multi-feature staining protocol for visually identifying multiple features of the sample;

assigning a first false color for the first feature according to the at least one false color protocol, assigning a second false color for the second feature according to the at least one false color protocol, wherein the second false color is different from the first false color according to the at least one false color protocol, combining the first feature and the second feature illustrated in the first and second false colors to generate a labelled false color image of the sample, wherein the labelled false color image of the sample includes the first false color first feature and the second false color second feature, and outputting an enhanced composite image.

31. The imaging system of claim 30 wherein the first feature and the second feature are at least one of:

targets, labels, or cell components.

32. The imaging system of claim 30 wherein the enhanced composite image is generated by combining two to eight false color images.

33. The imaging system of claim 30 wherein the first monochrome image is a first black-and-white monochrome image.

34. The imaging system of claim 30 wherein contrast between the first and second features in the enhanced composite image is increased as compared to a natural color contrast between the first and second features.

* * * * *